(12) United States Patent
Suzuki et al.

(10) Patent No.: US 8,088,831 B2
(45) Date of Patent: Jan. 3, 2012

(54) CELLULOSE ESTER FILM, METHOD FOR PRODUCING CELLULOSE ESTER FILM, POLARIZING PLATE USING THE SAME, AND LIQUID CRYSTAL DISPLAY

(75) Inventors: Takatugu Suzuki, Tokyo (JP); Takayuki Suzuki, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 245 days.

(21) Appl. No.: 12/664,481

(22) PCT Filed: Jul. 3, 2008

(86) PCT No.: PCT/JP2008/062082
§ 371 (c)(1),
(2), (4) Date: Dec. 14, 2009

(87) PCT Pub. No.: WO2009/011228
PCT Pub. Date: Jan. 22, 2009

(65) Prior Publication Data
US 2010/0182548 A1    Jul. 22, 2010

(30) Foreign Application Priority Data

Jul. 19, 2007   (JP) ................................ 2007-188137

(51) Int. Cl.
| | |
|---|---|
| *C08L 1/10* | (2006.01) |
| *B29C 47/14* | (2006.01) |
| *C08K 5/107* | (2006.01) |
| *C08K 5/151* | (2006.01) |
| *C08K 5/5393* | (2006.01) |
| *G02B 5/20* | (2006.01) |
| *G02F 1/1335* | (2006.01) |

(52) U.S. Cl. .............. 516/106; 428/1.1; 428/1.6; 528/1; 106/162.2; 106/162.7

(58) Field of Classification Search .................. 516/106; 428/1.1, 1.6; 528/1; 106/162.2, 162.7
See application file for complete search history.

(56) References Cited

U.S. PATENT DOCUMENTS 6,977,275 B2 *  12/2005  Buchanan et al. .............. 524/37

FOREIGN PATENT DOCUMENTS

| JP | 6501040 | 2/1994 |
|---|---|---|
| JP | 2000352620 | 12/2000 |
| JP | 2005515285 | 5/2005 |
| JP | 2006265301 | 10/2006 |
| JP | 2007138121 | 6/2007 |

* cited by examiner

Primary Examiner — Kelechi Egwim
(74) Attorney, Agent, or Firm — Lucas & Mercanti, LLP

(57) ABSTRACT

Disclosed is a cellulose ester film which is suppressed in volatilization of components during film formation, while having high surface flatness, high durability after saponification and good adhesion to a polarizer. Also disclosed is a method for producing such a cellulose ester film by melt forming. Further disclosed are a polarizing plate having high light resistance and high durability, and a liquid crystal display having high image quality. Specifically disclosed is a cellulose ester film characterized by containing a cellulose ester, a compound represented by the general formula (1) below, and a compound represented by the general formula (2) below.

15 Claims, No Drawings

CELLULOSE ESTER FILM, METHOD FOR PRODUCING CELLULOSE ESTER FILM, POLARIZING PLATE USING THE SAME, AND LIQUID CRYSTAL DISPLAY

CROSS REFERENCE TO RELATED APPLICATION

This is a U.S. National Phase Application under 35 U.S.C. 371 of International Application PCT/JP2008/062082, filed Jul. 3, 2008, which claims the priority of Japanese Application No. 2007-188137, filed Jul. 19, 2007, the entire contents of both Applications are hereby incorporated by reference.

TECHNICAL FIELD

The present invention relates to a cellulose ester film, process for producing a cellulose ester film, a polarizing plate employing the above cellulose ester film, and a liquid crystal display.

BACKGROUND ART

Cellulose ester film has been employed as a photographic negative film support, and in polarizing plates as a film which protects polarizers employed in liquid crystal displays, due to its high transparency, low birefringence, and ease of adhesion to polarizers.

In recent years, the production amount of liquid crystal displays has markedly increased due to the thin depth and light weight, and the demand is increasing. Further, television sets, which employ a liquid crystal display, exhibit features such as thinness and light weight. Thereby, large-sized television sets, production of which was not possible by employing Braun tubes, have been produced. Along with that trend, demand for polarizers and polarizer protecting films has been increasing.

Heretofore, these cellulose ester films have been produced mainly employing a solution-casting method. The solution-casting method, as descried herein, refers to a film forming method in which a solution prepared by dissolving cellulose ester in solvents is cast to form film and solvents are evaporated and dried to produce film. The film which is cast employing the solution-casting method exhibits high flatness, whereby by employing the resulting film, it is possible to produce uniform and high image quality liquid crystal displays.

However, an inherent problem of the solution-casting method is the necessity of a large volume of organic solvents followed by a high environment load. The cellulose ester film is cast employing halogen based solvents which result in a high environment load, due to its solubility characteristics. Consequently, it has particularly demanded to reduce the amount of used solvents, whereby it has been difficult to increase the production of cellulose ester film employing the solution-casting method.

Accordingly, in recent years, experiments have been conducted in which cellulose ester is subjected to melt-casting for the use of silver salt photography (Patent Document 1) and as a polarizer protective film (Patent Document 2) without using an organic solvent. However, cellulose ester is a polymer which exhibits a very high viscosity when melted and also exhibits a very high glass transition point. In order to lower the melt viscosity and glass transition point of organic polymers such as cellulose ester, it was found this that addition of plasticizers is effective.

In the above Patent Documents 1 and 2, employed are phosphoric acid ester plasticizers such as triphenyl phosphate or phenylenebisdiphenyl phosphate. In Patent Documents 3 and 4, saccharide derivatives are disclosed as plasticizers other than phosphoric acid ester plasticizers and used in the cellulose ester. However, even by using the known plasticizers, the viscosity decreasing effect thereof are insufficient for melt casting the cellulose ester. As a result, the casting speed of the cellulose ester from the dies will be small to result in decreased productivity compared with a solvent casting method. The cellulose ester extruded from the dies and cast on a cooling drum or a cooling belt is had to be leveled. It tends to be solidified in a short time after being extruded. Therefore, it was revealed that this method has a problem that the flatness of the obtained film is lower than the film produced by a solvent casting method.

On the other hand, it is an efficient method to increase the melting temperature for decreasing the melt viscosity. However, applying a high melting temperature will impose a disadvantage of decomposition or evaporation of the cellulose ester, the plasticizer, and other additives during melt casting. The prevention of decomposition or evaporation was still insufficient by the conventional known methods.

During the preparation of a polarizing plate by adhering a polarizer protective film and a polarizer, the cellulose ester film is dipped in an alkali solution of a high density and a temperature in order to easily coating the adhesive agent to the cellulose ester film. The surface of the film is saponified by this process and it becomes more hydrophilic. After this process, the adhesive agent is applied to the surface of the film and the polarizer is adhered to it. It was found that since the conventionally known methods has a problem of the robustness of the cellulose ester film after saponified, it will cause a hindrance for a continuous production of the polarizing plate or the adhesion between the cellulose ester film and the polarizer will be deteriorated.

Patent Document 1: JP-A No. 06-501040
Patent Document 2: JP-A No. 2000-352620
Patent Document 3: JP-A No. 2005-515285
Patent Document 4: JP-A No. 2006-265301
Patent Document 5: JP-A No. 2007-138121

DISCLOSURE OF THE INVENTION

Problems to be Solved by the Invention

The present invention was made in view of the above-mentioned problems to be solved. An object of the present invention is to provide a cellulose ester film having few volatilization ingredients at the time of film production and exhibiting high flatness, high robustness after subjected to a saponification process and high adhesion property with a polarizer. Another object of the present invention is to provide the aforesaid cellulose ester film with a melt casting method. And further, an object of the present inventions is to provide a polarizing plate of high lightfastness and high resistance, and to provide a liquid crystal display of high image quality.

Means to Solve the Problems

The above-described problems of the present invention were dissolved by the constitutions below.

1. A cellulose ester film comprising a cellulose ester, a compound represented by Formula (1) and a compound represented by Formula (2).

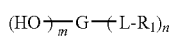  Formula (1)

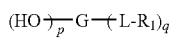  Formula (2)

(In Formulas, G represents a monosaccharide residue or a polysaccharide residue containing 2 to 10 monosaccharide units; L represents a single bond or a two valent linking group formed from at least one of the group consisting of: —O—, —CO—, —$NR_2$— (provided that $R_2$ represents an aliphatic group or an aromatic group) and an aliphatic group; $R_1$ represents an aliphatic group or an aromatic group, provided that the aforesaid aliphatic group and the aforesaid aromatic group may independently have a substituent; m, n, p and q are an integer of 1 or more, provided that the following relationships are satisfied:

m≠p
n≠q
m+n≧3
p+q≧3.)

2. The cellulose ester film of the above-described item 1 comprising a compound represented by Formula (3).

  Formula (3)

(In Formula, G represents a monosaccharide residue or a polysaccharide residue containing 2 to 10 monosaccharide units; L represents a single bond or a two valent linking group formed from at least one of the group consisting of: —O—, —CO—, —$NR_2$— (provided that $R_2$ represents an aliphatic group or an aromatic group) and an aliphatic group; $R_1$ represents an aliphatic group or an aromatic group, provided that the aforesaid aliphatic group and the aforesaid aromatic group may independently have a substituent; r is an integer of 3 or more.)

3. The cellulose ester film of any one of the above-described items 1 and 2, wherein L in the aforesaid Formulas is a two valent linking group represented by —OCO—.

4. The cellulose ester film of any one of the above-described items 1 to 3, wherein G in the aforesaid Formulas represents a polysaccharide residue containing 2 to 6 monosaccharide units.

5. The cellulose ester film of the above-described item 4, wherein the aforesaid G is a sucrose residue.

6. The cellulose ester film of any one of the above-described items 1 to 5, wherein $R_1$ in the aforesaid Formulas is an aromatic group.

7. The cellulose ester film of any one of the above-described items 1 and 3 to 6, wherein the following Formula (I) is satisfied, provided that an added amount of a compound represented by Formula (1) in the cellulose ester is "a" (weight %); and an added amount of a compound represented by Formula (2) in the cellulose ester is "b" (weight %).

$0.10 \leq a/(a+b) \leq 0.90$   Formula (I)

8. The cellulose ester film of any one of the above-described items 2 to 6, wherein the following Formula (II) is satisfied, provided that an added amount of a compound represented by Formula (1) in the cellulose ester is "a" (weight %); an added amount of a compound represented by Formula (2) in the cellulose ester is "b" (weight %); and an added amount of a compound represented by Formula (3) in the cellulose ester is "c" (weight %).

$0.10 \leq a/(a+b+c) \leq 0.90$   Formula (II)

9. The cellulose ester film of any one of the above-described items 1 to 8 comprising a compound represented by Formula (4).

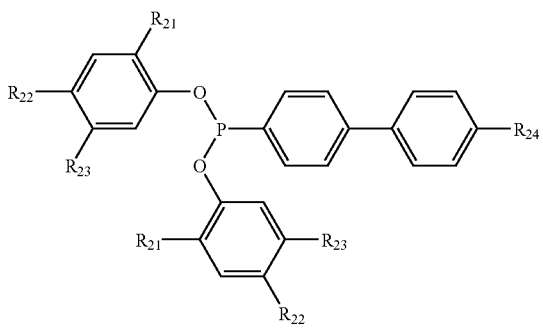

Formula (4)

(In Formula, $R_{21}$ and $R_{22}$ each represent an alkyl group or a cycloalkyl group, each may have a substituent; $R_{23}$ represents an alkyl group, a cycloalkyl group or an aryl group, each may have a substituent; and $R_{24}$ represents a hydrogen atom or a phosphorus atom.)

10. The cellulose ester film of any one of the above-described items 1 to 9 comprising a compound represented by Formula (5) or a compound represented by Formula (6).

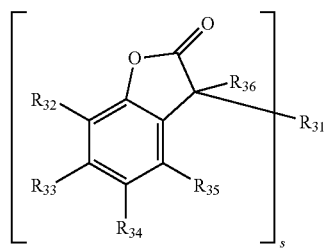

Formula (5)

(In Formula, $R_{32}$ to $R_{35}$ each independently represent a hydrogen atom or a substituent. $R_{36}$ represents a hydrogen atom or a substituent. "s" represents an integer of 1 to 4. When "s" is 1, $R_{31}$ represents a substituent. When "s" is an integer of 2 to 4, $R_{31}$ represents a linking group having respectively two to four valences. The aforesaid substituent is selected from the group consisting of: an alkyl group, a cycloalkyl group, an aryl group, an acylamino group, an alkylthio group, an arylthio group, an alkenyl group, a halogen atom, an alkynyl group, a heterocyclic group, an alkylsulfonyl group, an arylsulfonyl group, an alkylsulfinyl group, an arylsulfinyl group, a phosphono group, an acyl group, a carbamoyl group, a sulfamoyl group, a sulfonamide group, a cyano group, an alkoxy group, an aryloxy group, a heterocyclicoxy group, a siloxy group, an acyloxy group, a sulfonic acid group, a salt of sulfonic acid, an aminocarbonyloxy group, an amino group, an anilino group, an imide group, a ureido group, an alkoxycarbonylamino group, an alkoxycarbonyl group, an aryloxycarbonyl group, a heterocyclicthio group, a thioureido group, a carboxyl group, a salt of carboxylic acid, a hydroxyl group, a mercapto group, and a nitro group.)

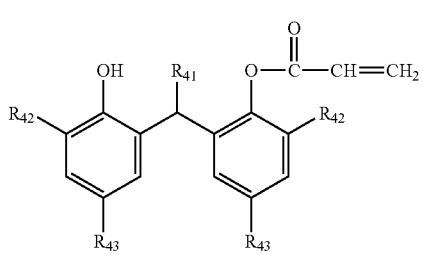

Formula (6)

(In Formula, $R_{41}$ represents a hydrogen atom or an alkyl group of 1 to 10 carbon atoms; and $R_{42}$ and $R_{43}$ each independently represent an alkyl group of Ito 8 carbon atoms.)

11. The cellulose ester film of any one of the above-described items 1 to 10, wherein the cellulose ester satisfies the following Formulas (III) and (IV).

$$2.40 \leq X+Y \leq 2.90 \quad \text{Formula (III)}$$

$$1.00 \leq Y \leq 1.50 \quad \text{Formula (IV)}$$

(In Formula, X is a substituted degree of an acetyl group, and Y is a substituted degree of a propionyl group.)

12. A method for producing the cellulose ester film of any one of the above-described items 1 to 11 using a melt casting method.
13. The method for producing the cellulose ester film of the above-described item 12, wherein a melting temperature is 245 to 265° C.
14. A polarizing plate comprising: a polarizer; and the cellulose ester film of any one of the above-described items 1 to 11 or the cellulose ester film produced with the method described in the above-described items 12 or 13, wherein the cellulose ester film is placed at least on one surface of the polarizer.
15. A liquid crystal display device comprising a liquid crystal cell provided with the polarizing plate of the above-described item 14 at least on one surface of the liquid crystal cell.

Effect of the Invention

According to the present invention, it is possible to provide a cellulose ester film having few volatilization ingredients at the time of film production and exhibiting high flatness, high robustness after subjected to a saponification process and high adhesion property with a polarizer, and the aforesaid cellulose ester film can be provided using a melt casting method. Further, it is possible to provide a polarizing plate of high lightfastness and high resistance, and to provide a liquid crystal display of high image quality.

PREFERRED EMBODIMENTS TO CARRY OUT THE INVENTION

The preferred embodiments to carry out the present invention will be described in the followings, however, the present invention is not limited to them.

The present inventors investigated the above-described problems and found out the followings. By combining at least two compounds of saccharide derivatives each having at least one hydroxyl group and each differing the number of hydroxyl groups, it can be obtained a cellulose ester film having few volatilization ingredients at the time of film production and exhibiting high flatness, high robustness after subjected to a saponification process and high adhesion property with a polarizer. Further, it was found that the aforesaid cellulose ester film of the present invention can be produced with a melt casting method. Thus the present invention was achieved. And further, it was found that a polarizing plate of high lightfastness and high resistance can be provided using the aforesaid cellulose ester film, and also a liquid crystal display of high image quality can be provided.

The present invention will be detailed in the followings.
<Compounds Represented by the Aforesaid Formulas (1), (2) and (3)>

In Formulas (1), (2) and (3), G represents a monosaccharide residue or a polysaccharide residue containing 2 to 10 monosaccharide units. G does not contain a hydroxyl group derived from saccharide. Examples of polysaccharide containing 2 to 10 monosaccharide units are: ribose, arabinose, apiose, xylose, lyxose, allose, altrose, glucose, mannose, gulose, idose, galactose, talose, erythrulose, riblose, xylurose, psicose, fructose, sorbose, tagatose, sedoheptulose, trehalose, isotrehalose, neotrehalose, trehalosamine, kojibiose, nigerose, maltose, maltitol, maltulose, isomaltose, isomaltulose, palatinose, sophorose, laminarabiose, cellobiose, cellobionic acid, gentiobiose, galacto sucrose, lactose, lactosamine, lactose diamine, lactobionic acid, lactitol, lactulose, melibiose, neolactose, primeverose, rutinose, scillabiose, sucrarose, sucrose (saccharose), turanose, vicianose, hyalobiuronic acid, cellotirose, chacotriose, gentianose, isomaltotriose, isopanose, maltotriose, manninotriose, melezitose, panose, planteose, Raffinose, solatriose, umbelliferose, lycotetraose, maltotetraose, stachyose, maltopentaose, verbascose, maltohexose, deoxyribose, fucose, rhamnose, α-cyclodextrin, β-cyclodextrin, γ-cyclodextrin, δ-cyclodextrin, α-cycloawaodrin, and β-cycloawaodrin.

In the aforesaid Formulas (1), (2) and (3), G is preferably a polysaccharide residue containing 2 to 6 monosaccharide units. More preferably, G is disaccharide or a trisaccharide residue. Still more preferably, G is a sucrose residue.

In the aforesaid Formulas (1), (2) and (3), L represents a single bond or a two valent linking group formed from at least one of the group consisting of: —O—, —CO—, —NR$_2$— (provided that R$_2$ represents an aliphatic group or an aromatic group) and an aliphatic group. The combination of the aforesaid unit to form the two valent linking group is not limited, however, the preferred two valent linking is selected from the group consisting of: —O—, —CO—, —NR$_2$— (provided that R$_2$ represents an aliphatic group or an aromatic group).

In the aforesaid Formulas (1), (2) and (3), L is more preferably a two valent linking group represented by —OCO—.

In the aforesaid Formulas (1), (2) and (3), R$_1$ represents an aliphatic group or an aromatic group, provided that the aforesaid aliphatic group and the aforesaid aromatic group may be independently have a substituent. The substituent is the same as the substituent represented by R$_3$ which will be described later.

In the aforesaid Formula (1), m and n are an integer of 1 or more with satisfying the condition of: m+n≧3. More preferably, m and n satisfy the condition of: m+n≧4, still more preferably, m+n≧5, and most preferably, m+n≧8. When n is 2 or more, a plurality of -L-R$_1$s may be the same or different with each other.

In the aforesaid Formula (2), p and q are an integer of 1 or more with satisfying the condition of: p+q≧3. More preferably, p and q satisfy the condition of: p+q≧4, still more preferably, p+q≧5, and most preferably, p+q≧8. When q is 2 or more, a plurality of -L-R$_1$s may be the same or different with each other.

Here, in the aforesaid Formulas (2) and (3), it is required that m≠n and n≠q.

In the aforesaid Formula (3), r is an integer of 3 or more. Preferably, r is an integer of 4 or more, more preferably, r is an integer of 5 or more, and most preferably, r is an integer of 8 or more. In theses cases, a plurality of -L-$R_1$s may be the same or different with each other.

The aliphatic group in the aforesaid Formulas (1), (2) and (3) will be described in the followings. The aliphatic group may be a straight chain, a branched chain or a ring structure. Preferably, it is a group of 1 to 25 carbon atoms, more preferably, it is a group of 1 to 20 carbon atoms and most preferably, it is a group of 2 to 15 carbon atoms.

Examples of the aliphatic group include: a methyl, ethyl, n-propyl, iso-propyl, cyclopropyl, n-butyl, iso-butyl, tert-butyl, amyl, iso-amyl, tert-amyl, n-hexyl, cyclohexyl, n-heptyl, n-octyl, bicycloctyl, adamantyl, n-decyl, tert-octyl, dodecyl, hexadecyl, octadecyl, and didecyl group.

The aromatic group in the aforesaid Formulas (1), (2) and (3) will be described in the followings. The aromatic group may be an aromatic hydrocarbon group or an aromatic heterocyclic group. Preferably, it is an aromatic hydrocarbon group. As an aromatic hydrocarbon group, preferably, it is a group of 6 to 24 carbon atoms, and more preferably, it is a group of 6 to 12 carbon atoms. Examples of an aromatic hydrocarbon group include: benzene, naphthalene, anthracene, biphenyl and terphenyl. Specifically preferred aromatic hydrocarbon groups are: benzene, naphthalene, and biphenyl. As an aromatic heterocyclic group, preferably, it is a group containing at least one of an oxygen atom, a nitrogen atom and a sulfur atom. Examples of an aromatic heterocyclic group include: furan, pyrrole, thiophene, imidazole, pyrazole, pyridine, pyrazine, pyridazine, triazole, triazine, indole, indazole, purine, thiazoline, thiadiazole, oxazoline, oxazole, oxadiazole, quinoline, isoquinoline, phthalazine naphthylidine, quinoxaline, quinazoline, cinnoline, pteridine, acridine, phenanthroline, phenazine, tetrazole, benzimidazole, benzoxazole, benzthiazole, benzotriazole and tetraazaindene. Pyridine, triazine and quinoline are most preferable as an aromatic heterocyclic group.

The substituent $R_3$ is the aforesaid Formulas (1), (2) and (3) will be described in the followings.

Substituents, represented by $R_3$ are not specifically limited, however, the followings are included: an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propalgyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfinyl group and a naphthylsulfonyl group), an alkylsulfinyl group (such as a methylsulfinyl group), an arylsulfinyl group (such as a phenylsulfinyl group), a phosphono group, an acyl group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a salt of sulfonic acid, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamino group, a chlorophenylamino group, a toluidino group, an anisidino group, a naphthylamino group and a 2-pyridylamino group), an imido group, an ureido group (such as a methylureido group, an ethylureido group, a pentylureido group, a cyclohexlureido group, an octylureido group, a dodecylureido group, a phenylureido group, a naphthylureido group and a 2-pyridylureido group), an alkoxycarbonylamino group (such as a methyoxycarbonylamino group and a phenoxycarbonylamino group), an aryloxycarbonylamino group (such as a phenoxycarbonylamino group), a heterocyclicthio group, a thioureido group, a carboxyl group, a salt of carboxylic acid, a hydroxyl group, a mercapto group and a nitro group. These groups may be further substituted by a similar substituent.

In the aforesaid Formula (1), $R_1$ in -L-$R_1$ is preferably an aromatic group when n is 1. $R_1$ is more preferably an aromatic hydrocarbon group, and most preferably, $R_1$ is benzene. When n is an integer of 2 or more, at least one of $R_1$ in a plurality of -L-$R_1$s is an aromatic group. In this case, $R_1$ is more preferably an aromatic hydrocarbon group, and most preferably, $R_1$ is benzene.

In the aforesaid Formula (2), $R_1$ in -L-$R_1$ is preferably an aromatic group when q is 1. $R_1$ is more preferably an aromatic hydrocarbon group, and most preferably, $R_1$ is benzene. When q is an integer of 2 or more, at least one of $R_1$ in a plurality of -L-$R_1$s is an aromatic group. In this case, $R_1$ is more preferably an aromatic hydrocarbon group, and most preferably, $R_1$ is benzene.

In the aforesaid Formula (3), when r is an integer of 3 or more, at least one of $R_1$ in a plurality of -L-$R_1$s is an aromatic group. In this case, $R_1$ is more preferably an aromatic hydrocarbon group, and most preferably, $R_1$ is benzene.

In the present invention, G in the aforesaid Formulas (1), (2) and (3) may be the same or different with each other. Preferably, G is the same. L may be the same or different with each other. Preferably, L is the same. $R_1$ may be the same or different with each other. Preferably, $R_1$ is the same.

In the present invention, the cellulose ester film has a feature of containing at least two compounds each represented by Formulas (1) or (2). More preferably, the cellulose ester film contains at least three compounds each represented by Formulas (1), (2) and (3).

An added amount of the compounds represented by Formulas (1), (2) and (3) in the cellulose ester will be described.

When an added amount of a compound represented by Formula (1) in the cellulose ester is "a" (weight %); an added amount of a compound represented by Formula (2) in the cellulose ester is "b" (weight %); and an added amount of a compound represented by Formula (3) in the cellulose ester is "c" (weight %), an amount of "a+b" or an amount of "a+b+C" is preferably 0.5 to 50 weight %, more preferably 1.0 to 25 weight, and most preferably 3.0 to 15 weight %.

A mutual relationship of amounts of the compounds represented by Formulas (1), (2) and (3) will be described in the followings.

In the present invention, when the cellulose ester film contains at least two compounds each represented by Formulas (1) or (2), "a" and "b" are preferably satisfy the relationship of Formula (I)', and more preferably satisfy the relationship of Formula (I).

$$0.05 \leq a/(a+b) \leq 0.95 \quad \text{Formula (I)'}$$

$$0.10 \leq a/(a+b) \leq 0.90 \quad \text{Formula (I)}$$

In the present invention, when the cellulose ester film contains at least three compounds each represented by Formulas (1), (2) or (3), "a", "b" and "c" preferably satisfy the relationship of Formula (II)', and more preferably satisfy the relationship of Formula (II).

$$0.05 \leq a/(a+b+c) \leq 0.95 \quad \text{Formula (II)'}$$

$$0.10 \leq a/(a+b+c) \leq 0.90 \quad \text{Formula (II)}$$

It is not clearly known the reason why the incorporation of at least two compounds each represented by Formulas (1) or (2), or at least three compounds each represented by Formulas (1), (2) or (3) will produce the aforesaid effects of the present invention. The inventors consider the mechanism as follows.

Generally, as is described later in the portion explaining the cellulose ester, a cellulose ester is produced as a mixture of cellulose esters each having an acyl substituted number lower or higher than an average acyl substituted number obtained as a whole. The cellulose esters of the present invention are such mixtures. The aforesaid cellulose ester contains a plurality of glucose units each having three hydroxyl groups, two hydroxyl groups, one hydroxyl group and even no hydroxyl group. Thus, the cellulose ester is a mixture of cellulose esters having a different number of hydroxyl groups. Against such cellulose ester, incorporation of a single conventional saccharide derivative is insufficient to achieve an enough interaction. It is important to incorporate a plurality of saccharide derivatives containing hydroxyl groups and having an ability to form a hydrogen bonding which will give a strong molecular interaction between the cellulose ester. It is assumed that such plurality of saccharide derivatives will effectively make an interaction with cellulose esters each having different number of hydroxyl groups in each glucose unit. The interaction of a polymer cellulose ester and low molecular saccharide derivatives is increased, and as a result, it is assumed that the aforesaid effects of the present invention can be produced.

Then, the compounds represented by Formulas (1), (2) and (3) will be described, however, the present invention is not limited to them. In the following specific examples, the figure in the parentheses described under the substituent R indicates the number of substitution, however, the positions of the substitution are not specifically limited.

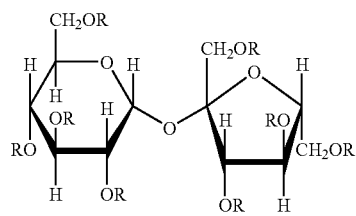

| Exemplified compound | R(number of substitution) | |
|---|---|---|
| A-1 | —H (0) | |
| A-2 | —H (1) | |
| A-3 | —H (2) | |
| A-4 | —H (3) | |
| A-5 | —H (4) | |
| A-6 | —H (5) | |
| A-7 | —H (6) | |
| A-8 | —H (7) | |

-continued
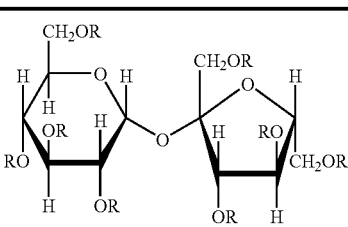
| Exemplified compound | R(number of substitution) | |
|---|---|---|
| A-9 | —H (0) | 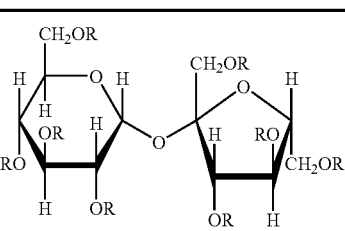 (8) |
| A-10 | —H (1) | 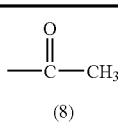 (7) |
| A-11 | —H (2) | 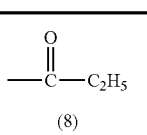 (6) |
| A-12 | —H (0) | 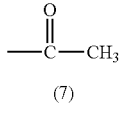 (8) |
| A-13 | —H (1) | 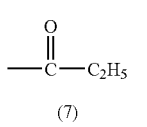 (7) |
| A-14 | —H (0) | 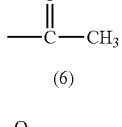 (4)    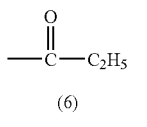 (4) |
| A-15 | —H (1) | 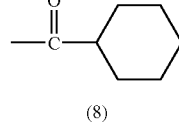 (4)    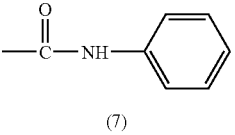 (3) |
| A-16 | —H (0) | 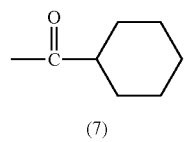 (7)    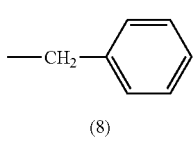 (1) |
| A-17 | —H (1) | 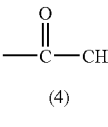 (6)    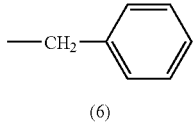 (1) |
| A-18 | —H (2) | 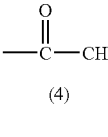 (3)    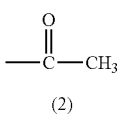 (3) |
-continued
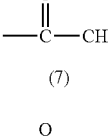
| Exemplified compound | R(number of substitution) | |
|---|---|---|
| A-19 | —H (0) | 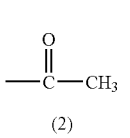 (8) |
| A-20 | —H (1) | (7) |
| A-21 | —H (2) | (6) |
| A-22 | —H (1) | 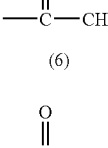 (7) |
| A-23 | —H (0) | (8) |
| A-24 | —H (2) | (6) |
| A-25 | —H (0) | 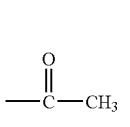 (2)    (6) |
| A-26 | —H (1) | (2)    (5) |
| A-27 | —H (0) | 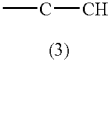 (7)    (1) |

-continued
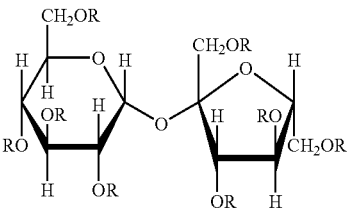
| Exemplified compound | R(number of substitution) | | |
|---|---|---|---|
| A-28 | —H (1) | 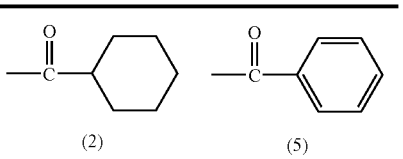 (2) |  (5) |
| A-29 | —H (0) |  (4) | 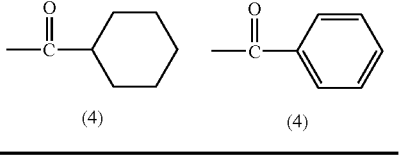 (4) |
(a mixture of both anomer compounds)
| Exemplified compound | R(number of substitution) | |
|---|---|---|
| B-1 | —H (0) |  (5) |
| B-2 | —H (1) | 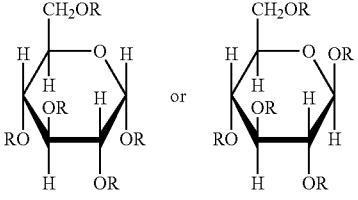 (4) |
| B-3 | —H (2) | 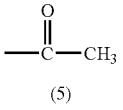 (3) |
| B-4 | —H (3) | 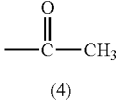 (2) |
| B-5 | —H (4) | 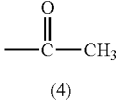 (1) |
-continued
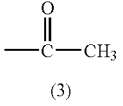
(a mixture of both anomer compounds)
| Exemplified compound | R(number of substitution) | |
|---|---|---|
| B-6 | —H (0) | 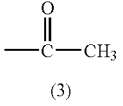 (5) |
| B-7 | —H (1) | 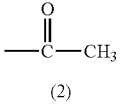 (4) |
| B-8 | —H (2) | 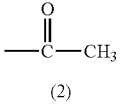 (3) |
| B-9 | —H (3) | 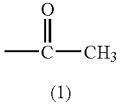 (2) |
| B-10 | —H (4) | 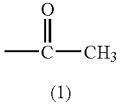 (1) |
| B-11 | —H (0) |  (1) 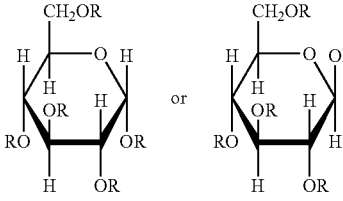 (4) |
| B-12 | —H (1) | 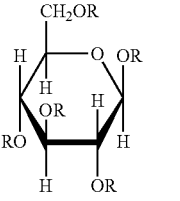 (1) 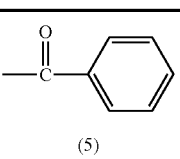 (3) |
| B-13 | —H (0) | —CH₃ (5) |
| B-14 | —H (1) | —CH₃ (4) |
| B-15 | —H (0) | 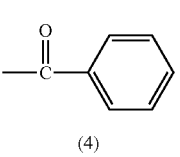 (5) |

-continued

[Structures: pyranose forms with CH₂OR, OR, RO, H substituents — a mixture of both anomer compounds]

| Exemplified compound | R (number of substitution) | |
|---|---|---|
| B-16 | —H (1) | —C(=O)—C₃H₇(n) (4) |
| B-17 | —H (2) | —C(=O)—C₃H₇(n) (3) |

[Structures: furanose forms with CH₂OR, OR, RO, CH₂OR substituents — a mixture of both anomer compounds]

| Exemplified compound | R (number of substitution) | |
|---|---|---|
| C-1 | —H (0) | —C(=O)—C₆H₅ (5) |
| C-2 | —H (1) | —C(=O)—C₆H₅ (4) |
| C-3 | —H (2) | —C(=O)—C₆H₅ (3) |

[Structures: furanose forms with CH₂OR, OR substituents — a mixture of both anomer compounds]

| Exemplified comopund | R (number of substitution) | |
|---|---|---|
| D-1 | —H (0) | —C(=O)—C₆H₅ (4) |
| D-2 | —H (1) | —C(=O)—C₆H₅ (3) |

[Structures: furanose forms with CH₂OR, OR substituents — a mixture of both anomer compounds]

| Exemplified compound | R (number of substitution) | |
|---|---|---|
| E-1 | —H (0) | —C(=O)—C₆H₅ (3) |
| E-2 | —H (1) | —C(=O)—C₆H₅ (2) |

(a mixture of both anomer compounds)

| Exemplified compound | R (number of substitution) | |
|---|---|---|
| F-1 | —H (0) | —C(=O)—CH₃ (8) |
| F-2 | —H (1) | —C(=O)—CH₃ (7) |
| F-3 | —H (2) | —C(=O)—CH₃ (6) |
| F-4 | —H (3) | —C(=O)—CH₃ (5) |
| F-5 | —H (4) | —C(=O)—CH₃ (4) |
| F-6 | —H (5) | —C(=O)—CH₃ (3) |
| F-7 | —H (6) | —C(=O)—CH₃ (2) |
| F-8 | —H (7) | —C(=O)—CH₃ (1) |

Note: Acetyl group written as $-\underset{\|}{\underset{O}{C}}-CH_3$

| Exemplified compound | R (number of substitution) | |
|---|---|---|
| G-1 | —H (0) | —C(=O)—C₆H₅ (11) |
| G-2 | —H (1) | —C(=O)—C₆H₅ (10) |
| G-3 | —H (2) | —C(=O)—C₆H₅ (9) |
| G-4 | —H (3) | —C(=O)—C₆H₅ (8) |
| G-5 | —H (0) | —C(=O)—CH₃ (11) |
| G-6 | —H (1) | —C(=O)—CH₃ (10) |
| G-7 | —H (2) | —C(=O)—CH₃ (9) |
| G-8 | —H (6) | —C(=O)—CH₃ (5) |
| G-9 | —H (10) | —C(=O)—CH₃ (1) |

| Exemplified compound | R (number of substitution) | |
|---|---|---|
| H-1 | —H (0) | —C(=O)—C₆H₅ (18) |
| H-2 | —H (1) | —C(=O)—C₆H₅ (17) |
| H-3 | —H (2) | —C(=O)—C₆H₅ (16) |
| H-4 | —H (3) | —C(=O)—C₆H₅ (15) |
| H-5 | —H (0) | —C(=O)—CH₃ (18) |
| H-6 | —H (1) | —C(=O)—CH₃ (17) |
| H-7 | —H (0) | —C(=O)—CH₃ (9), —C(=O)—C₂H₅ (9) |
| H-8 | —H (1) | —C(=O)—CH₃ (8), —C(=O)—C₂H₅ (9) |
| H-9 | —H (2) | —C(=O)—CH₃ (8), —C(=O)—C₂H₅ (8) |
| H-10 | —H (3) | —C(=O)—C₃H₇(i) (15) |
| H-11 | —H (6) | —C(=O)—C₃H₇(i) (12) |

<Synthetic Example of Compounds Represented by Formulas (1), (2) and (3)>

The compounds represented by Formulas (1), (2) and (3) will be specifically described, however, the present invention is not limited to them. The compounds of the present invention may be used without separation of a plurality of saccharide derivatives after completing the reaction. However, it may be possible to use a mixture of saccharide derivatives after purified with recrystallization or with a chromatography to obtain each single saccharide derivative.

(Synthesis of Exemplified Compounds A-1, A-2 and A-3)

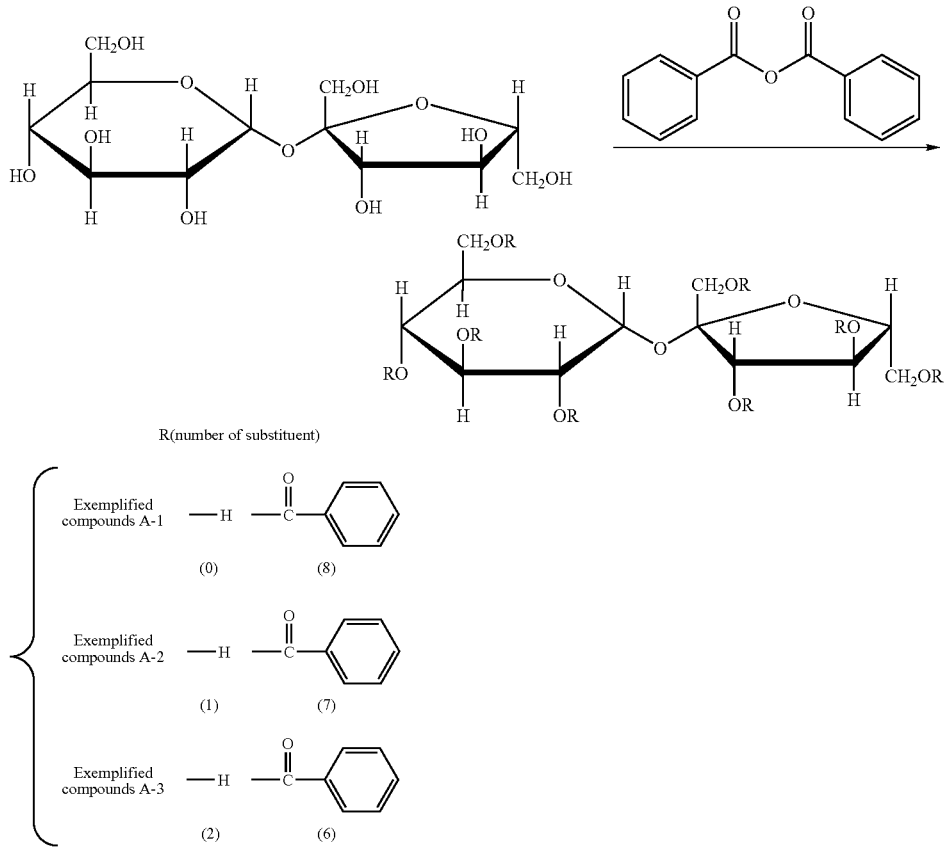

In a four necked vessel fitted with a stirrer, a reflux condenser, a thermometer and a nitrogen gas inlet tube, were placed 34.2 g (0.1 mol) of sugar, 180.8 g (0.8 mol) of anhydrous benzoic acid, 379.7 g (4.8 mol) of pyridine. The mixture was heated with stirring and bubbling nitrogen gas through the nitrogen gas inlet tube, and esterification reaction was carried out at 70° C. during 5 hours. Then, the inside of the vessel was reduced to a pressure of less than $4\times10^2$ Pa and was removed an excessive pyridine at 60° C. After that, the inside of the vessel was reduced to a pressure of less than $1.3\times10$ Pa and was heated to 120° C. to remove almost all of anhydrous benzoic acid and the produced benzoic acid. Afterward, 1 L of toluene and 300 g of an aqueous solution containing 0.5 weight % of sodium carbonate were added and the mixture was stirred for 30 minutes at 50° C. Then the mixture was left still so as to separate a toluene layer. To the separated toluene layer was added 100 g of water and washed it for 30 minutes at an ambient temperature. After washing, the toluene layer was separated and toluene was removed under a reduced pressure (less than $4\times10^2$ Pa) at 50° C. A mixture of exemplified compounds A-1, A-2 and A-3 was obtained. The obtained mixture was subjected to HPLC and LC-MASSS analysis. It was found that the amount of A-1 was 19 weight %, the amount of A-2 was 58 weight % and the amount of A-3 was 23 weight %. A part of the obtained mixture of the products was purified with a column chromatography using silica gel to obtain A-1, A-2 and A-3 each having 100% purity.

<Cellulose Ester>

The details of the cellulose ester used in the present invention will be described in the followings.

The cellulose ester film used in the present invention is produced by the solution casting method or melt casting method. In the solution casting method, a solution (dope) with a cellulose ester dissolved in a solvent is cast on the support member and the solvent is evaporated to produce a film. In the melt casting, a cellulose ester is molten by heating, and the resultant product (melt) is cast on the support member to form a film. The melt casting method permits a substantial reduction in the amount of the organic solvent used to produce the film. As compared with the solution casting method requiring use of a great amount of conventional organic solvent, the melt casting method provides a film characterized by a substantial improvement in environmental adaptability. Thus, the cellulose ester film is preferably manufactured by the melt casting method.

The melt casting method of the present invention is a method of producing a film by heating and melting a cellulose ester up to the temperature wherein it becomes fluid, virtually without using a solvent. It is exemplified by the method of producing a film by pushing fluid cellulose ester through a die. The solvent may be used in part of the process of preparing the molten cellulose ester. In the melt film formation process for molding a film-like product, molding operation is performed virtually without using solvent.

There is no restriction to the cellulose ester constituting the cellulose ester film for a display if it is a cellulose ester that can be molten to form a film. It is used for aromatic carboxylic acid ester and others. When the film properties obtained such as optical properties are taken into account, the lower fatty acid ester of cellulose is preferably used. In the present invention, the lower fatty acid in lower fatty acid ester cellulose is defined as a fatty acid containing 5 or less carbon atoms. Cellulose acetate, cellulose propionate, cellulose butylate and cellulose pivalate can be mentioned as preferable lower fatty acid esters of cellulose. To ensure compatibility between the dynamic characteristics and melt film formation property, it is preferred to use a mixed fatty acid ester such as cellulose acetate propionate and cellulose acetate butylate, namely, a cellulose ester having an acyl group other than the acetyl group.

Of these substances, cellulose acetate propionate and cellulose acetate butylate are preferably employed. In particular, cellulose acetate propionate is most preferably used.

The degree of substituted acyl groups in the cellulose ester used in the present invention will be described.

Cellulose has total 3 hydroxyl groups in each one glucose unit (one hydroxyl group at 2, 3, and 6 position). The total substituted degree is a value indicating the average number of acyl groups per one glucose unit. Therefore, the maximum substituted degree is 3.0. These acyl groups may be substituted at 2, 3, and 6 position evenly, or may be substituted with a certain distribution.

A preferably substituted degree of acyl groups in the cellulose ester used in the present invention is as follows. When a substituted degree of an acetyl group is X; and a substituted degree of a propionyl group or a butyryl group is Z, the cellulose ester should satisfy the following Formulas (V) and (VI) at the same time. The substitution degree of the prepared cellulose ester was calculated based on ASTM-D817-96

$$2.0 \leq X+Z \leq 3.0 \quad \text{Formula (V)}$$

$$0.7 \leq Z \leq 3.0 \quad \text{Formula (VI)}$$

Among the cellulose esters, particularly preferred is cellulose acetate propionate. Specifically, cellulose acetate propionate which satisfies both Formulas (III) and (IV) at the same time.

$$2.40 \leq X+Y \leq 2.90 \quad \text{Formula (III)}$$

$$1.00 \leq Y \leq 1.50$$

(In Formula, X is a substituted degree of an acetyl group, and Y is a substituted degree of a propionyl group.)

I may be possible to use cellulose esters by blending plural kinds of cellulose esters under the condition that the obtained cellulose ester film satisfies the above-described requirements. In the portions which are not substituted with the aforesaid acyl groups usually remains a hydroxyl group. These cellulose esters can be prepared in the conventionally known methods.

The cellulose esters used in the present invention preferably has a number average molecular weight (Mn) of 50,000 through 150,000, more preferably 55,000 through 120,000, and still more preferably 60,000 through 100,000.

In the cellulose ester preferably used in the present invention, the ratio of the weight average molecular weight Mw to number average molecular weight Mn is 1.3 through 5.5. This ratio is more preferably 1.5 through 5.0, still more preferably 1.7 through 4.0, and most preferably 2.0 through 3.5.

Mn and a ration of Mw/Mn can be measured by the high-speed liquid chromatography according to the method described below.

The following describes the measuring conditions.
Solvent: Tetrahydrofuran
Apparatus: HLC-8220 (by Toso Co., Ltd.)
Column: TSKgel Super HM-M (by Toso Co., Ltd.)
Column temperature: 40° C.
Sample temperature: 0.1% by mass
Dose: 10 µl
Flow rate: 0.6 ml/min.
Calibration curve: Standard polystyrene: PS-1 (by Polymer Laboratories Inc.)

Based on a calibration curve having Mw=2,560,000 through 580 using nine samples

The cellulose material of the cellulose ester used in the present invention can be either a wood pulp or cotton linter. The wood pulp can be either a conifer or a broad-leaved tree. The conifer is more preferred. When a film is manufactured, a cotton linter is preferably utilized from the viewpoint of separability. The cellulose esters manufactured therefrom can be mixed properly and used, or can be used independently.

For example, the ratio of the cotton linter-derived cellulose ester to the wood pulp (conifer)-derived cellulose ester to the wood pulp (broad-leaved tree)-derived cellulose ester can be 100:0:0, 90:10:0, 85:15:0, 50:50:0, 20:80:0, 10:90:0, 0:100:0, 0:0:100, 80:10:10, 85:0:15, and 40:30:30.

The cellulose ester can be obtained, for example, by replacing the hydroxyl group of the material cellulose by the acetic anhydride, anhydrous propionic acid and/or anhydrous butyric acid according to the normal method in such a way that the acetyl group, propionyl group and/or butyl group are kept within the aforementioned range. There is no restriction to the method of synthesizing such a cellulose ester. For example, it can be synthesized by using the method disclosed in the Japanese Non-Examined Patent Publication (JP-A) No. 10-45804 or JP-A No. 6-501040.

The amount of an alkali earth metal contained in the cellulose ester used in the present invention is preferably 1 through 50 ppm. When the amount of an alkali earth metal exceeds 50 ppm, the deposition on the die lip will be increased and the cellulose ester will be broken at the time of heat stretching or slitting after heat stretching. When the amount of an alkali earth metal is less than 1 ppm, the cellulose ester will be also broken, but the reason of which is not known. When it is to be reduced below 1 ppm, the load on the cellulose ester washing process will be excessive. Therefore, it is not preferable to be less than 1 ppm. Further, the preferred amount of an alkali earth metal is in the range of 1 to 30 ppm. Here, the amount of the alkali earth metal indicates a total amount of Ca and Mg, which can be measured with an X ray photoelectron spectroscopic device (XPS).

The amount of the residual sulfuric acid contained in the cellulose ester used in the present invention is preferably 0.1 through 45 ppm in terms of the sulfur element. They are considered to be included as salts. When the amount of the residual sulfuric acid contained therein exceeds 45 ppm, the deposition on the die lip at the time of heat-melting will increase, and therefore, such an amount is not preferred. Further, at the time of thermal drawing or slitting subsequent to thermal drawing, the material will be easily damaged, and therefore, such an amount is not preferred. The amount of the residual sulfuric acid contained therein should be reduced as much as possible, but when it is to be reduced below 0.1, the load on the cellulose ester washing process will be excessive and the material tends to be damaged easily. This should be avoided. Further, the preferred amount is in the range of 0.1 through 30 ppm. The amount of the residual sulfuric acid can be measured according to the ASTM-D817-96 in the similar manner.

The total amount of the residual amount of free acid in the cellulose ester is preferably 1 to 500 ppm. When the amount of the residual acid contained therein exceeds 500 ppm, the deposition on the die lip will increase, and it tends to be damaged. It is hard to be less than 1 ppm thought washing. It is more preferably in the range of 1 to 100 ppm, in particular, it is most preferably in the range of 1 to 70 ppm. The amount of the residual free acid can be measured according to the ASTM-D817-96 in the similar manner.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rt value (to be described later) and Ro value. Further, the cellulose ester can be washed using water as well as a poor solvent such as methanol or ethanol. It is also possible to use a mixture between a poor solvent and a good solvent if it is a poor solvent as a result. This will remove the inorganic substance other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of the cellulose ester, the cellulose ester is settled again in the poor solvent, subsequent to dissolution of the good solvent of the cellulose ester. This will remove the low molecular weight component and other impurities of the cellulose ester. In this case, similarly to the aforementioned case of washing the cellulose ester, washing is preferably carried out in the presence of an antioxidant.

Subsequent to re-settling of the cellulose ester, another polymer or low molecular compound may be added.

The cellulose ester used in the present invention is preferred to be such that there are few bright defects when formed into a film. The bright defect can be defined as follows: Two polarizing plates are arranged perpendicular to each other (crossed-Nicols), and a cellulose ester film is inserted between them. Light of the light source is applied from one of the surfaces, and the cellulose ester film is observed from the other surface. In this case, a spot formed by the leakage of light from the light source. This spot is referred to as a bright detect. The polarizing plate employed for evaluation in this case is preferably made of the protective film free of a bright defect. A glass plate used to protect the polarizer is preferably used for this purpose. The bright defect may be caused by non-acetified cellulose or cellulose with a low degree of acetylation contained in the cellulose ester. It is necessary to use the cellulose ester containing few bright defects (use the cellulose ester with few distributions of replacement ratio), or to filter the molten cellulose ester. Alternatively, the material in a state of solution is passed through a similar filtering step in either the later process of synthesizing the cellulose ester or in the process of obtaining the precipitate, whereby the bright defect can be removed. The molten resin has a high degree of viscosity, and therefore, the latter method can be used more efficiently.

The smaller the film thickness, the fewer the number of bright defects per unit area and the fewer the number of the cellulose esters contained in the film. The number of the bright defects having a bright spot diameter of 0.01 mm or more is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all. The number of the bright defects having a bright spot diameter of 0.005 through 0.01 mm is preferably 200 pieces/cm$^2$ or less, more preferably 100 pieces/cm$^2$ or less, still more preferably 50 pieces/cm$^2$ or less, further more preferably 30 pieces/cm$^2$ or less, still further more preferably 10 pieces/cm$^2$ or less. The most desirable case is that there is no bright defect at all.

When the bright defect is to be removed by melt filtration, the bright defect is more effectively removed by filtering the cellulose ester composition mixed with a plasticizer, anti-deterioration agent and antioxidant, rather than filtering the cellulose ester melted independently. It goes without saying that, at the time of synthesizing the cellulose ester, the cellulose ester can be dissolved in a solvent, and the bright defect can be reduced by filtering. Alternatively, the cellulose ester mixed with an appropriate amount of ultraviolet absorber and other additive can be filtered. At the time of filtering, the viscosity of the melt including the cellulose ester is preferably 5000 Pa·s or less, more preferably 2000 Pa·s or less, still more preferably 1000 Pa·s or less, further more preferably 800 Pa·s or less. A conventionally known filtering medium including a glass fiber, a cellulose fiber, a filter paper and a fluorinated resin such as a tetrafluoroethylene resin is preferably used. Particularly, ceramics and metal can be used in preference. The absolute filtration accuracy is preferably 50 μm or less, more preferably 30 μm or less, still more 10 μm or less, further more preferably 5 μm or less. They can be appropriately combined for use. Either a surface type or depth type filter medium can be used. The depth type is more preferably used since it has a greater resistance to clogging.

In another embodiment, it is also possible that the cellulose ester as a material is dissolved in a solvent at least once, and is dried and used. In this case, the cellulose ester is dissolved in the solvent together with one or more of the plasticizer, ultraviolet absorber, anti-deterioration agent, antioxidant and matting agent, and is dried and used.

The good solvent such as methylene chloride, methyl acetate or dioxolane that is used in the solution casting method can be used as a solvent. At the same time, the poor solvent such as methanol, ethanol or butanol can also be used. In the process of dissolution, it can be cooled down to −20° C. or less or heated up to 80° C. or more. Use of such a cellulose ester allows uniform additives to be formed in the molten state, and the uniform optical property is ensured in some cases.

The film for a display of the present invention can be made of an adequate mixture of high polymer components other than the cellulose ester. The high polymer components to be mixed are preferably characterized by excellent compatibility with the cellulose ester compatibility. When formed into a film, the transmittance is preferably 80% or more, more preferably 90% or more, still more preferably 92% or more.

Next, the compounds represented by Formulas (4) to (6) and used in the present invention will be specifically described, however, the present invention is not limited to them.

At first, the compounds represented by Formula (4) and used in the present invention will be specifically described, however, the present invention is not limited to them.

In Formula (4), $R_{21}$ and $R_{22}$ each represent an alkyl group or a cycloalkyl group. The alkyl group and the cycloalkyl group are not specifically limited. Examples of an alkyl group include: a methyl group, an ethyl group, a propyl group, an isopropyl group, a t-butyl group, a pentyl group, a hexyl group, an octyl group, a dodecyl group and trifluoromethyl group. Examples of a cycloalkyl group include: a cyclopentyl group and a cyclohexyl group.

These groups may be substituted with a substituent. The substituents are not specifically limited, however, the followings are included: an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propalgyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acyl group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a salt of sulfonic acid, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamino group, a chlorophenylamino group, a toluidine group, an anisidino group, a naphthylamino group and a 2-pyridylamino group), an imido group, an ureido group (such as a methylureido group, an ethylureido group, a pentylureido group, a cyclohexlureido group, an octylureido group, a dodecylureido group, a phenylureido group, a naphthylureido group and a 2-pyridylureido group), an alkoxycarbonylamino group (such as a methyoxycarbonylamino group and a phenoxycarbonylamino group), an aryloxycarbonylamino group (such as a phenoxycarbonylamino group), a heterocyclicthio group, a thioureido group, a carboxyl group, a salt of carboxylic acid, a hydroxyl group, a mercapto group and a nitro group. These groups may be further substituted by a similar substituent.

In Formula (4), $R_{23}$ represents an alkyl group, a cycloalkyl group or an aryl group. The alkyl group and the cycloalkyl group are not specifically limited. Examples of an alkyl group include: a methyl group, an ethyl group, a propyl group, an isopropyl group, a t-butyl group, a pentyl group, a hexyl group, an octyl group, a dodecyl group and trifluoromethyl group. Examples of a cycloalkyl group include: a cyclopentyl group and a cyclohexyl group. Examples of an aryl group include: a phenyl group and a naphtyl group.

$R_{23}$ may have a substituent. The substituent is not specifically limited, however, the same substituents which may be possessed by the aforesaid $R_{21}$ and $R_{22}$ can be cited.

In Formula (4), $R_{24}$ represents a hydrogen atom or a phosphorus atom. An aryl group or an arylthio group is preferably bonded to the phosphorus atom. More preferably, an aryloxythio group is bonded to the phosphorus atom.

Next, the compounds represented by Formulas (4) and used in the present invention will be specifically described, however, the present invention is not limited to them.

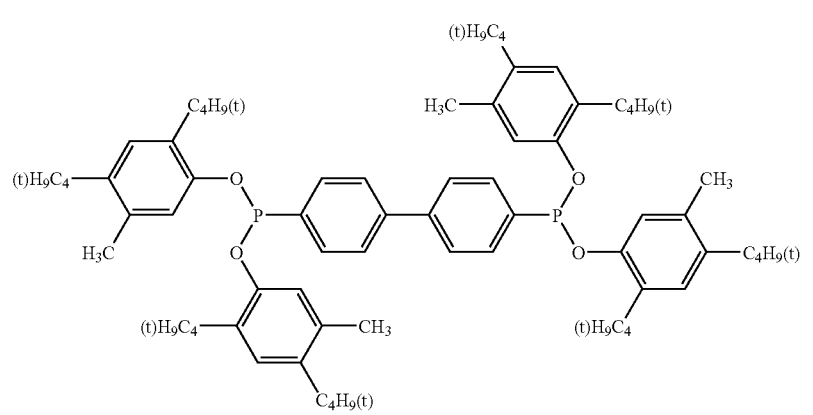

(4)-1

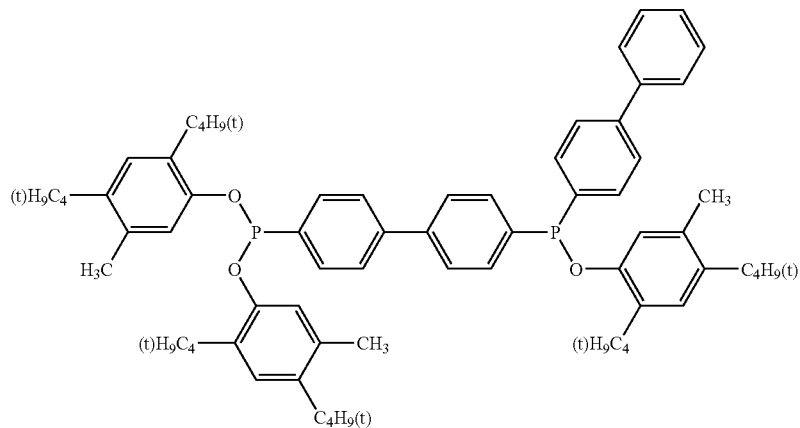
(4)-2
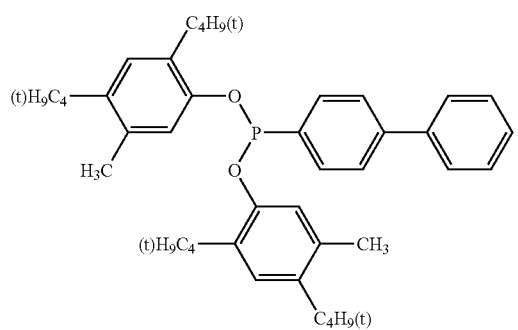
(4)-3
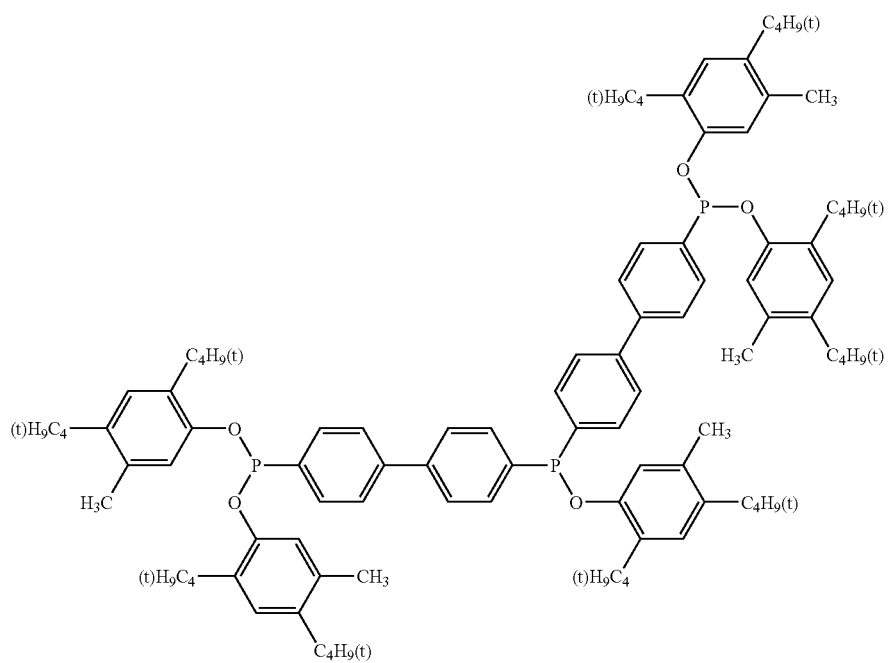
(4)-4

-continued
(4)-5
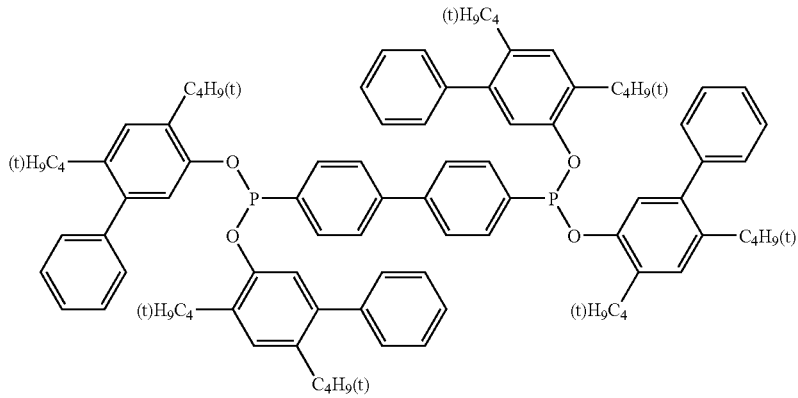
(4)-6
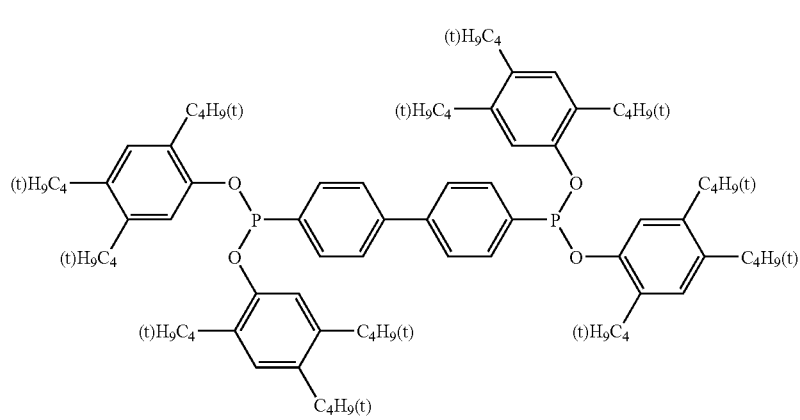
(4)-7
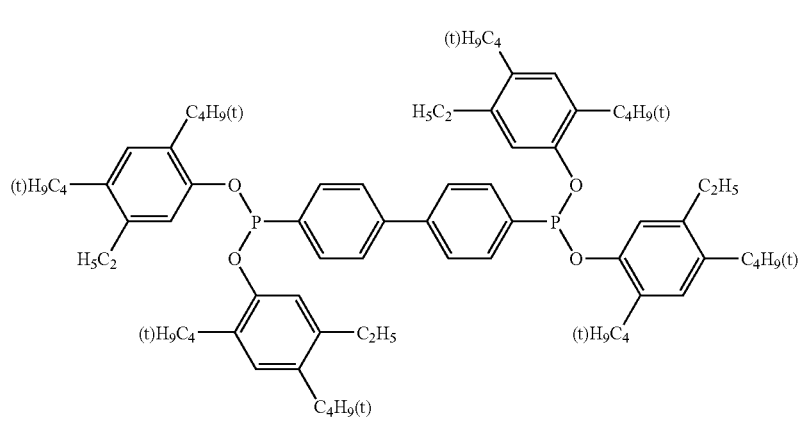
(4)-8
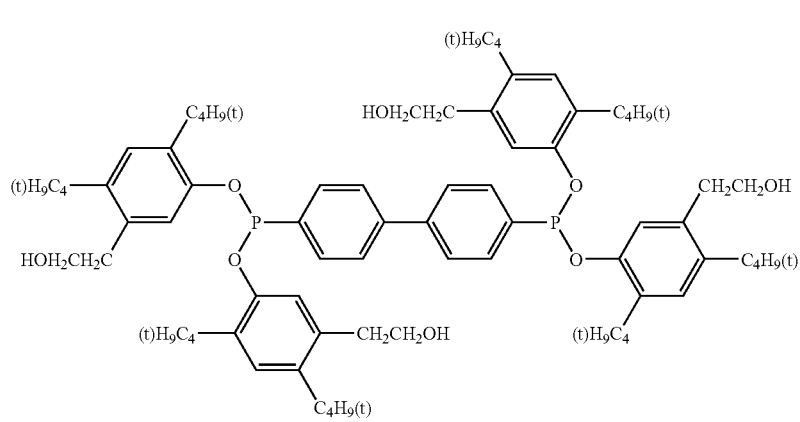

-continued
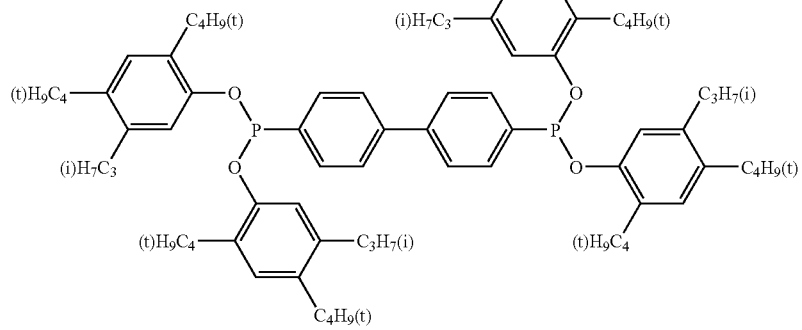
(4)-9
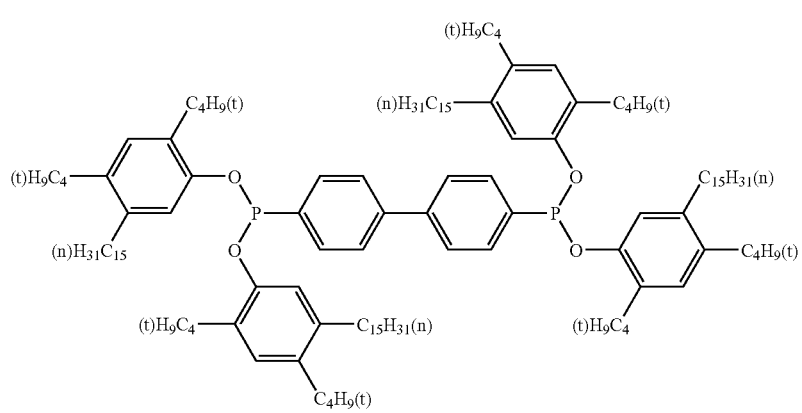
(4)-10
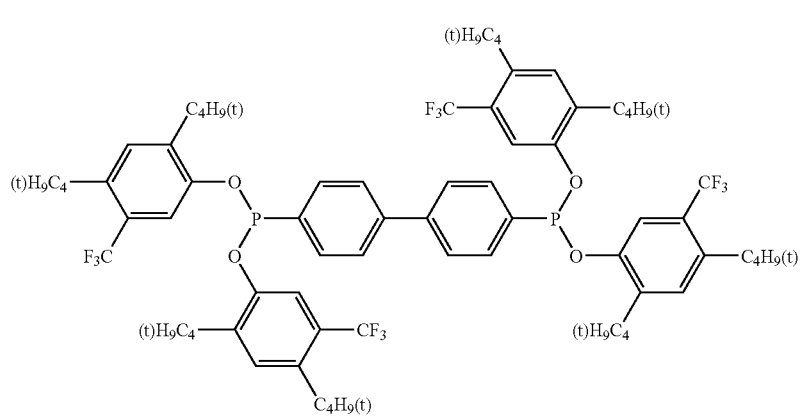
(4)-11
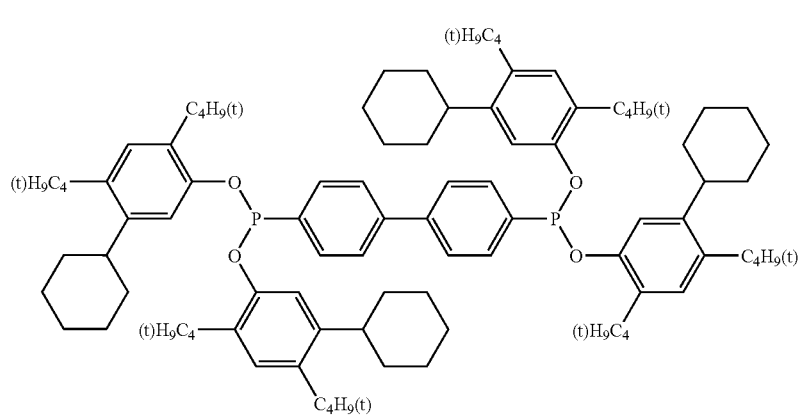
(4)-12

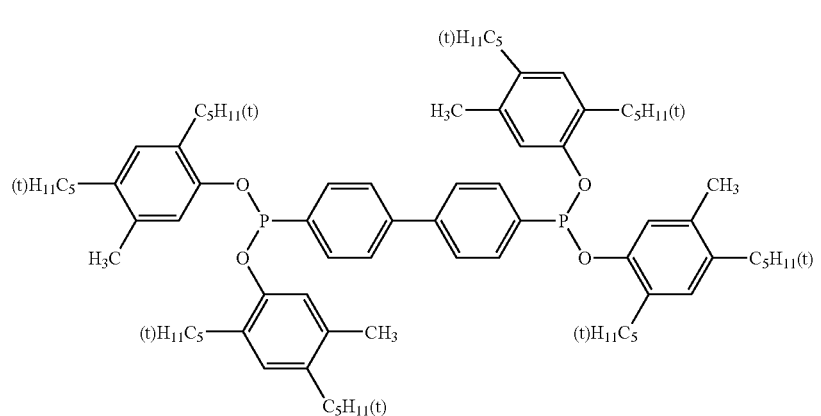
(4)-13
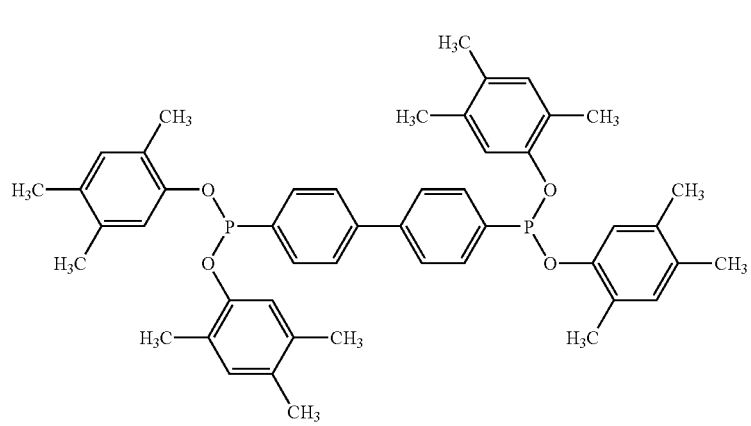
(4)-14
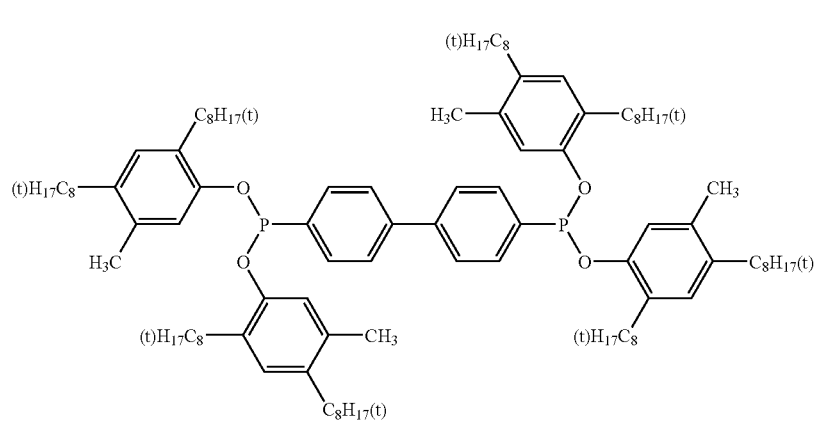
(4)-15

-continued
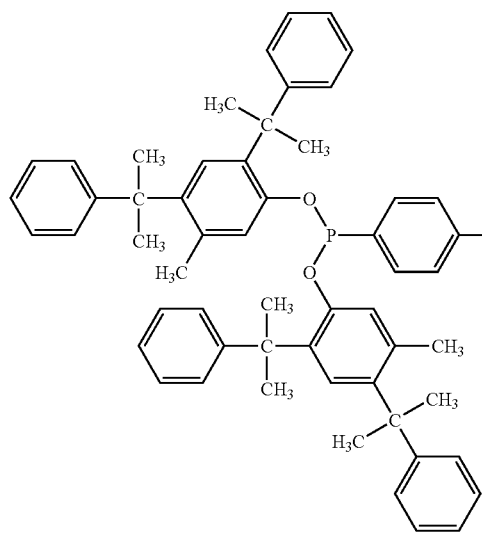
(4)-16
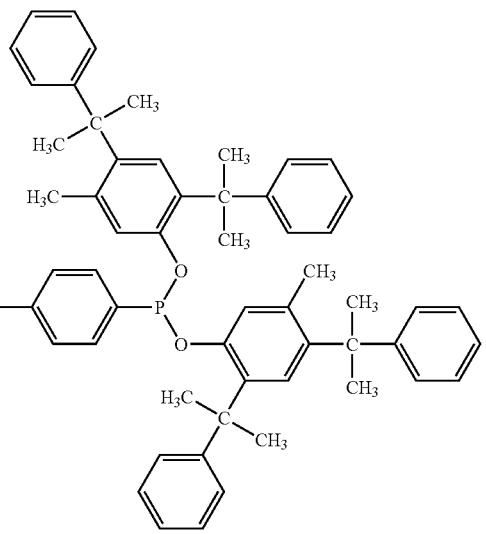
(4)-17
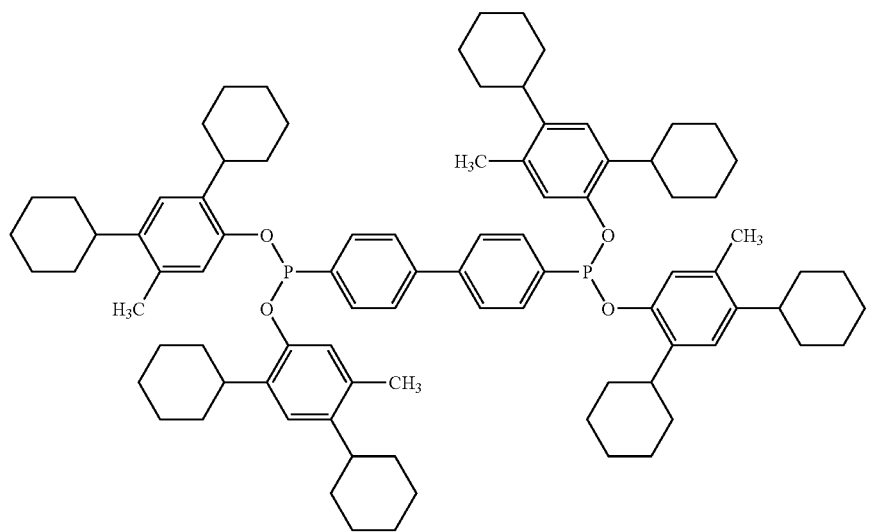
(4)-18
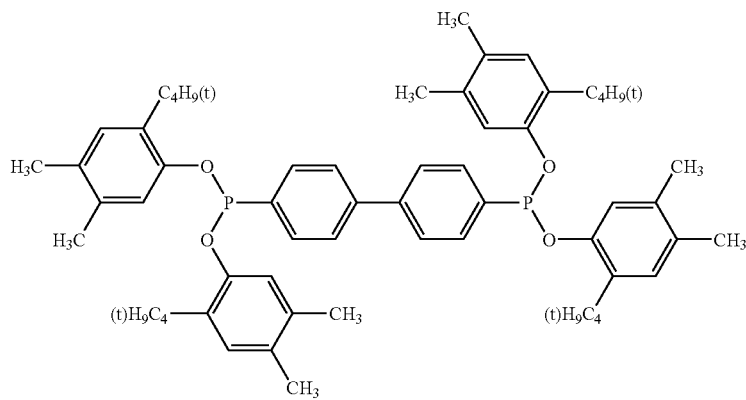

Next, the compounds represented by Formula (5) and used in the present invention will be specifically described, however, the present invention is not limited to them.

In Formula (5), $R_{32}$ to $R_{35}$ each independently represent a hydrogen atom or a substituent. $R_{32}$ and $R_{33}$, $R_{33}$ and $R_{34}$, or $R_{34}$ and $R_{35}$ may be joined to form a ring. $R_{35}$ represents a hydrogen atom or a substituent. "s" represents an integer of 1 to 4. When "s" is 1, $R_{31}$ represents a substituent. When "s" is an integer of 2 to 4, $R_{31}$ represents a linking group having two to four valences.

When $R_{32}$ to $R_{35}$ represent substituents, the substituents are not specifically limited, however, the followings are included: an alkyl group (such as a methyl group, an ethyl group, a propyl group, an isopropyl group, a t-butyl group, a pentyl group, a hexyl group, an octyl group, a dodecyl group and trifluoromethyl group), a cycloalkyl group (such as a cyclopentyl group and a cyclohexyl group), an aryl group (such as a phenyl group and a naphthyl group), an acylamino group (such as an acetylamino group and a benzoylamino group), an alkylthio group (such as a methylthio group and an ethylthio group), an arylthio group (such as a phenylthio group and a naphthylthio group), an alkenyl group (such as a vinyl group, a 2-propenyl group, a 3-butenyl group, a 1-methyl-3-propenyl group, a 3-pentenyl group, a 1-methyl-3-butenyl group, a 4-hexenyl group and a cyclohexenyl group), a halogen atom (such as a fluorine atom, a chlorine atom, a bromine atom and an iodine atom), an alkynyl group (such as a propalgyl group), a heterocyclic group (such as a pyridyl group, a thiazolyl group, an oxazolyl group and an imidazolyl group), an alkylsulfonyl group (such as a methylsulfonyl group and an ethylsulfonyl group), an arylsulfonyl group (such as a phenylsulfonyl group and a naphthylsulfonyl group), an alkylsulfinyl group (such as a methylsulfinyl group), an arylsulfinyl group (such as a phenylsulfinyl group), a phosphono group, an acyl group (such as an acetyl group, a pivaloyl group and a benzoyl group), a carbamoyl group (such as an aminocarbonyl group, a methylaminocarbonyl group, a dimethylaminocarbonyl group, a butylaminocarbonyl group, a cyclohexylaminocarbonyl group, a phenylaminocarbonyl group and a 2-pyridylaminocarbonyl group), a sulfamoyl group (such as an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group and a 2-pyridylaminosulfonyl group), a sulfonamide group (such as a methanesulfonamide group and a benzenesulfonamido group), a cyano group, an alkoxy group (such as a methoxy group, an ethoxy group and a propoxy group), an aryloxy group (such as a phenoxy group and a naphthyloxy group), a heterocyclicoxy group, a siloxy group, an acyloxy group (such as an acetyloxy group and a benzoyloxy group), a sulfonic acid group, a salt of sulfonic acid, an aminocarbonyloxy group, an amino group (such as an amino group, an ethylamino group, a dimethylamino group, a butylamino group, a cyclopentylamino group, a 2-ethylhexylamino group and a dodecylamino group), an anilino group (such as a phenylamine group, a chlorophenylamino group, a toluidino group, an anisidino group, a naphthylamino group and a 2-pyridylamino group), an imido group, an ureido group (such as a methylureido group, an ethylureido group, a pentylureido group, a cyclohexlureido group, an octylureido group, a dodecylureido group, a phenylureido group, a naphthylureido group and a 2-pyridylureido group), an alkoxycarbonylamino group (such as a methyoxycarbonylamino group and a phenoxycarbonylamino group), an aryloxycarbonylamino group (such as a phenoxycarbonylamino group), a heterocyclicthio group, a thioureido group, a carboxyl group, a salt of carboxylic acid, a hydroxyl group, a mercapto group and a nitro group. These groups may be further substituted by a similar substituent.

In Formula (5), $R_{32}$ to $R_{35}$ are preferably a hydrogen atom or an alkyl group.

In Formula (5), $R_{36}$ represents a hydrogen atom or a substituent. As the substituents represented by $R_{32}$, the same substituents represented by $R_{32}$ to $R_{35}$ can be cited. In particular, $R_{36}$ is preferably a hydrogen atom.

In Formula (5), "s" represents an integer of 1 to 4. When "s" is in integer of 1, $R_{31}$ represents a substituent. As the substituents, the same substituents represented by $R_{32}$ to $R_{35}$ can be cited. When "s" is an integer of 2 to 4, $R_{31}$ represents respectively a linking group having two to four valences.

When $R_{31}$ represents a linking group having two to four valences, examples of a linking group having two valences include: a two valent alkylene group which may have a substituent, a two valent aryl group which may have a substituent, an oxygen atom, a nitrogen atom, a sulfur atom, or a combined group of these linking group.

Examples of a linking group having three valences include: a three valent alkylene group which may have a substituent, a three valent aryl group which may have a substituent, a nitrogen atom or a combined group of these linking group.

Examples of a linking group having four valences include: a four valent alkylene group which may have a substituent, a four valent aryl group which may have a substituent or a combined group of these linking group.

In Formula (5), "s" is preferably an integer of 1. When "s" is 1, $R_{31}$ is preferably a unsubstituted or substituted phenyl group. Preferable examples of the substituents of phenyl group include: an alkyl group of 1 to 18 carbon atoms or an alkoxy group of 1 to 18 carbon atoms. More preferably, it is an alkyl group of 1 to 8 carbon atoms or an alkoxy group of 1 to 8 carbon atoms.

As an example of compounds represented by Formula (5), a commercially available in the market is "HP-1366" (produced by Ciba Japan Co. Ltd.)

The specific compounds represented by Formula (5) in the present invention will be shown, however, the present invention is not limited to them.

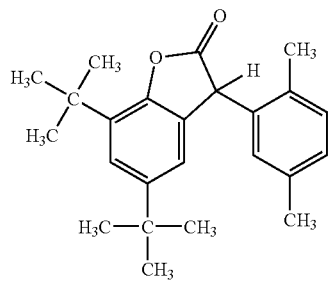

(5)-1

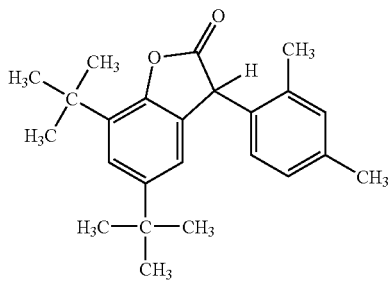

(5)-2

-continued
(5)-3
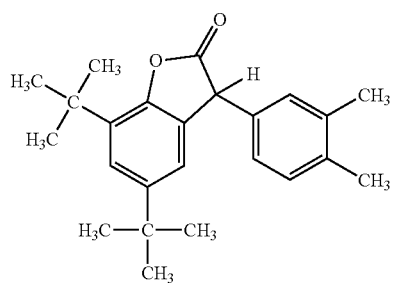
(5)-4
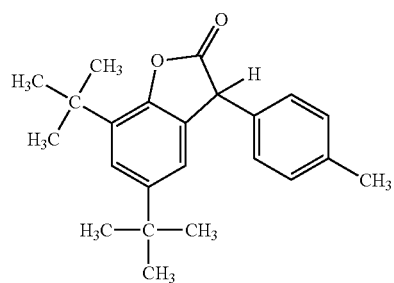
(5)-5
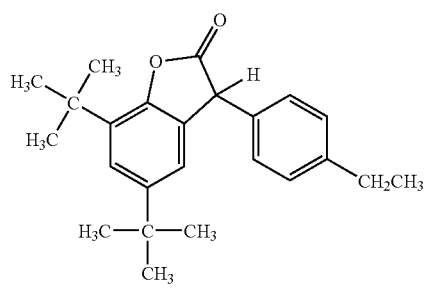
(5)-6
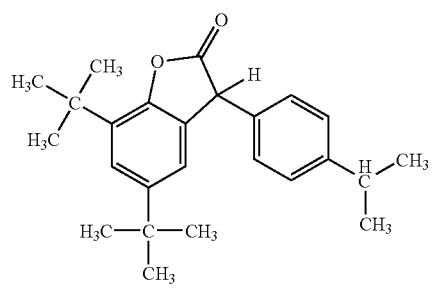
(5)-7
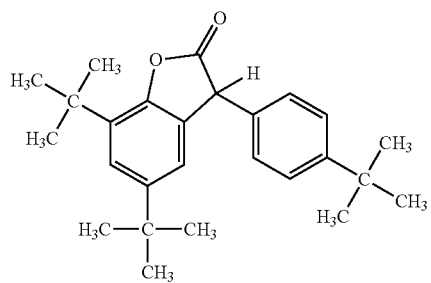
(5)-8
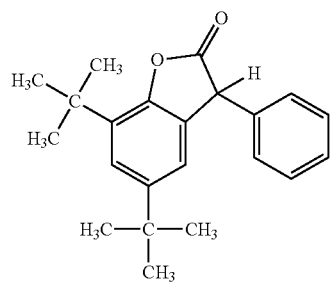
(5)-9
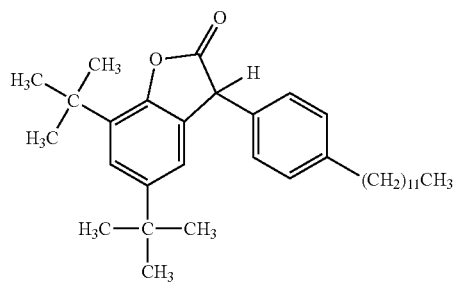
(5)-10
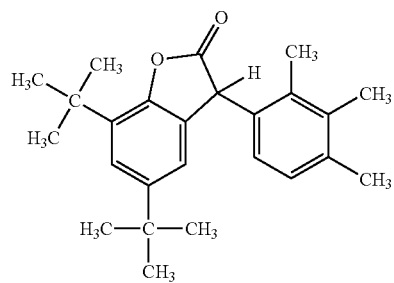
(5)-11
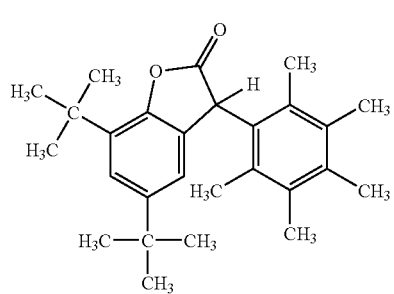
(5)-12
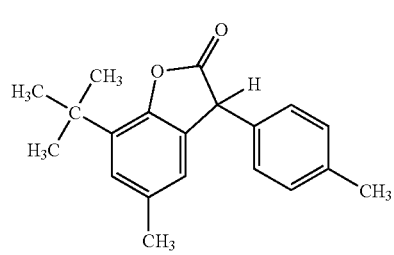

-continued
(5)-13
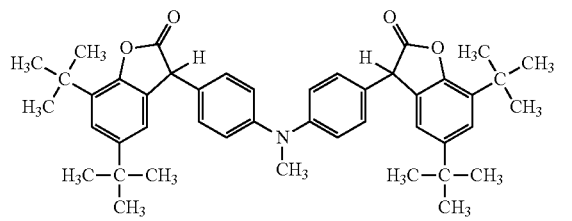
(5)-14
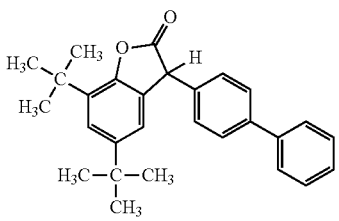
(5)-15
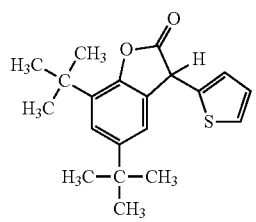
(5)-16
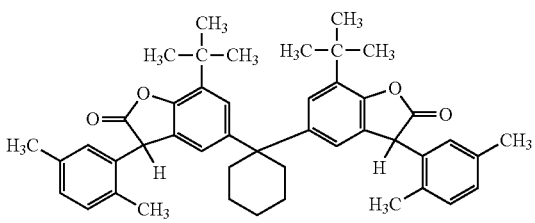
(5)-17
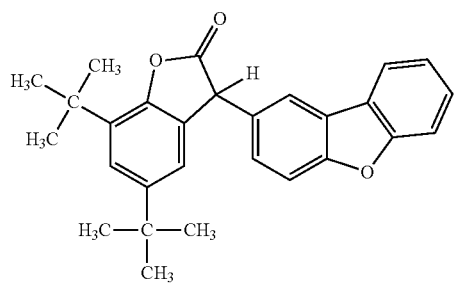
(5)-18
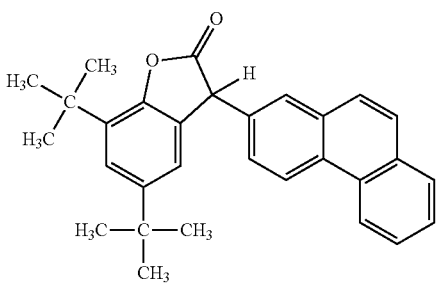
(5)-19
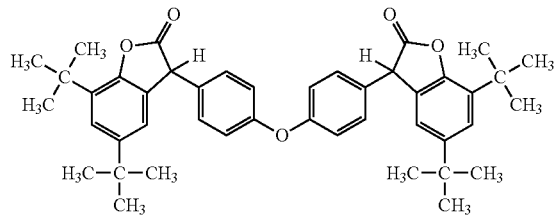
(5)-20
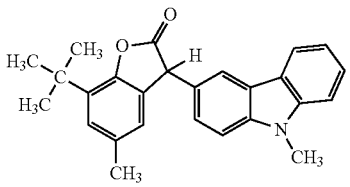
(5)-21
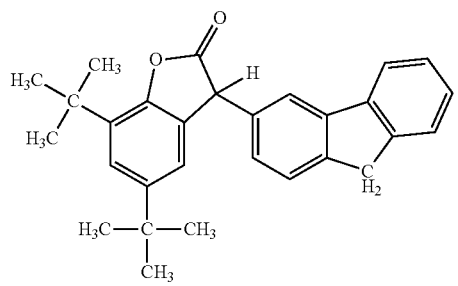
(5)-22
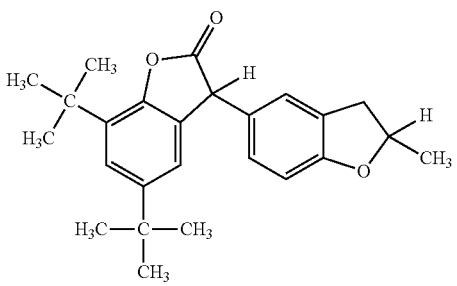
(5)-23
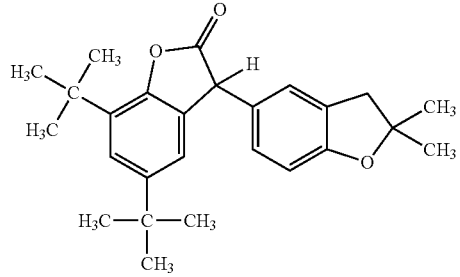
(5)-24
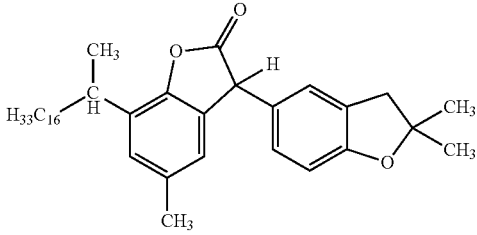

-continued
(5)-25
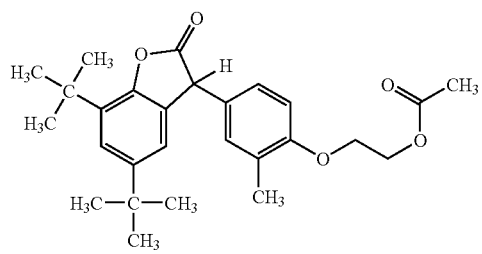
(5)-26
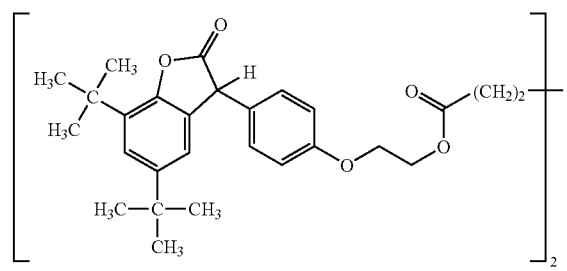
(5)-27
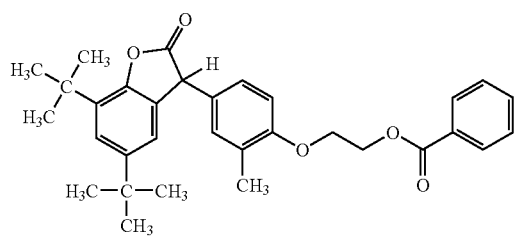
(5)-28
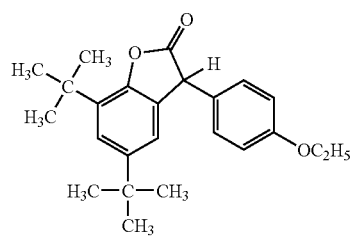
(5)-29
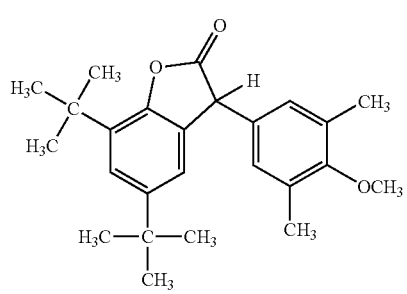
(5)-30
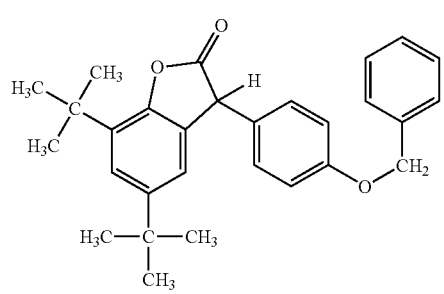
(5)-31
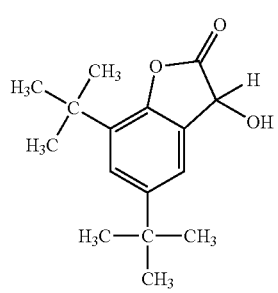
(5)-32
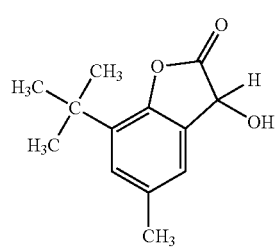
(5)-33
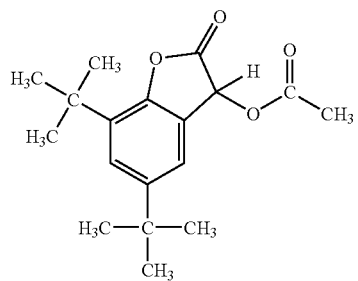
(5)-34
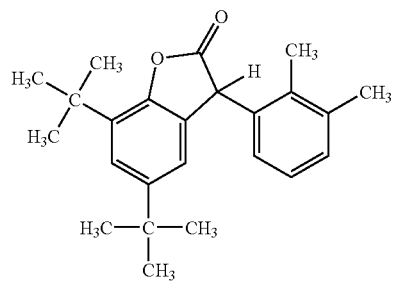

-continued
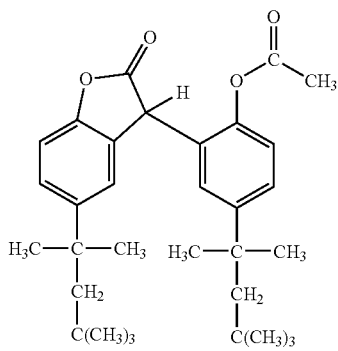 (5)-35
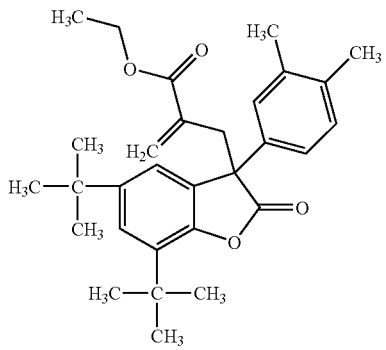 (5)-36
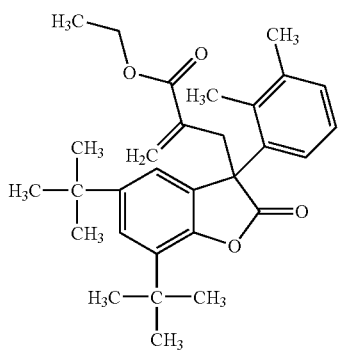 (5)-37
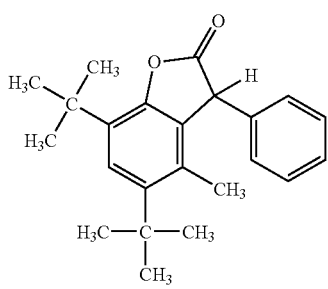 (5)-38
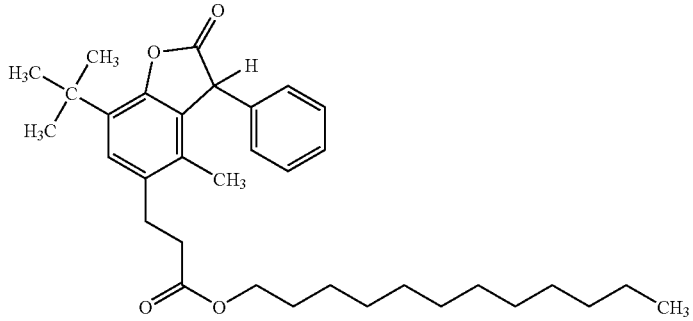 (5)-39
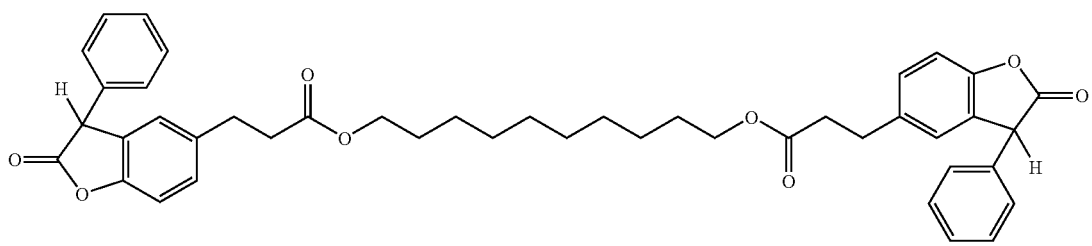 (5)-40
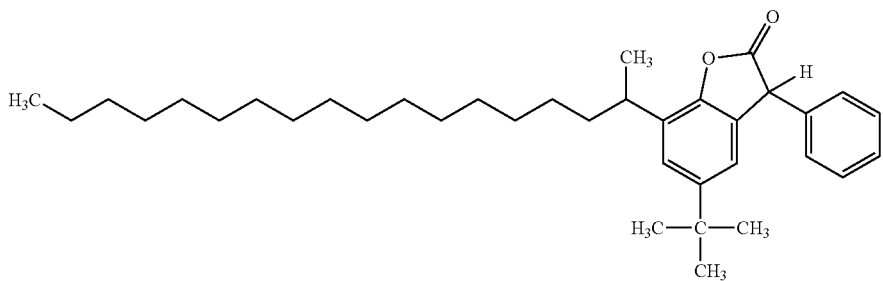 (5)-41

-continued
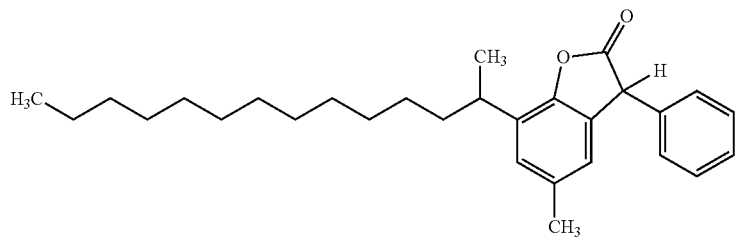
(5)-42
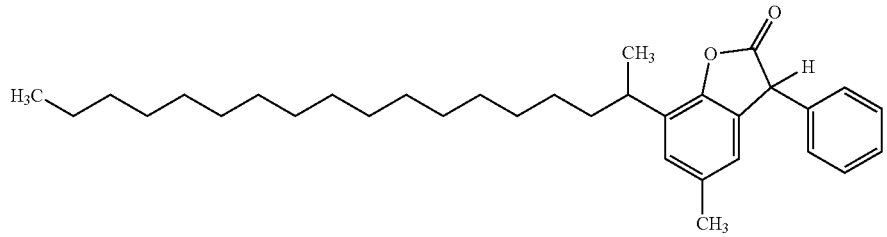
(5)-43
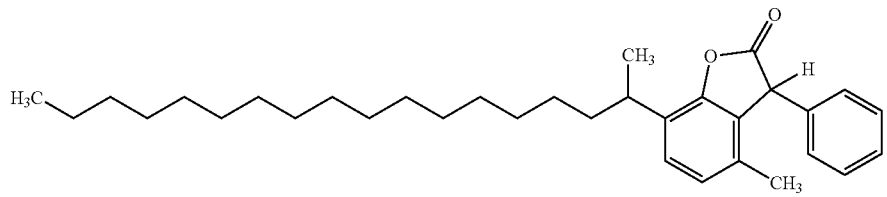
(5)-44
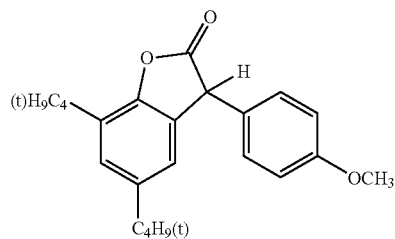
(5)-45
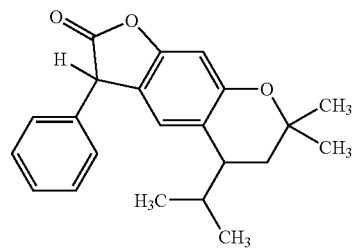
(5)-46
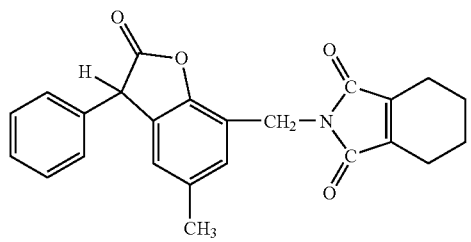
(5)-47
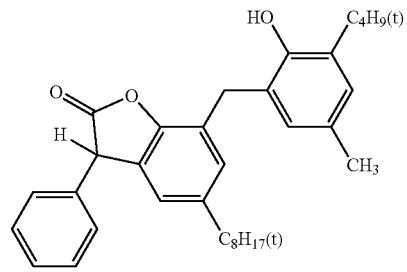
(5)-48
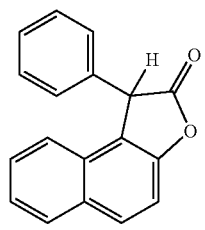
(5)-49
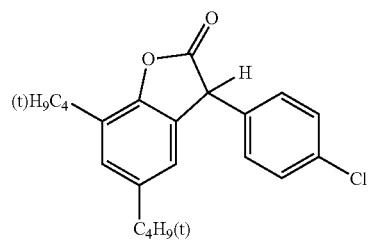
(5)-50

-continued

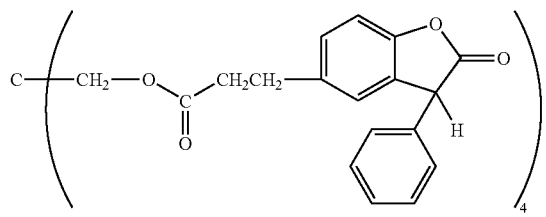
(5)-51

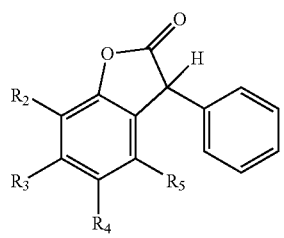

| Compound No. | R₂ | R₃ | R₄ | R₅ |
|---|---|---|---|---|
| (5)-52 | —CH$_3$ | —H | —C$_4$H$_9$(s) | —H |
| (5)-53 | —C$_4$H$_9$(s) | —H | —C$_4$H$_9$(t) | —H |
| (5)-54 | —C$_5$H$_9$(s) | —H | —C$_5$H$_{11}$(t) | —H |
| (5)-55 | —C$_5$H$_{11}$(t) | —H | —C$_5$H$_{11}$(t) | —H |
| (5)-56 | —C$_4$H$_9$(t) | —H | —C$_5$H$_{11}$(t) | —H |
| (5)-57 | —C$_4$H$_9$(s) | —H | —C$_4$H$_9$(s) | —H |
| (5)-58 | —C$_4$H$_9$(t) | —H | —(CH$_2$)$_2$CO$_2$C$_8$H$_{17}$(n) | —H |
| (5)-59 | —C$_4$H$_9$(t) | —H | —(CH$_2$)$_2$CO$_2$C$_8$H$_{17}$(i) | —H |
| (5)-60 | —C$_4$H$_9$(t) | —H | —(CH$_2$)$_2$CO$_2$(CH$_2$)$_2$OC$_4$H$_9$(n) | —H |
| (5)-61 | —C$_{12}$H$_{25}$ | —H | —CH$_3$ | —H |
| (5)-62 | —C$_8$H$_{17}$ | —H | —CH$_3$ | —H |
| (5)-63 | —C$_{16}$H$_{33}$ | —H | —CH$_3$ | —H |
| (5)-64 | —C$_{24}$H$_{49}$ | —H | —CH$_3$ | —H |
| (5)-65 | —C$_4$H$_9$(t) | —H | —Cl | —H |
| (5)-66 | —C$_4$H$_9$(t) | —H | —OCH$_3$ | —H |
| (5)-67 | —C$_4$H$_9$(t) | —H | —O—C$_8$H$_{17}$(n) | —H |
| (5)-68 | H$_3$C—C(CH$_3$)(CH$_3$)—C(CH$_3$)(CH$_3$)—CH$_3$ | —H | H$_3$C—C(CH$_3$)(CH$_3$)—C(CH$_3$)(CH$_3$)—CH$_3$ | —H |
| (5)-69 | —H | —H | —OC$_4$H$_9$(n) | —H |
| (5)-70 | —H | —H | —OCH$_3$ | —H |
| (5)-71 | —H | —H | —CH$_3$ | —H |
| (5)-72 | —H | —H | —C$_4$H$_9$(t) | —H |
| (5)-73 | —H | —H | —C$_5$H$_{11}$(t) | —H |
| (5)-74 | —H | —H | —C$_8$H$_{17}$(t) | —H |
| (5)-75 | —C$_4$H$_9$(t) | —H | —CH$_3$ | —H |
| (5)-76 | H$_3$C—C(CH$_3$)(CH$_3$)—C(CH$_3$)(CH$_3$)—CH$_3$ | —H | —C$_8$H$_{17}$(t) | —H |
| (5)-77 | H$_3$C—C(CH$_3$)(CH$_3$)—C(CH$_3$)(CH$_3$)—CH$_3$ | —H | —C$_9$H$_{19}$ | —H |

-continued

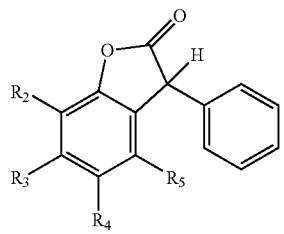

| Compound No. | R₂ | R₃ | R₄ | R₅ |
|---|---|---|---|---|
| (5)-78 | $H_3C-C(CH_3)_2-CH_2-C(CH_3)_2-$ (2,4,4-trimethylpent-2-yl) | —H | —C₁₂H₂₅ | —H |
| (5)-79 | $H_3C-C(CH_3)_2-CH_2-C(CH_3)_2-$ | —H | —(CH₂)₂CO₂C₈H₁₇(n) | —H |
| (5)-80 | —H | —H | $H_3C-C(CH_3)_2-CH_2-C(CH_3)_2-$ | —H |
| (5)-81 | —H | —O—C₈H₁₇(n) | —H | —H |
| (5)-82 | —H | —O—C₈H₁₇(i) | —H | —H |
| (5)-83 | —H | —NHCOC₄H₉(n) | —H | —H |
| (5)-84 | —H | —O—C₈H₁₇(n) | —Cl | —H |
| (5)-85 | —CH₃ | —O—C₈H₁₇(n) | —H | —H |
| (5)-86 | —CH₃ | —O—C₈H₁₇(i) | —H | —Cl |
| (5)-87 | —H | —O—C₈H₁₇(n) | —H | —Cl |
| (5)-88 | —H | —N(CH₃)₂ | —H | —H |
| (5)-89 | —NH—CO—C₆H₅ | —H | —C₈H₁₇(t) | —H |
| (5)-90 | —H | —CH₃ | —CH₃ | —H |
| (5)-91 | —H | —H | —(CH₂)₂OH | —H |
| (5)-92 | —H | —H | —(CH₂)₂OCOC₇H₁₅(n) | —H |
| (5)-93 | —H | —H | —(CH₂)₃OH | —H |
| (5)-94 | —C₄H₉(t) | —H | —(CH₂)₂OH | —H |
| (5)-95 | —C₄H₉(t) | —H | —(CH₂)₂OCOCH₃ | —H |
| (5)-96 | —H | —O(CH₂)₂OH | —C₄H₉(t) | —H |
| (5)-97 | —H | —H | —C₃H₇(i) | —H |
| (5)-98 | —H | —O(CH₂)₂OCH₃ | —H | —H |
| (5)-99 | —OC₂H₅ | —H | —H | —H |
| (5)-100 | —H | —H | —O—CH(C₆H₅)—H | —H |
| (5)-101 | —H | —H | —C₆H₅ | —H |
| (5)-102 | —Cl | —H | —Cl | —H |

-continued

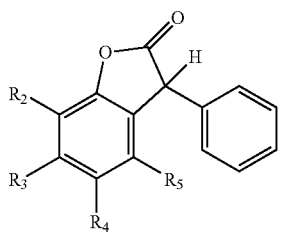

| Compound No. | $R_2$ | $R_3$ | $R_4$ | $R_5$ |
|---|---|---|---|---|
| (5)-103 | —H | —Cl | —Cl | —H |
| (5)-104 | —C$_4$H$_9$(t) | —H | —H | —H |
| (5)-105 | —H | —H | —F | —H |
| (5)-106 | —H | —H | —CN | —H |
| (5)-107 | —CH$_3$ | —H | —CH$_3$ | —H |
| (5)-108 | —OCH$_3$ | —H | —C$_2$H$_5$ | —H |
| (5)-109 | —H | —H | —COCH$_3$ | —H |
| (5)-110 | —H | —H | —CO$_2$C$_4$H$_9$(n) | —H |
| (5)-111 | —H | —H | —O—C$_6$H$_5$ | —H |
| (5)-112 | —H | —H | —CH$_2$OH | —H |
| (5)-113 | —H | —H | —CH$_2$OH | —H |
| (5)-114 | —H | —H | —SO$_2$C$_8$H$_{17}$(i) | —H |
| (5)-115 | —H | —C$_{15}$H$_{31}$(n) | —H | —H |
| (5)-116 | —C$_9$H$_{19}$ | —H | —C$_9$H$_{19}$ | —H |
| (5)-117 | —CF$_3$ | —H | —H | —H |
| (5)-118 | —CH(H)(C$_6$H$_5$) | —H | —Cl | —H |
| (5)-119 | —H | —H | —C$_6$H$_{11}$ (cyclohexyl) | —H |
| (5)-120 | —H | —C$_4$H$_9$(t) | —H | —C$_4$H$_9$(t) |
| (5)-121 | —H | —H | —NHC(O)—C$_6$H$_4$—C(CH$_3$)$_3$ | —H |
| (5)-122 | —H | —H | —H | —H |
| (5)-123 | —H | —C$_4$H$_9$(t) | —H | —H |
| (5)-124 | —H | —CH$_3$ | —H | —CH$_3$ |
| (5)-125 | —H | —H | —(CH$_2$)$_2$CO$_2$C$_{18}$H$_{35}$(n) | —H |
| (5)-126 | —C$_4$H$_9$(t) | —H | —H | —C$_4$H$_9$(t) |
| (5)-127 | —H | —CH$_3$ | —H | —H |
| (5)-128 | —C$_6$H$_5$ | —H | —H | —H |
| (5)-129 | —H | —OCH$_3$ | —H | —H |
| (5)-130 | —H | —OH | —H | —H |
| (5)-131 | —H | —OCOC$_{17}$H$_{35}$ | —H | —H |
| (5)-132 | —H | —OH | —C(O)C$_6$H$_5$ | —H |
| (5)-133 | —C$_8$H$_{17}$(t) | —H | —C$_8$H$_{17}$(t) | —H |

(5)-134
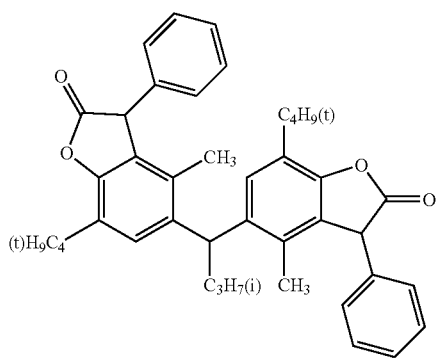
(5)-135
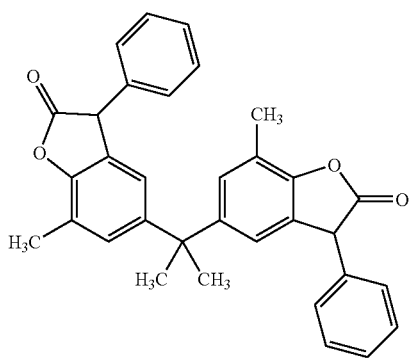
(5)-136
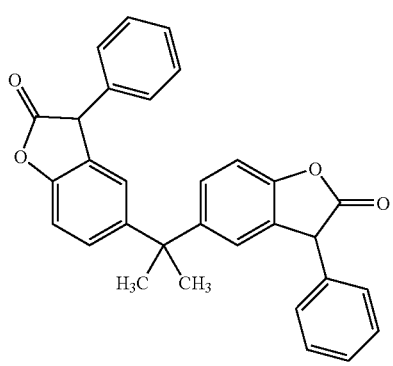
(5)-137
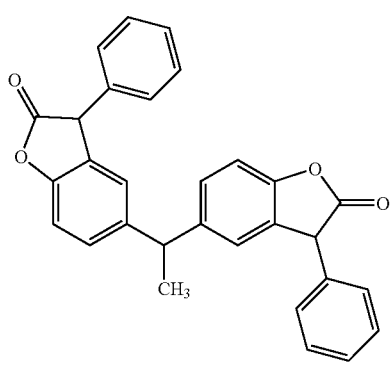
(5)-138
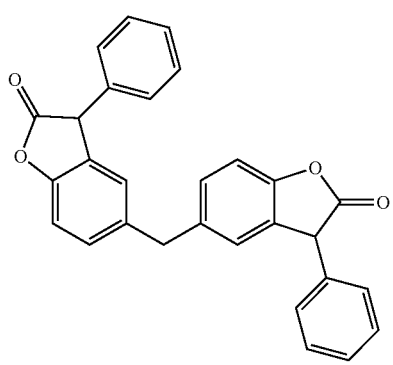
(5)-139
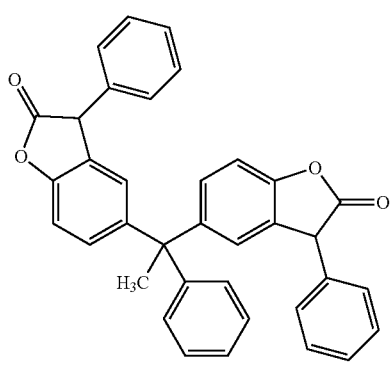
(5)-140
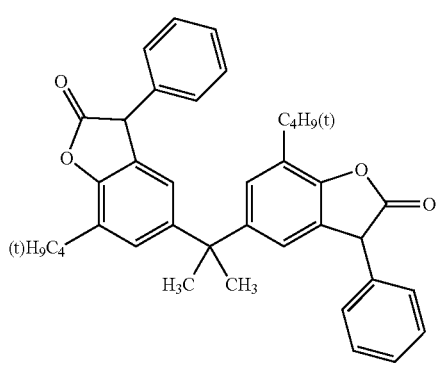
(5)-141
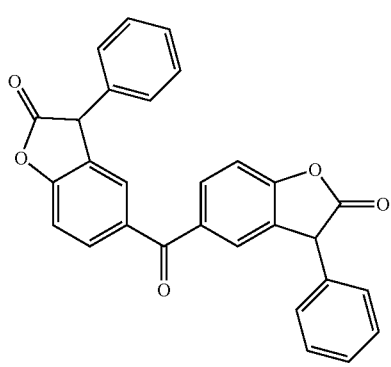

-continued
(5)-142
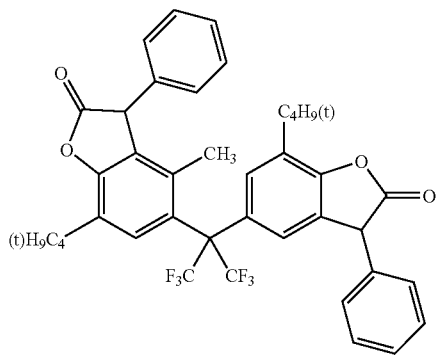
(5)-143
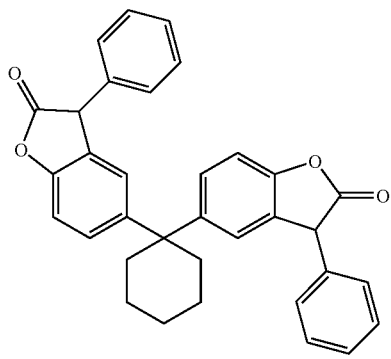
(5)-144
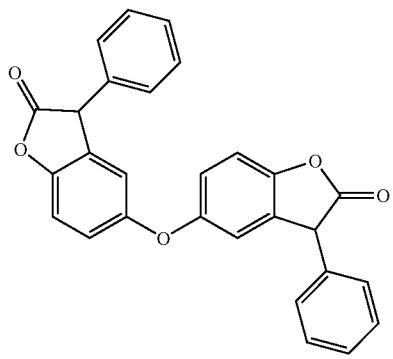
(5)-145
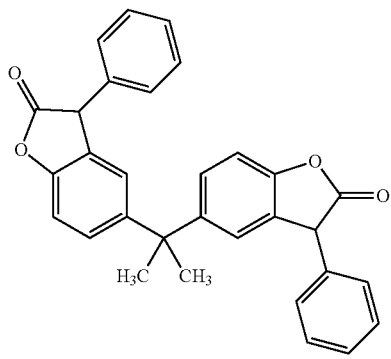
(5)-146
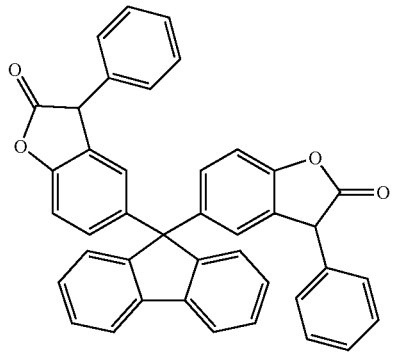
(5)-147
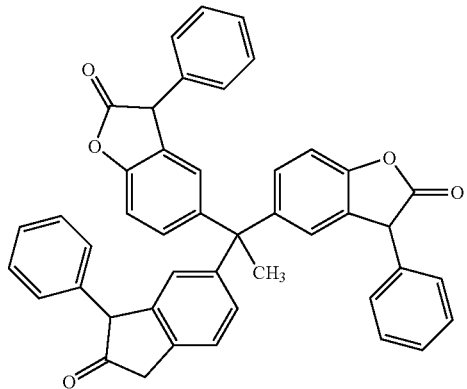
(5)-148
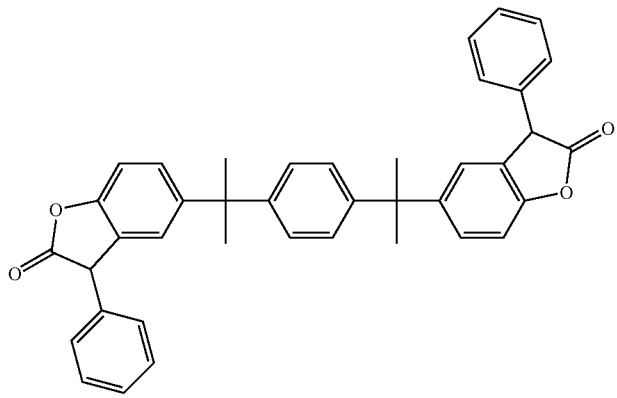

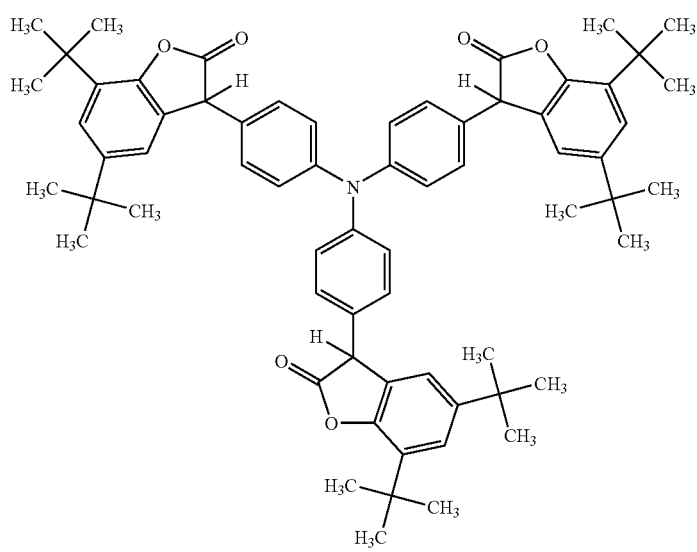

(5)-149

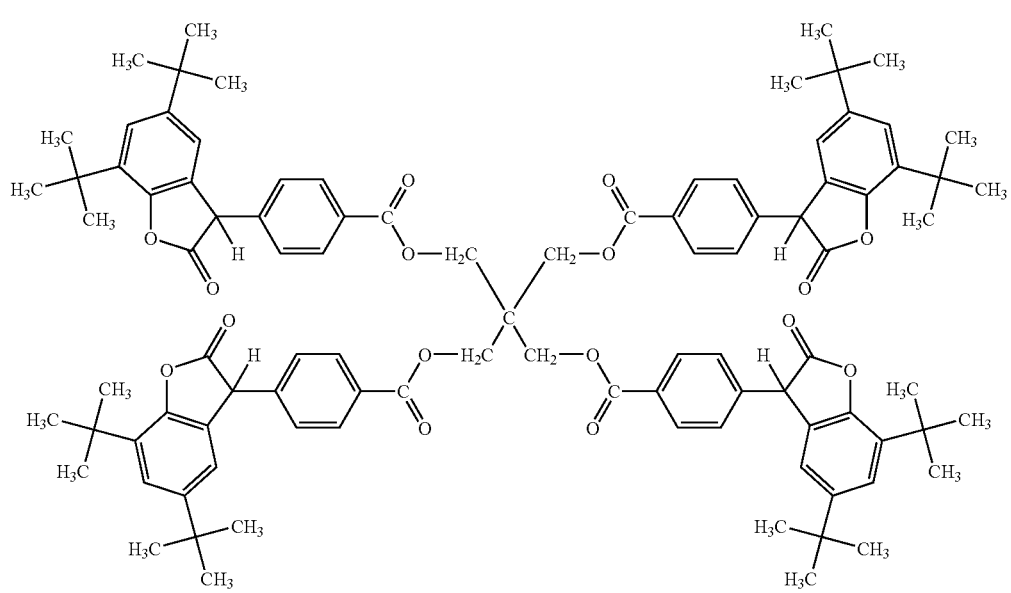

(5)-150

Next, the compound represented by the aforesaid Formula (6) will be specifically described, but the present invention is not limited to them.

Formula (6), $R_{41}$ represents a hydrogen atom or an alkyl group of 1 to 10 carbon atoms. Preferably, it is a hydrogen atom or an alkyl group of 1 to 4 carbon atoms. More preferably, it is a hydrogen atom or a methyl group.

$R_{42}$ and $R_{43}$ each independently represent an alkyl group of 1 to 8 carbon atoms. It may be a straight chain or a branched chain, and further, it may have a ring structure. $R_{42}$ and $R_{43}$ have preferably a quaternary carbon atom (*—$C(CH_3)_2$—R', provided that (*) indicates a position bonded to an aromatic ring and R' represents an alkyl group of 1 to 5 carbon atoms. $R_{42}$ is more preferably a tert-butyl group or a tert-amyl group. $R_{43}$ is more preferably a tert-butyl group, a tert-amyl group or a tert octyl group.

As commercially available compounds represented by the above Formula (6), SUMILIZER GM and SUMILAIZER GS (both of which are trade name, and produced by Sumitomo Chemical Co., Ltd.) are listed.

Specific examples of a compound represented by the above Formula (6) are illustrated below, but the present invention is not limited to them.

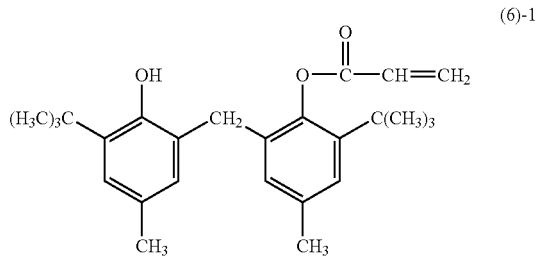

(6)-1

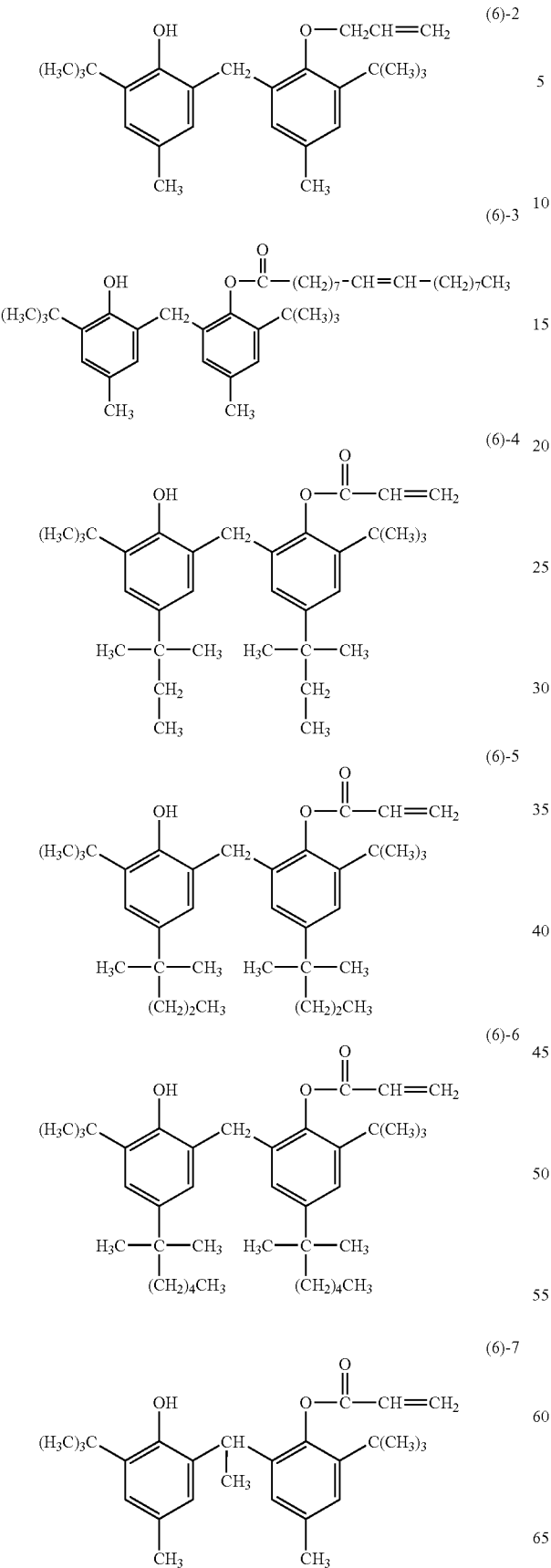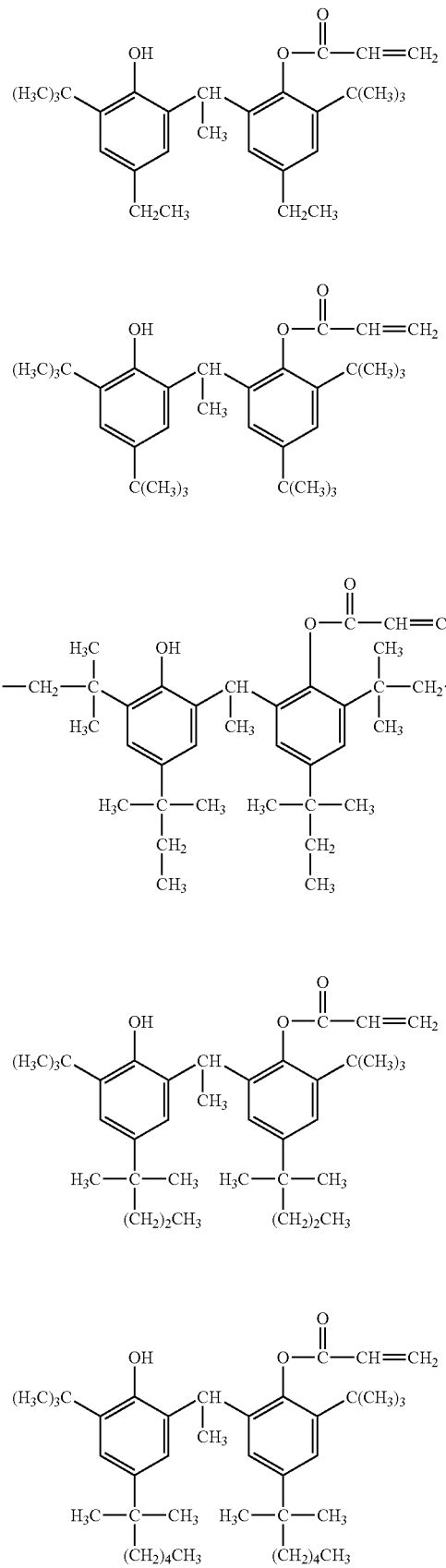

(6)-13

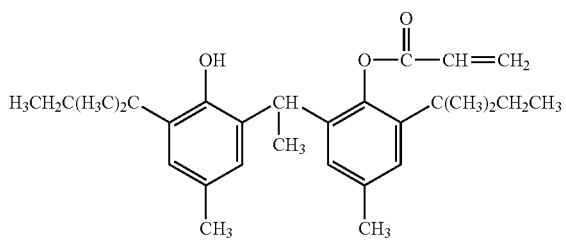

(6)-14

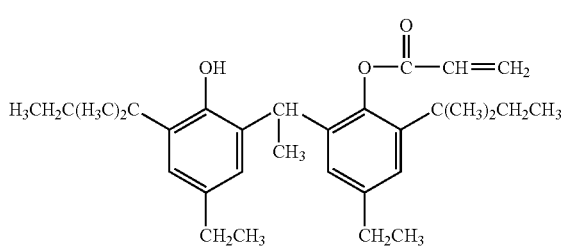

(6)-15

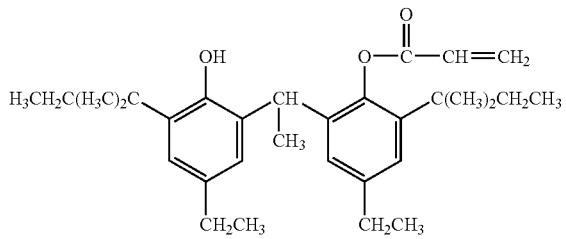

(6)-16

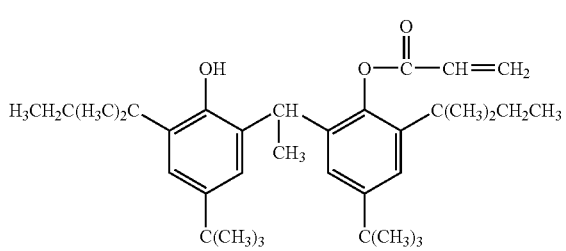

(6)-17

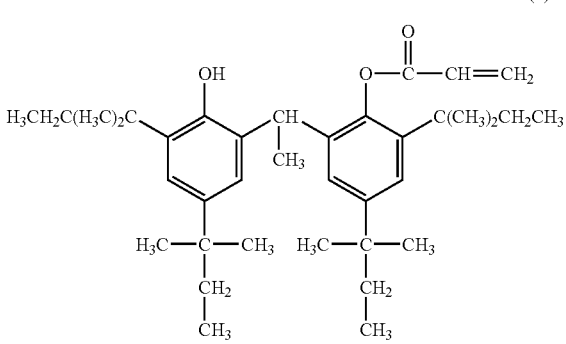

(6)-18

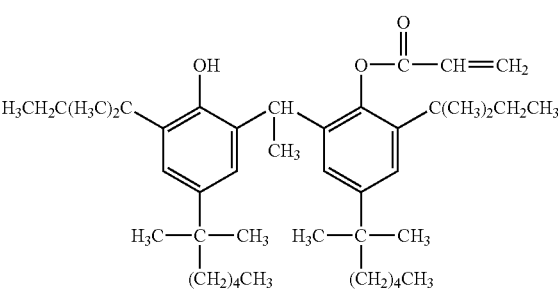

(Antioxidant)

Since decomposition of cellulose ester is accelerated not only by heat but also by oxygen, it is preferable to incorporate an antioxidant as a stabilizer in a polarizing plate protective film of the present invention.

Specifically, under a high temperature environment such as in a melt casting process, decomposition of the material for forming a cellulose ester film is accelerated by heat and oxygen, accordingly, an antioxidant is preferably incorporated in the film forming material.

In the present invention, it is also preferable to use an antioxidant in a suspension-washing process of cellulose ester using a poor solvent. Any antioxidant are employable without limitation, as far as the antioxidant contained in a poor solvent inactivates radicals generated in cellulose ester, or the antioxidant restrains deterioration of cellulose ester due to oxygen added to the generated radicals.

An antioxidant utilized in the suspension-washing of cellulose ester may remain in cellulose ester after washing. The remaining amount is preferably 0.01-2,000 ppm, more preferably 0.05-1,000 ppm and furthermore preferably 0.1-100 ppm.

As a useful antioxidant in the present invention, a compound which restrains deterioration of the material for forming a cellulose ester film due to oxygen can be utilized without limitation, however, examples of a useful compound include: a phenol type compound, a hindered amine compound, a phosphorus-containing compound, a sulfur-containing compound, an acrylate compound, a benzofuran compound and an oxygen scavenger. Specifically preferable among them are a phenol type compound, a hindered amine compound and a phosphorus-containing compound, an acrylate compound and a benzofuran compound. By blending such a compound, it is possible to prevent coloring and strength decrease of a cellulose ester film while keeping the transparency or heat resistance of the film. These antioxidants each can be utilized alone or in combination of two or more types.

(A Phenol Type Compound)

A phenol type compound is a compound well known in the art and is described, for example, in columns 12-14 of U.S. Pat. No. 4,839,405 including 2,6-dialkylphenol derivative compounds. Among these compounds, examples of a preferable compound include those represented by Formula (A).

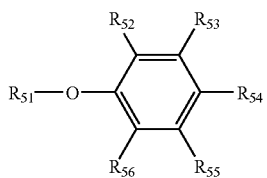

Formula (A)

In Formula (A), $R_{51}$-$R_{56}$ each represent a hydrogen atom or a substituent. Examples of the substituent include: a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamine group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amineoxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted.

Further, a phenol type compound in which $R_{51}$ is a hydrogen atom and $R_{52}$ and $R_{56}$ are a t-butyl group is preferable. Examples of the phenol type compound include: n-octadecyl-3-(3,5-di-t-butyl-4-hydroxyphenyl)propionate, n-octadecyl-3-(3,5-di-t-butyl-4-hydroxyphenyl)acetate, n-octadecyl-3,5-di-t-butyl-4-hydroxybenzoate, n-hexyl-3,5-di-t-butyl-4-hydroxyphenylbenzoate, n-dodecyl-3,5-di-t-butyl-4-hydroxyphenylbenzoate, neo-dodecyl-3-(3,5-di-t-butyl-4-hydroxyphenyl)propionate, dodecyl-β-(3,5-di-t-butyl-4-hydroxyphenyl)propionate, ethyl-α-(4-hydroxy-3,5-di-t-butylphenyl)isobutyrate, octadecyl-α-(4-hydroxy-3,5-di-t-butylphenyl)isobutyrate, octadecyl-α-(4-hydroxy-3,5-di-t-butyl-4-hydroxyphenyl)propionate, 2-(n-octylthio)ethyl-3,5-di-t-butyl-4-hydroxy-benzoate, 2-(n-octylthio)ethyl-3,5-di-t-butyl-4-hydroxyphenylacetate, 2-(n-octadecylthio)ethyl-3,5-di-t-butyl-4-hydroxyphenylacetate, 2-(n-octadecylthio)ethyl-3,5-di-t-butyl-4-hydroxybenzoate, 2-(2-hydroxyethylthio)-ethyl-3,5-di-t-butyl-4-hydroxybenzoate, diethylglycol-bis-(3,5-di-t-butyl-4-hydroxyphenyl)propionate, 2-(n-octadecylthio)ethyl-3,5-di-t-butyl-4-hydroxyphenyl)-propionate, stearamide-N,N-bis-[ethylene-3-(3,5-di-t-butyl-4-hydroxyphenyl)propionate], N-butylimino-N,N-bis-[ethylene-3-(3,5-di-t-butyl-4-hydroxyphenyl) propionate], 2-(2-stearoyloxyethylthio)ethyl-3,5-di-t-butyl-4-hydroxybenzoate, 2-(2-stearoyloxyethylthio)ethyl-7-(3-methyl-5-t-butyl-4-hydroxyphenyl)heptanoate, 1,2-propyleneglycol-bis-[3-(3,5-di-t-butyl-4-hydroxyphenyl) propionate], ethyleneglycol-bis-[3-(3,5-di-t-butyl-4-hydroxyphenyl)propionate], neopentylglycol-bis-[3-(3,5-di-t-butyl-4-hydroxyphenyl)propionate], ethyleneglycol-bis-(3,5-di-t-butyl-4-hydroxyphenylacetate), glycerol-1-n-octadecanoate-2,3-bis-(3,5-di-t-butyl-4-hydroxyphenylacetate), pentaerythritoltetrakis[3-(3',5'-di-t-butyl-4'-hydroxyphenyl)propionate], 1,1,1-trimethylolethane-tris-[3-(3,5-di-t-butyl-4-hydroxyphenyl) propionate], sorbitol-hexa-[3-(3,5-di-t-butyl-4-hydroxyphenyl)propionate], 2-hydroxyethyl-7-(3-methyl-5-t-butyl-4-hydroxyphenyl)propionate, 2-stearoyloxyethyl-7-(3-methyl-5-t-butyl-4-hydroxyphenyl)heptanoate, 1,6-n-hexanediol-bis-[(3',5'-di-butyl-4-hydroxyphenyl) propionate] and pentaerythritoltetrakis(3,5-di-t-butyl-4-hydroxyhydrocinnamate). Above phenol compounds have been commercialized, for example, as "Irganox1076" and "Irganox1010" from Ciba specialty Chemicals, Inc.

(Hindered Amine Compound)

In the present invention, a hindered amine compound represented by Formula (B) is preferably used as one of the useful antioxidants.

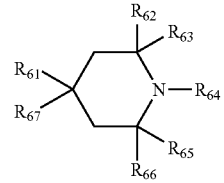

Formula (B)

In Formula (B), $R_{61}$-$R_{67}$ each represent a hydrogen atom or a substituent. Examples of the substituent are common to the substituents $R_{51}$-$R_{56}$ described for Formula (A). $R_{64}$ is preferably a hydrogen atom or a methyl group, $R_{67}$ is preferably a hydrogen atom and $R_{62}$, $R_{63}$, $R_{65}$ and $R_{66}$ each are preferably a methyl group.

Examples of a hindered amine compound include: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl)-2-(3,5-di-t-butyl-4-hydroxybenzyl)-2-butylmalonate, bis(1-acroyl-2,2,6,6-tetramethyl-4-piperidyl)-2,2-bis(3,5-di-t-butyl-4-hydroxybenzyl)-2-butylmalonate, bis(1,2,2,6,6-pentamethyl-4-piperidyl)decanedioate, 2,2,6,6-tetramethyl-4-piperidylmethacrylate, 4-[3-(3,5-di-t-butyl-4-hydroxyphenyl)propionyloxy]-1-[2-(3-(3,5-di-t-butyl-4- hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propioneamide, tetrakis(2,2,6,6-tetramethyl-4-piperidyl)-1,2,3,4-butanetetracarboxylate and tetrakis(1,2,2,6,6-pentamethyl-4-piperidyl)-1,2,3,4-butanetetracarboxylate.

Also, a polymer compound may be used. Examples of a polymer compound include: N,N',N'',N'''-tetrakis[4,6-bis-[butyl(N-methyl-2,2,6,6-tetramethylpiperidine-4-yl)amino]-triazine-2-yl]-4,7-diazadecane-1,10-diamine; a polycondensation compound of dibutylamine, 1,3,5-triazine-N,N'-bis(2,2,6,6-tetramethyl-4-piperidyl)-1,6-hexamethylenediamine and N-(2,2,6,6-tetramethyl-4-piperidyl)butylamine; a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; a polycondensation compound of 1,6-hexanediamine-N,N'-bis(2,2,6,6-tetramethyl-4-piperidyl) and morpholine-2,4,6-trichloro-1,3,5-triazine; a high molecular weight HALS in which plurality of piperidine rings are combined via a triazine moiety, such as poly[(6-morpholino-s-triazine-2,4-diyl)[(2,2,6,6-tetramethyl-4-piperidyl)imino]-hexamethylene [(2,2,6,6-tetramethyl-4-piperidyl)imino]]; a polymer of dimethyl succinate and 4-hydroxy-2,2,6,6-tetramethyl-1-piperidineethanol; and a compound in which a piperizine ring is combined via a ester bond, such as a mixed ester compound of 1,2,3,4-butanetetracarboxylic acid, 1,2,2,6,6-pentamethyl-4-piperizinol and 3,9-bis(2-hydroxy-1,1-dimethylethyl)-2,4,8,10-tetraoxaspiro[5,5]undecane, however, the present invention is not limited thereto.

Among these compounds, preferable are, for example, a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; and a polymer of dimethyl succinate and 4-hydroxy-2,2,6,6-tetramethyl-1-piperidine ethanol, which have a number average molecular weight (Mn) of 2,000-5,000.

Above hindered amine compounds have been commercialized, for example, as "Tinuvin144" and "Tinuvin770" from Ciba Specialty Chemicals, Inc.; and as "ADK STAB LA-52" from ADEKA Corp.

(Phosphorus-Containing Compound)

A compound having a substructure represented by Formula (C-1), (C-2), (C-3), (C-4) or (C-5) is preferably used as one of the preferable antioxidants in the present invention.

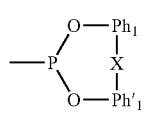

Formula (C-1)

In Formula (C-1), $Ph_1$ and $Ph'_1$ each represent a substituent. The substituent is the same as represented by $R_{51}$-$R_{56}$ in Formula (A). More preferably, $Ph_1$ and $Ph'_1$ each represent a phenylene group, and the hydrogen atom of the phenylene group may be substituted with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be mutually the same, or may be different. X represents a single bond, a sulfur atom, or a —$CHR_a$-group.

$R_a$ represents a hydrogen atom, an alkyl group having 1 to 8 carbon atoms, or a cycloalkyl group having 5 to 8 carbon atoms. Further, these groups may be substituted with one of the substituents which are common to the substituents $R_{51}$-$R_{56}$ described in Formula (A).

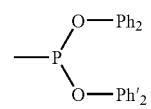

Formula (C-2)

In Formula (C-2), $Ph_2$ and $Ph'_2$ each represent one of the substituents which are common to the substituents represented by $R_{51}$-$R_{56}$ described in Formula (A). $Ph_1$ and $Ph'_1$ each represent a phenylene group or a biphenylene group, and the hydrogen atom of the phenylene group or the biphenylene group may be substituted with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_2$ and $Ph'_2$ may be mutually the same or may be different, and $Ph_2$ and $Ph'_2$ may further be substituted with one of the substituents which are common to the substituents represented by $R_{51}$-$R_{56}$ described in Formula (A).

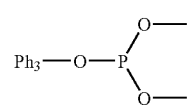

Formula (C-3)

In Formula (C-3), $Ph_3$ represents one of the substituents which are common to the substituents $R_{11}$-$R_{16}$ described in Formula (A). More preferably, $Ph_3$ represents a phenyl group or a biphenyl group. The hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms.

$Ph_3$ may further be substituted with one of the substituents which are common to the substituents $R_{51}$-$R_{56}$ described in Formula (A).

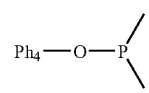

Formula (C-4)

In Formula (C-4), $Ph_4$ represents one of the substituents which are common to the substituents $R_{51}$-$R_{56}$ described in Formula (A). More preferably, $Ph_4$ represents an alkyl group or a phenyl group each having 1 to 20 carbon atoms. The alkyl group or the phenyl group may further be substituted with one of the substituents which are common to the substituents $R_{51}$-$R_{56}$ described in Formula (A).

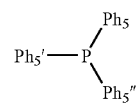

Formula (C-5)

In Formula (C-5), $Ph_5$, $Ph'_5$, and $Ph''_5$ each represent a substituent. Examples of the substituents are common to the substituents $R_{51}$-$R_{56}$ described in Formula (A). More preferably, $Ph_5$, $Ph'_5$, and $Ph''_5$ each represent an alkyl group or a phenyl group each having 1 to 20 carbon atoms. The alkyl group or the phenyl group may further be substituted with one of the substituents which are common to the substituents $R_{51}$-$R_{56}$ described in Formula (A).

Specific examples of a phosphorus-containing compound include: mono-phosphite compounds such as triphenyl phosphate, diphenylisodecyl phosphate, phenyldiisodecyl phosphate, tris(nonylphenyl)phosphate, tris(dinonylphenyl)phosphate, tris(2,4-di-t-butylphenyl)phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepin and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl (C12-C15) phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl)[1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl)phosphine.

Examples of above-mentioned commercially available phosphorus-containing compounds include: "Sumilizer GP" from Sumitomo Chemical Co., Ltd.; "ADK STAB PEP-24", "ADK STAB PEP-36" and "ADK STAB 3010" from ADEKA Corp.; "IRGAFOS P-EPQ" from Ciba Specialty Chemicals, Inc.; and GSY-P101 from SAKAI CHEMICAL INDUSTRY CO., LTD.

(Sulfur-Containing Compound)

In the present invention, a sulfur-containing compound represented by Formula (D) is preferably used as one of the useful antioxidants.

$$R_{71}\text{—S—}R_{72} \quad \text{Formula (D)}$$

In Formula (D), $R_{71}$ and $R_{72}$ each represent one of the substituents which are common to the substituents $R_{51}$-$R_{56}$ described in Formula (A).

Examples of a sulfur-containing compound include: dilauryl-3,3-thio-dipropionate, dimyristyl-3,3'-thiodipropionate, distearyl-3,3-thio-dipropionate, laurylstearyl-3,3-thio-dipropionate, pentaerythritol-tetrakis (β-lauryl-thio-propionate), 3,9-bis(2-dodecylthioethyl)-2,4,8,10-tetra-oxaspiro[5,5]undecane.

The above sulfur-containing compounds have been commercialized, for example, as "Sumilizer TPL-R" and "Sumilizer TP-D" from Sumitomo Chemical Co., Ltd.

Similarly to the case of the aforementioned cellulose ester, the antioxidant is preferably treated to remove the impurities such as residual acid, inorganic salt and organic low-molecule compound that have been carried over from the process of manufacturing, or that have occurred during preservation. The antioxidant has more preferably a purity of 99% or more. The amount of residual acid and water is preferably 0.01 through 100 ppm. This reduces thermal deterioration in the melt-casting film formation of the cellulose ester, and improves the film formation stability, film optical property and mechanical property.

The adding amount of the antioxidant is preferably 0.1-10% by weight, more preferably 0.1-5% by weight, and still more preferably 0.2-2% by weight, based on the weight of cellulose ester. Two or more types of antioxidants may be used in combination.

When the amount of the antioxidant to be added is too small, expected advantages cannot be achieved due to lower stabilizing effect at the time of melting. When the amount to be added is too much, transparency of the film may be reduced from the viewpoint of compatibility with the cellulose ester, and the film may become brittle, which is not preferred.

(Acid Scavengers)

At the relatively high temperature at which melt-casting is performed, decomposition of cellulose esters is also accelerated by the presence of acids, whereby it is preferable that the cellulose ester film of the present invention incorporates acid scavengers as a stabilizer. Acid scavengers in the present invention may be employed without any limitation, as long as they are compounds which react with acids to inactivate them. Of such compounds, preferred are compounds having an epoxy group, as described in U.S. Pat. No. 4,137,201. Epoxy compounds as such an acid scavenger are known in this technical field, and include diglycidyl ethers of various polyglycols, especially, polyglycols which are derived by condensation of ethylene oxides in an amount of about 8-about 40 mol per mol of polyglycol, metal epoxy compounds (for example, those which have conventionally been employed together with vinyl chloride polymer compositions in vinyl chloride polymer compositions), epoxidized ether condensation products, diglycidyl ethers (namely, 4,4'-dihydroxydiphenyldimethylmethane) of bisphenol A, epoxidized unsaturated fatty acid esters (particularly, alkyl esters (for example, butyl epoxystearate) having about 2-about 4 carbon atoms of fat acids having 2-22 carbon atoms), epoxidized plant oils which can be represented and exemplified by compositions of various epoxidized long chain fatty acid triglycerides (for example, epoxidized soybean oil and epoxidized linseed oil and other unsaturated natural oils (these are occasionally called epoxidized natural glycerides or unsaturated fatty acid and these fatty acid have 12-22 carbon atoms). Further, preferably employed as commercially available epoxy group incorporating epoxide resinous compounds may be EPSON 815C and other epoxidized ether oligomer condensation products represented by Formula (E).

Formula (E)

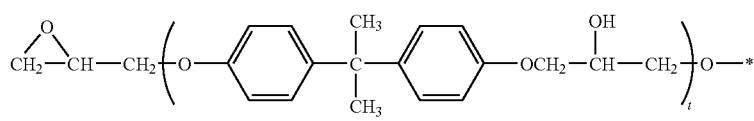

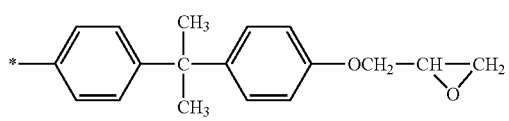

-continued

In Formula (E), t represent an integer of 0-12. Other usable acid scavengers include those described in paragraphs 87-105 of JP-A No. 5-194788.

The added amount of acid scavengers is preferably 0.1-10 percent by weight, but is more preferably 0.2-2 percent by weight, and it is still more preferably 0.5-2 percent by weight. These may be employed in combination of two or more types.

Further, acid scavengers may also be called acid catchers or other names, but in the present invention, it is possible to use them regardless name.

<Metal Deactivators>

A metal deactivator is a compound which acts as an initiator or a catalyst in oxidation reaction. Examples of a metal deactivator include: a hydrazine compound, an oxalic acid diamide compound and a triazole compound. Specific examples are: N,N'-bis[3-(3,5-di-t-butyl-4-hydroxyphenyl) propionyl]hydrazine, 2-hydroxyethyl oxalic acid diamide, 2-hydroxy-N-(1H-1,2,4-triazole-3-yl)benzamide, and N-(5-t-butyl-2-ethoxyphenyl)-N'-(2-ethylphenyl)oxalic acid diamide.

In the present invention, a metal deactivator may be added. The added amount of a metal deactivator is preferably 0.0002-2 percent based on the weight of the cellulose ester of the present invention. It is more preferably 0.0005-2 percent by weight, and it is still more preferably 0.001-1 percent by weight. These may be employed in combination of two or more types.

(UV Absorbers)

In view of minimizing degradation of polarizers and display units due to ultraviolet radiation, UV absorbers, which absorb ultraviolet radiation of a wavelength of at most 370 nm, are preferred, while in view of liquid crystal display properties, UV absorbers, which minimize absorption of visible light of a wavelength of at least 400 nm, are preferred. Examples of UV absorbers employed in the present invention include oxybenzophenone based compounds, benzotriazole based compounds, salicylic acid ester based compounds, benzophenone based compounds, cyanoacrylate based compounds, nickel complex based compounds, and triazine based compounds. Of these, preferred are benzophenone based compounds, as well as benzotriazole based compounds and triazine compounds which result in minimal coloration. Further, employed may be UV absorbers described in JP-A Nos. 10-182621 and 8-337574, as well as polymer UV absorbers described in JP-A Nos. 6-148430 and 2003-113317.

Specific examples of benzotriazole UV absorbers include, but are not limited to, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, and 2-(2H-benzotriazole-2-yl)-6-(straight chain and branched chain dodecyl)-4-methylphenol, as well as a mixture of octyl-3-[3-tert-butyl-4-hydroxy-5-(chloro-2H-benzotriazole-2-yl)phenyl]propionate and 2-ethylhexyl-3-[3-tert-butyl-4-hydroxy-5-(5-chloro-2H-benzotriazole-2-yl)phenyl]propionate.

Listed as such commercially available products are TINUVIN 171, TINUVIN 900, TINUVIN 928, and TINUVIN 360, (all produced by Ciba Specialty Chemicals Co.), LA 31 (produced by Asahidenka Co. Ltd.) and RUVA-100 (produced by Otsuka Chemical. Co. Ltd.)

Specific examples of benzophenone compounds include, but are not limited to, 2,4-dihydroxybenzophenone, 2,2'-dihydroxy-4-methoxybenzopheneone, 2-hydroxy-4-methoxy-5-sulfobenzophenone, and bis(2-methoxy-4-hydroxy-5-benzoylphenylmethane).

In the present invention, the added amount of UV absorbers based on the weight of cellulose ester is preferably 0.1-5 percent by weight, it is more preferably 0.2-3 percent by weight, but it is still more preferably 0.5-2 percent by weight. These may be employed in combination of two or more compounds.

Also, these benzotriazole structure or benzophenone structure may be partially or regularly pendant to a polymer, or may be introduced in a part of the molecular structure of an additive such as a plasticizer, an antioxidant or an acid scavenger.

As conventionally known UV absorbing polymers, although they are not specifically limited, for example, a homopolymer obtained by polymerizing RUVA-93 (produced by OTSUKA Chemical Co., Ltd.) or a copolymer obtained by polymerizing RUVA-93 and other polymer are cited. Specifically, cited are, for example, RUVA-30M obtained by copolymerizing RUVA-93 and methylmethacrylate in a weight ratio of 3:7 and RUVA-50M obtained by copolymerizing RUVA-93 and methylmethacrylate in a weight ratio of 5:5. Further cited are polymers disclosed in JP-A No. 2003-113317.

<<Plasticizer>>

In the cellulose ester film of the present invention, at least one plasticizer may be further added in addition to the two compounds represented by Formula (1) in which the number of hydroxyl groups differ from each other.

In the present invention, examples of such additional plasticizer include: an ester plasticizer derived from a polyhydric alcohol and a mono-valent carboxylic acid; and an ester plasticizer derived from a polyvalent carboxylic acid and a mono-valent alcohol. These ester plasticizers are preferable because they have high affinity to the cellulose ester.

Examples of the preferred polyalcohol include: adonitol, arabitol, ethylene glycol, glycerin, di glycerin, diethylene glycol, triethylene glycol, tetraethylene glycol, 1,2-propanediol, 1,3-propanediol, dipropyrene glycol, tripropyrene glycol, 1,2-butanediol, 1,3-butanediol, 1,4-butanediol, and dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethyloipropane, ditrimethylolpropane, trimethylolethane, pentaerythritol, di pentaerythritol and xylitol. In particular, ethylene glycol, glycerin and trimethylolpropane are preferable.

As an ethylene glycol ester based plasticizer which is one of the polyhydric alcohol ester series, specifically listed may be ethylene glycol alkyl ester based plasticizers such as ethylene glycol diacetate or ethylene glycol dibutyrate; ethylene glycol cycloalkyl ester based plasticizers such as ethylene glycol dicyclopropylcarboxylate or ethylene glycol dicyclohexylcarboxylate; and ethylene glycol aryl ester based plasticizers such as ethylene glycol dibenzoate or ethylene glycol di-4-methyl benzoate. These alkylate group, cycloalkylate group, and arylate group may be the same or different, and may further be substituted. Further, the alkylate group, the cycloalkylate group, and the arylate group may be employed in combination, and these substituents may be bonded to each other via a covalent bond. Still further, the ethylene glycol portion may be substituted, and the partial structure of ethylene glycol esters may be a part of a polymer or may be subjected to regular pendant, and may be introduced to one part of the molecular structure of additives such as an antioxidant, an acid scavenger, or a UV absorber.

As a glycerin ester based plasticizer which is one of the polyhydric alcohol ester series, specifically listed may be glycerin alkyl esters such as triacetin, tributyrin, glycerin diacetate caprylate, or glycerin oleate propionate; glycerin cycloalkyl esters such as glycerin tricyclopropylcarboxylate or glycerin tricyclohexylcarboxylate; glycerin aryl esters such as glycerin tribenzoate or glycerin 4-methylbenzoate; diglycerin alkyl esters such as diglycerin tetraacetylate, diglycerin tetrapropionate, diglycerin acetate caprylate, or diglycerin tetralaurate; diglycerin cycloalkyl esters such as diglycerin tetracyclobutylcarboxylate or diglycerin tetracyclopentylcarboxylate; and diglycerin aryl esters such as diglycerin tetrabenzoate or diglycerin 3-methyl benzoate. These alkylate group, cycloalkylcarboxylate group, and arylate group may be the same or different and may further be substituted. Further, the alkylate group, the cycloalkylcarboxylate group, and the arylate group may be employed in combination, and these substituents may be bonded to each other via a covalent bond. Still further, the glycerin and diglycerin portion may be substituted, and the partial structure of glycerin esters and diglycerin esters ethylene may be a part of a polymer or may be subjected to regular pendant, and may be introduced to one part of the molecular structure of additives such as an antioxidant, an acid scavenger, or a UV absorber.

As other polyhydric alcohol ester based plasticizers specifically listed are polyhydric alcohol ester based plasticizers, described in paragraphs 30-33 of JP-A 2003-12823.

These alkylate group, cycloalkylcarboxylate group, and arylate group may be the same or different and may further be substituted. Further, the alkylate group, the cycloalkylcarboxylate group, and the arylate group may be employed in combination, and these substituents may be bonded to each other via a covalent bond. Still further, the polyhydric portion may be substituted, and the partial structure of polyhydric alcohol may be a part of a polymer or may be subjected to regular pendant, and may be introduced to one part of the molecular structure of additives such as an antioxidant, an acid scavenger, or a UV absorber.

Of ester based plasticizers composed of the above polyhydric alcohol and monohydric carboxylic acid, preferred are alkyl polyhydric alcohol aryl esters, and specifically listed are above ethylene glycol dibenzoate, glycerin tribenzoate, and exemplified compound 16 described in paragraph 31 of JP-A No. 2003-12823.

As a dicarboxylic acid ester based plasticizer which is one of the polyhydric carboxylic acid esters, specifically listed are alkyl dicarboxylic acid alkyl ester based plasticizers such as didodecyl malonate, dioctyl adipate, or dibutyl sebacate; alkyl dicarboxylic acid cycloalkyl ester based plasticizers such as dicyclopentyl succinate or dicyclohexyl adipate; alkyl dicarboxylic acid aryl ester based plasticizers such as diphenyl succinate or di4-methylphenyl glutarate; cycloalkyl dicarboxylic acid alkyl ester based plasticizers such as dihexyl-1,4-cyclohexane dicarboxylate, didecylbicyclo[2.2.1]heptane-2,3-dicarboxylate; cycloalkyl dicarboxylic acid cycloalkyl ester based plasticizers such as dicyclohexyl-1,2-cyclobutane dicarboxylate or dicyclopropyl-1,2-cyclohexyldicarboxylate; cycloalkyl dicarboxylic acid aryl ester based plasticizers such as diphenyl(1-1,1-cyclopropyldicarboxylate) or di2-naphthyl-1,4 cyclohexane dicarboxylate; aryl dicarboxylic acid alkyl ester based plasticizers such as diethyl phthalate, dimethyl phthalate, dioctyl phthalate, dibutyl phthalate or di-2-methylhexyl phthalate; aryl dicarboxylic acid cycloalkyl ester based plasticizers such as dicyclopropyl phthalate or dicyclohexyl phthalate; and aryl dicarboxylic acid aryl ester based plasticizers such as diphenyl phthalate or di4-methylphenyl phthalate. These alkoxy group and cycloalkoxy group may be the same or different. Further, these may be mono-substituted or poly-substituted. The alkyl group and the cycloalkyl group may be employed in combination, and these substituents may be bonded to each other via a covalent bond. Further, the aromatic ring of phthalic acid may be substituted, and their polymers such as a dimer, a trimer, or a tetramer may be employed. Further, the partial structure of phthalic acid esters may be a part of a polymer or may be subjected to regular pendant, and may be introduced to one part of the molecular structure of additives such as an antioxidant, an acid scavenger, or a UV absorber.

As other polyhydric carboxylic acid esters, specifically listed are alkyl polyhydric carboxylic acid alkyl ester based plasticizers such as tridecyl tricarbarate, tributyl-meso-butane, or 1,2,3,4-tetracarboxylate; alkyl polyhydric carboxylic acid cycloalkyl ester plasticizers such as tricyclohexyl tricarbarate or tricyclopropyl-2-hydroxy-1,2,3-propane tricarboxylate; alkyl polyhydric carboxylic acid aryl ester based plasticizers such as triphenyl 2-hydroxy-1,2,3-propane tricarboxylate or tetra3-methylphenyl tetrahydrofuran-2,3,4,5-tetracarboxylate; cycloalkyl polyhydric carboxylic acid alkyl ester based plasticizers such as tetrahexyl-1,2,3,4-cyclobutane tetracarboxylate or tetrabutyl-1,2,3,4-cyclopentane tetracarboxylate; cycloalkyl polyhydric carboxylic acid cycloalkyl ester based plasticizers such as tetracyclopropyl-1,2,3,4-cyclobutane tetracarboxylate or tricyclohexyl-1,3,5-cyclohexyltricarboxylate; cycloalkyl polyhydric carboxylic acid aryl ester based plasticizers such as triphenyl-1,3,5-cyclohexyltricarboxylate or hexa4-methylphenyl-1,2,3,4,5,6-cyclohexylhexacarboxylate; aryl polyhydric carboxylic acid alkyl ester based plasticizers such as tridodecylbenzine-1,2,4-tricarboxylate or tetraoctylbenzene-1,2,4,5-tetracarboxylate; aryl polyhydric carboxylic acid cycloalkyl ester based plasticizers such as tricyclopentylbenzene-1,2,3,5-tricarboxylate or tetracyclohexylbenzene-1,2,3,5-tetracarboxylate; and aryl polyhydric carboxylic acid aryl ester based plasticizers such as triphenylbenzene-1,2,3,4,5-tetracarboxylate or hexa(4-methylphenylbenzene-1,2,3,4,5,6-hexacarboxylate). These alkoxy group and cycloalkoxy group may be the same or different. Further, these may be mono-substituted or poly-substituted. The alkyl group and the cycloalkyl group may be employed in combination, and these substituents may be bonded to each other via a covalent bond. Further, the aromatic ring of phthalic acid may be substituted, and their polymers such as a dimer, a trimer, or a tetramer may be usable. Further, the partial structure of phthalic acid esters may be a part of a polymer or may be subjected to regular pendant, and may be introduced to one part of the molecular structure of additives such as an antioxidant, an acid scavenger, or a UV absorber.

Of ester based plasticizers composed of the aforesaid polyhydric carboxylic acid and monohydric alcohol, preferred are alkyldicarboxylic acid alkyl esters, and specifically listed is the aforesaid dioctyl adipate.

As other plasticizers which are preferably employed in the present invention, listed are polymer plasticizers.

As polymer plasticizers, specifically listed are aliphatic hydrocarbon based polymers; alicyclic hydrocarbon based polymers; acryl based polymers such as a copolymer of ethyl polyacrylate, methyl polymethacrylate, or methyl methacrylate with methacrylic acid-2-hydroxyethyl or a copolymer of methyl acrylate with methacrylic acid-2-hydroxyethyl; vinyl based polymers such as polyvinyl isobutyl ether or poly(N-vinylpyrrolidone); styrene based polymers such as polystyrene or poly(4-hydroxystyrene); polyesters such as polybutylene succinate, polyethylene terephthalate, or polyethylene naphthalate; and polyether such as polyethylene oxide or polypropylene oxide as well as polyamide, polyurethane and polyurea. Number average molecular weight is preferably about 1,000-about 500,000, but is most preferably 5,000-200,000. These polymer plasticizers may be homopolymers composed of repeated units of one type or copolymers having a plurality of repeated structures. Further, the aforesaid polymers may be employed in combinations of at least two types.

The added amount of the other plasticizers is commonly 0.1-50 parts by weight with respect to 100 parts by weight of the cellulose esters, is preferably 1-30 parts by weight, but is more preferably 3-15 parts by weight.

In the cellulose ester film according to the present invention, it is preferable that as the other plasticizers, ester based plasticizers composed of polyhydric alcohol and monohydric carboxylic acid and ester based plasticizers composed of polyhydric carboxylic acid and monohydric alcohol are incorporated in an amount of 1-25% by weight. Further, plasticizers other than the above may simultaneously be employed.

In the cellulose ester film according to the present invention, as other plasticizers more preferred are ester based plasticizers composed of polyhydric alcohol and monohydric carboxylic acid. Ester based plasticizers composed of tri- or higher hydric alcohol and monohydric carboxylic acid are most preferred because those are characterized with higher compatibility to cellulose esters and possibility of addition of a higher addition ratio, resulting in no bleeding, whereby, if desired, it is possible to easily simultaneously employ other types of plasticizers and additives.

In the film for a display of the present invention, coloration of the film affects the optical property of the film. Accordingly, the yellow index YI of the film is preferably 3.0 ore less, and more preferably 1.0 or less. The yellow index can be determined according to the method of JIS-K7103.

(Matting Agents)

In order to provide aimed slip properties, as well as to optical and mechanical functions, it is possible to incorporate matting agents into the cellulose ester film of the present invention. Listed as such matting agents are minute particles of inorganic or organic compounds.

Preferably employed matting agents are spherical, rod-shaped, acicular, layered and tabular. Listed as matting agents are, for example, metal oxides such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate; minute inorganic particles composed of phosphoric acid salts, silicic acid salts, or carbonic acid salts; and minute crosslinking polymer particles. Of these, silicon dioxide is preferred due to a resulting decrease in film haze. It is preferable that these minute particles are subjected to a surface treatment, since it is possible to lower the film haze.

It is preferable to carry out the above surface treatment employing halosilanes, alkoxysilanes, silazane, or siloxane. As the average diameter of minute particles increases, slipping effects are enhanced. On the other hand, as it decreases, the resulting transparency increases. Further, the average diameter of the primary particles of the minute particles is customarily in the range of 0.01-1.0 μm, is preferably 5-50 nm, but is more preferably 7-14 nm. These minute particles are preferably employed to result in unevenness of 0.01-1.0 μm of the cellulose ester film surface.

Listed as minute silicon dioxide particles are AEROSIL 200, 200V, 300, R972, R974, R202, R812, OX50, and TT600, all produced by Nihon Aerosil Corp. Of these, preferred are AEROSIL 200V, R972, R972V, R974, R202, and R812. Combination of two types of particles or more may be used.

When two types of the above are employed in combination, they may be mixed at an optional ratio and then employed. It is possible to use minute particles which differ in their average particle diameter and materials, such as AEROSIL 200V and R972V at a ratio of between 0.1:99.9 and 99.9:0.1 in terms of weight ratio.

These matting agents are added employing a method in which they are kneaded. Another method is that matting agents are previously dispersed and the resulting dispersion is blended with cellulose ester and/or plasticizers and/or UV absorbers. Thereafter, the resulting mixture is dispersed and subsequently solids are obtained by vaporizing the solvents or by performing precipitation. The resulting product is preferably employed in the production process of a cellulose ester melt since it is possible to uniformly disperse the matting agents into cellulose resins.

It is possible to incorporate the above matting agents to improve mechanical, electrical, and optical characteristics.

As the added amount of these minute particles increases, the slipping properties of the resultant cellulose ester film are enhanced, while haze increases. The content is preferably 0.001-5 percent by weight, is more preferably 0.005-1 percent by weight, but is still more preferably 0.01-0.5 percent by weight.

The haze value of the cellulose ester film of the present invention is preferably at most 1.0 percent, but is more preferably at most 0.5 percent, since optical materials at a haze value of at least 1.0 percent result in adverse effects. It is possible to determine the haze value based on JIS K 7136.

In the melting casting film making process, the film constituting material is required to produce only a small amount of volatile component or no volatile component at all. This is intended to reduce or avoid the possibility of foaming at the time of heating and melting, thereby causing a defect inside the film or deterioration in the flatness on the film surface.

When the film constituting material is melted, the percentage of the volatile component content is required 1 percent by mass or less, preferably 0.5 percent by mass or less, more preferably 0.2 percent by mass or less, still more preferably 0.1 percent by mass or less. In the embodiment of the present invention, reduction in heating from 30° C. to 250° C. is measured and calculated using a differential thermogravimetric analyzer (TG/DTA200 by Seiko Electronic Industry Co., Ltd.). This amount is used to represent the amount of the volatile component contained.

Before film formation or at the time of heating, the aforementioned moisture and volatile component represented by the aforementioned solvent is preferably removed from the film constituting material to be used. It can be removed according to a known drying technique. Heating technique, reduced pressure technique or heating/pressure reduction technique can be utilized. The removing operation can be done in the air or under the atmosphere where nitrogen is used as an inert gas. When the aforementioned known drying technique is used, the temperature should be in such a range that the film constituting material is not decomposed. This is preferred to maintain satisfactory film quality.

Drying before formation of a film reduces the possibility of volatile components being generated. It is possible to dry the resin singly or to dry after separation into a mixture or compatible substance between the resin and at least one of the film constituting materials other than resin. The drying temperature is preferably 70° C. or more. If the material to be dried contains a substance having a glass transition temperature, the material may be welded and may become difficult to handle when heated to the drying temperature higher than the glass transition temperature thereof. Thus, the drying temperature is preferably below the glass transition temperature. If a plurality of substances have glass transition temperatures, the lower glass transition temperature is used as a standard. This temperature is preferably 70° C. or more without exceeding (glass transition temperature −5)° C., more preferably 110° C. or more without exceeding (glass transition temperature −20)° C. The drying time is preferably 0.5 through 24 hours, more preferably 1 through 18 hours, still more preferably 1.5 through 12 hours. If the drying temperature is too low, the volatile component removal rate will be reduced and the drying time will be prolonged. Further, the drying process can be divided into two steps. For example, the drying process may contain the steps; a preliminary drying step for material storage and an immediately preceding drying step to be implemented immediately before film formation through one week before film formation.

<<Melt-Casting Method>>

The cellulose ester film of the present invention is preferably molded via a melt-casting method. A molding method via melt-casting while heat-melted without employing solvents (for example, methylene chloride), which are employed in a solution-casting method, may be classified in more detail to a melt-extrusion molding method, a press molding method, an inflation method, an ejection molding method, a blow-molding method, and a stretch-molding method. Of these, in order to prepare a polarized plate protective film which excels in mechanical strength and surface accuracy, the melt-extrusion method is superior. When physical properties of the resulting film are considered, the melting temperature is preferably in the range of 120° C. 280° C., is more preferably in the range of 230° C.-275° C., is furthermore preferably in the range of 240° C.-270° C., but is most preferably 245° C.-265° C.

Namely, cellulose ester, which is employed as a raw material, is molded into powder or pellets, followed by hot air or vacuum drying, then heat-melted together with film composing materials to result in fluidity, and then melt-extruded followed by melt-extrusion in the form of sheet from a T die. Subsequently, close contact is carried out on the cooling drum or looped belt via, for example, an electrostatic application method, followed by solidification via cooling, whereby a sheet, which has not yet been stretched, is prepared. It is preferable that the cooling drum temperature is maintained in the range of 90-150° C.

It is preferable that the resulting film, which has been peeled from the cooling drum, is again heated via heating devices such as one roller or a plurality of rollers and/or an infrared ray heater, and then stretched in the longitudinal direction via single or multi-step stretching, followed by cooling. During the above process, when the glass transition temperature of the film of the present invention is designated as Tg, it is preferable that the film is heated preferably in the range of (Tg−30)-(Tg+100)° C., but more preferably in the range of (Tg−20)-(Tg+80)° C. and then stretched in the conveyed direction (machine direction: MD) or the transverse direction (TD). It is further preferable that stretching in the transverse direction is carried out in the range of (Tg−20)-(Tg+20)° C., followed by thermal fixing. It is also preferable that after the stretching process, a relaxation treatment is carried out.

It is possible to control Tg of a cellulose ester film via the film composing materials and the composing material ratio. In applications of the present invention, Tg of films is preferably at least 120° C. but is more preferably at least 135° C. Reasons are that when the cellulose ester film of the present invention is employed in a liquid crystal display device, in the case in which Tg of the aforesaid film is lower than the above, the orientation state of molecules fixed in the film interior is affected by the ambient temperature during use and backlight heat, whereby possibility increases to result in significant variation of retardation values as well as dimensional stability and the shape as a film. Adversely, when Tg of the aforesaid film is excessively high, the resulting Tg approaches the decomposition temperature of film composing materials, resulting in difficulty of film preparation, whereby occasionally, volatile components due to decomposition of material themselves are generated and coloration results. Accordingly, the temperature is preferably at most 200° C. but is more preferably at most 170° C. During the above operation, it is possible to determine Tg of films via the method described in JIS K 7121.

In the case of lateral stretching (transverse direction: TD), it is preferable that lateral stretching is carried out in stretching region which is divided into at least two zones while elevating the temperature so that the temperature difference is within the range of 1-50° C., since it is thereby possible to narrow the distribution of the physical properties in the lateral direction. Further, it is preferable that after the lateral stretching, the film is maintained in the range of at most the final lateral stretching temperature—at least Tg−40° C. over 0.01-5 minutes, since thereby the distribution of physical properties in the lateral direction is further narrowed.

Thermal fixing is carried out in the range of at least final lateral stretching temperature—at most Tg−20° C. over 0.5-300 seconds. During the above operation, it is preferable that the thermal fixing is carried out in the region which is divided into at least two, while sequentially increasing temperature within the temperature range of 1-100° C.

The thermally fixed film is commonly cooled to at most Tg and wound while the grip holding portion of both film edges is trimmed. During the above operation, it is preferable that a relaxation treatment of by 0.1-10% is carried out in the lateral direction and/or the longitudinal direction in the temperature range of at most the final thermal fixing temperature-at least Tg. Further, it is preferable that gradual cooling is carried out at a cooling rate of at most 100° C. per second from the final thermal fixing temperature to Tg. Means for cooling and the relaxation treatment are not particularly limited and conventional means are usable. However, in view of enhancement of dimensional stability of the film, it is preferable that these treatments are carried out while the film is sequentially cooled in a plurality of temperature regions. The cooling rate is the value obtained via (T1−T2)/t, wherein T1 is the final thermal fixing temperature and t is the duration until the film reaches T2 from the final thermal fixing temperature.

Since optimal conditions of these thermal fixing, and cooling and relaxation differ depending on the cellulose esters which compose the film, appropriate conditions may be determined by measuring physical properties of the resulting biaxially stretched film so that desired characteristics are attained.

The preferable stretching factor of cellulose ester films is 1.01-3.00 in the longitudinal direction as well as in the lateral direction. The stretching factor is more preferably 1.01-2.50, but is most preferably 1.01-2.00. Thereby, it is possible to simultaneously prepare a cellulose ester film which excels in optical isotropy and results in tar flatness. It is preferable that width holding or stretching in the lateral direction is carried out via a tenter, and either a pin tenter or a clip tenter may be employed.

When a retardation film is prepared, it is possible to prepare an optically anisotropic film in such a manner that by varying the stretching ratio in the longitudinal direction and the lateral direction, stretching is carried out so that one stretching factor is greater than the other. During the above operation, the stretching ratio of the lateral direction to the longitudinal direction is preferably 1.1-2.0, but is more preferably 1.2-1.5.

When the optical film of the present invention is employed as a polarizing plate protective film, the thickness of the aforesaid protective film is preferably 10-500 μm, is more preferably 10-100 μm, is further more preferably 20-80 μm, but is most preferably 40-80 μm. When the cellulose ester film is thicker than the upper limit, for example, in the case of application as a polarizing plate protective film, thickness of the polarizing plate after manufacturing a polarizing plate becomes excessively thick, and is not suitable for the targets such as a thin type and light weight in the liquid crystal display employed for a r lap-top type personal computers and mobile type electronic devices. On the other hand, if the thickness is at most the lower limit, retardation as a retardation film becomes difficult, and further, moisture permeability increases. As a result, it is not preferred since the moisture permeability increases to result in a decreased capability to protect the polarizer against moisture.

Further, in the solution casting method, an increase in film thickness results in a significant increase in drying load. However, in the present invention, no drying process is needed, whereby it is possible to manufacture relatively thick films at high productivity. Due to that, advantages result in which it becomes easier than before to increase the film thickness, while corresponding to targets such as the generation of desired retardation and the decrease in moisture permeability. Further, effects result in which it is possible to manufacture even a relatively thin film at higher productivity by stretching a relatively thick film.

Further, it is preferable that thickness variation of cellulose ester film supports is regulated within ±3%, further within ±1%, and still further within ±0.1%.

The width of the cellulose ester film of the present invention is preferably 1-4 m, but is most preferably 1.4-4 m.

Cellulose ester films, in which at least two compounds represented by aforesaid General Formula (1) in which the number of the hydroxyl groups differ are employed as plasticizers, result in optical films which excel in flatness, and thereby may be employed as a wider cellulose ester film. Specifically, films at a width of 1.4-4 m are preferably employed, and specifically preferred width is 1.4-2 m. When the width exceeds 4 m, conveyance becomes problematic.

The length of a rolled film is preferably 500-5,000 m but is more preferably 1,000-5,000 m. It is also preferable to wind a film while forming knurling at a height of 0-25% of the film thickness at both edges in the lateral direction.

In order to consistently manufacture such a relatively long film, it is critical that volatile components are not mixed in the casting materials. Temperature during film formation via the melt-casting method differs significantly from one during film formation via the solution-casting method. When volatile components exist in casting materials, during film formation, the aforesaid materials volatize and tend to adhere to the film forming apparatus, whereby various kind of problems occur. Therefore, in view of assurance of film flatness and transparency of a film to function as a film and a polarizing plate protective film, the presence of the volatile materials is not preferred. Specifically, when adhered to the die, the film surface results in streaking, whereby occasionally flatness may be degraded. Accordingly, when film composing materials are subjected to film formation, in view of avoiding generation of volatile components during heat-melting, it is preferable that volatile components are not present in the range which is lower than the melt temperature for film formation.

Volatile components, as described herein, include moisture absorbed by any of the film composing materials, mixed oxygen and nitrogen gases, or solvents and impurities which have been mixed prior to purchase or during synthesis, as well as those which vaporize or sublime via heating, or are volatized via decomposition. Solvents, as described herein, are not those used to prepare a resin solution for solution casting, but those which are incorporated in film composing materials in a minute amount. Accordingly, in order to avoid generation of such volatile components, it is critical to carefully select film composing materials.

With regard to film composing materials employed for melt-casting in the present invention, it is preferable that the aforesaid moisture and the aforesaid volatile components represented by solvents are removed during or prior to film formation. As methods for the above removal, drying methods are applicable, and a heating method, a pressure reduction method, or a heating pressure reduction method may be employed. Drying may be carried out in air or in an ambience of nitrogen or argon which is selected as an inert gas. These inert gases are preferred due to low water and oxygen content, and no substantial incorporation is preferred. When any of these conventional drying methods are employed, it is preferable that in view of film quality, drying is carried out in the temperature range in which film composing materials undergo no decomposition. For example, the residual content of water or solvents after removal in the aforesaid drying process is preferably at most 3 with respect to the entire weight of composing materials of each film, but is more preferably at most 1% by weight.

Specifically, cellulose ester resins at a water content of less than 0.5% are preferably employed. It is possible to determine these characteristic values via ASTM-D817-96. It is preferable that cellulose esters are further thermally treated to reduce the water content and are employed to realize 0.1-1,000 ppm.

By conducting drying prior to film formation, it is possible to reduce generation of volatile components of film composing materials, and it is also possible to dry the resin itself or divided one of a mixture or a compatible one of at least one type other than resins among the resins and film composing materials. Drying temperature is preferably at least 80° C. and at most the Tg or at most the melting point of the materials to be dried. When avoidance of mutual fusion of materials is considered, the drying temperature is more preferably 100-(Tg−5)° C., but is most preferably 110-(Tg−20)° C. Drying time is preferably 0.5-24 hours, is more preferably 1-18 hours, but is most preferably 1.5-12 hours. When the value is at most the lower limit, the removal ratio of volatile components becomes low or drying becomes excessively long. Further, when the Tg exists in materials to be dried, in the case in which heating is carried out at a drying temperature higher than Tg, occasionally, materials may fuse, resulting in handling difficulty. It is preferable that drying is carried out at ambient atmospheric pressure or less, and it is specifically preferable that drying is carried out while reducing the pressure to vacuum −½ atmospheric pressure. It is preferable that drying is carried out while appropriately stirring the materials such as a resin. A fluidized bed system, in which drying is carried out by feeding desiccated air or desiccated nitrogen from the bottom of the drying vessel, is preferred since it is thereby possible to carry out necessary drying within a shorter time.

A drying process may be divided into at least two stages. For example, a film may be formed employing materials which have been subjected to storage as a preliminary drying process, and components which are subjected to pre-drying which is carried immediately prior to film formation to one week prior to the film formation.

In-plane retardation value (Ro) and retardation value Rt in the thickness direction of the cellulose ester film of the present invention, when employed as a polarizer protective film, are preferably $0 \leq Ro$, and $Rt \leq 70$ nm, respectively, are more preferably $0 \leq Ro \leq 30$ nm and $0 \leq Rt \leq 50$ nm, but are still more preferably $0 \leq Ro \leq 10$ nm and $0 \leq Rt \leq 30$ nm. When employed as a retardation film, the above retardation values are preferably $30 \leq Ro \leq 100$ nm and $70 \leq Rt \leq 400$ nm, but are more preferably $35 \leq Ro \leq 65$ nm and $90 \leq Rt \leq 180$. Further, each of the variation and distribution width of Rt is preferably less than ±50%, is more preferably less than ±30%, is further preferably less than ±20%, is still further more preferably less than ±15%, is yet still further more preferably ±10%, is further more preferably ±5%, and is most preferably less than ±1%. Most preferably, Rt results in no variation.

It is possible to obtain retardation values Ro and Rt based on the following formulas.

$$Ro = (nx - ny) \times d$$

$$Rt = \{(nx + ny)/2 - nz\} \times d$$

wherein d (in nm) is the film thickness, while nx is the maximum refractive index of the in-plane of a film, also called a refractive index in the delayed phase axis direction), ny is the refractive index in the direction perpendicular to the delayed axis in the film in-plane, and nz is the refractive index in the thickness direction.

It is possible to determine retardation values (Ro) and (Rt) by employing an automatic double refractometer. It is possible to determine these values at 23° C., 55% relative humidity, and a wavelength of 590 nm by employing KOBRA-21ADH (Oji Scientific Instruments).

Further, the delayed phase axis exists preferably ±1° in the lateral direction or ±1° in the longitudinal direction, more preferably ±0.7° in the lateral or longitudinal direction, but more preferably ±0.5° in the lateral or longitudinal direction.

Since the cellulose ester film of the present invention is prepared in such a manner that practically no solvent is employed in the film forming process, the residual organic solvent amount incorporated in a wound cellulose ester film after film formation is consistently less than 1% by weight. As a result, it is possible to provide cellulose ester films which exhibit more consistent flatness and Rt than conventional ones. Specifically, it has become possible to provide a long-length roll of at least 100 m which exhibits consistent flatness and Rt. The length of the aforesaid cellulose ester film in the form of a roll is not particularly limited, and lengths such as 1,500 m, 25,000 m, or 50,000 m are preferably employed.

It is possible to determine the residual organic solvent amount via a head space gas chromatography. Namely, a weight-known cellulose ester film is heated to 120° C. in a tightly sealed vessel over 20 minutes, and organic solvents contained in the gas phase in the above tightly sealed vessel is determined via gas chromatography. Based on the result, it is possible to calculate the residual organic solvent amount (%).

Further, when a film incorporates moisture, the moisture amount (g) incorporated in the film is determined via another method. Based on the value obtained by subtracting the moisture weight (g) from the weight difference of the cellulose ester film prior to and again after the heating treatment, it is possible to obtain the residual organic solvent content (%).

It is typically difficult to realize the residual organic solvent content (%) of the cellulose ester film prepared via the solution casting method to reach at most 0.1% by weight. In order to achieve the above content, a lengthy drying process is required. However, when the aforesaid method is employed, it is possible to prepare cellulose ester films of an extremely low residual organic solvent content at lower cost and it is also possible to prepare cellulose ester films exhibiting excellent characteristics as an optical film.

When film composing materials are thermally melted, marked decomposition reactions occur, and due to the above decomposition reactions, coloration and degradation are occasionally accompanied. Further, due to the above decomposition reactions, volatile components are also simultaneously generated.

With regard to film composing materials, in order to avoid material modification and moisture absorption, it is possible to store those in the form of at least two types of pellets and to prepare a molten material by employing them. Pelletization is able to enhance mixability and compatibility of film composing materials during melting and contributes to achieve optical uniformity of films. Uniform mixing of composing materials, other than cellulose resins, with the aforesaid resins prior to melting is able to contribute to result in uniform molten properties during heat-melting.

When the cellulose ester film of the present invention is employed as a polarizing plate protective film to form a polarizing plate, it is preferable that at least one of the surfaces of the polarizing plate is the polarizing plate of the present invention, while it is more preferable that both surfaces are the polarizing plates of the present invention.

As a conventional polarizing plate protective film, employed is the cellulose ester film described below.

In a polarizing plate which employs the cellulose ester film of the present invention, in order to enhance quality of the display devices and provide various functions, it is possible to arrange other functional layers. Conventional functional layers such as a stain resisting layer, a transparent electrically conductive layer, a hard coat layer, an antireflection layer, an antistaining layer, a slippage enhancing layer, an adhesion enhancing layer, an anti-glaring layer, or a gas barrier layer may be applied. Further, it is possible to arrange an optically anisotropic layer formed via crystals or polyimide. It is also possible to carry out optical compensation by combining the polarizing plate protective film with the these optically anisotropic layers. In such case, as needed, various surface treatments such as a corona discharge treatment, a plasma treatment, or a chemical solution treatment may be carried out.

Further, with regard to the cellulose ester film of the present invention, compositions incorporating cellulose ester resins, in which the concentration of the aforesaid additives such as a plasticizer, a UV absorber, or a matting agent, differs, are simultaneously extruded, whereby it is possible to prepare a cellulose ester film having a laminated layer structure. For example, it is possible to prepare a cellulose ester film composed of a skin layer/a core layer/a skin layer. For example, minute particles of matting agents are incorporated in a greater amount in the skin layer, or may be incorporated only in the skin layer. Plasticizers and UV absorbers may be incorporated in the core layer in a greater amount than in the skin layer, or may be incorporated only in the core layer. Further, it is possible to incorporate different types of plasticizers and UV absorbers in the core layer and the skin layer. For example, it is possible to incorporate low volatile plasticizers and/or UV absorbers in the skin layer, and to add, to the core layer, plasticizers which excel in plasticity or UV absorbers which excel in UV absorption. The glass transition of the skin layer and the core layer may differ, and it is possible to make the glass transition temperature of the core layer lower than that of the skin layer. Further, the viscosity of molten materials incorporating cellulose esters during melt-casting may differ between the skin layer and the core layer, whereby viscosity of the skin layer>viscosity of the core layer, or viscosity of the core layer≧viscosity of the skin layer.

With regard to the long length-roll cellulose ester film of the present invention, such film is manufactured via the melt-casting method. Therefore, being different from the solution-casting method, no solvents to be volatized exist, whereby the above technology is excellent one in terms of minimal dimensional variation. In the present invention, the film manufactured via the melt-casting is subjected to a continuous stretching process, whereby a film in the form of a long-length roll is prepared.

When dimensional variation of cellulose ester films is excessive, image quality of the liquid crystal display deteriorates due to the change over time of the optical axis of a polarizer. Accordingly, when the dimension of a film, which has been allowed to stand at 23° C. and relative humidity 55% for 24 hours, is employed as a standard, the variation value at 80° C. and relative humidity 90% is preferably less than ±0.2%, is more preferably less than ±0.1%, but is most preferably ±0.05%.

<<Polarizing Plate>>

When the cellulose ester film according to the present invention is employed as a polarizing plate protective film, manufacturing methods of the polarizing plate are not particularly limited and any common method may be employed. It is preferable that the rear surface side of the cellulose ester film of the present invention is subjected to an alkali saponification treatment and the treated cellulose ester film is adhered to at least one side of the polarizer prepared via stretching while immersed in an iodine solution, employing an aqueous completely saponified type polyvinyl alcohol solution.

On the other surface, employed may be the cellulose ester film of the present invention or another polarizing plate protective film. With regard to the cellulose ester film of the present invention, it is possible to employ commercial cellulose ester films as the polarizing plate protective film employed on the other side. For example, as commercial cellulose ester films, preferably employed are KC8UX2M, KC4UX, KC5UX, KC4UY, KC8UY, KC12UCR, KC8UCR-3, KC8UCR-4, KC4FR-1, KC8UY-HA, or KC8UX-RHA (all manufactured by Konica Minolta Opt, Inc.). Alternately, it is also preferable to employ a polarizing plate protective film having an optically anisotropic layer, which simultaneously works as an optically compensating film, formed by orienting liquid crystal compounds such as discotic liquid crystals, rod-like liquid crystals or cholesteric liquid crystals. For example, it is possible to form an optically anisotropic layer via the method described in JP-A No. 2003-98348. In combination with the cellulose ester film of the present invention, it is possible to prepare a polarizing plate which excels in flatness, and exhibits a consistent viewing angle enhancing effect. Further, a film composed of cyclic olefin resins, acrylic resins, polyester, or polycarbonate may be employed as a polarizing plate protective film in the form of a polarizing plate protective film on the other side. Instead of the aforesaid alkali treatment, the polarizing plate may be treated via the adhesion enhancing treatment described in. JP-A Nos. 6-94915 and 6-118232.

In the polarizing plate of the present invention, when viewed from the polarizer, on the surface opposite the polarizing plate protective film employing the cellulose ester of the present invention, a polarizing plate protective film composed of cellulose derivatives is preferably employed, and general-purpose TAC films may be employed. On the polarizing plate protective film, which is on the far side from the liquid crystal cell apart, arranged may be other functional layers to enhance quality of display devices.

For example, in order to minimize reflection, glazing, abrasion, or staining, as well as to enhance luminance, in a display, a film incorporating a conventional functional layer may be employed as one component, or the film may be adhered to the surface of the polarizing plate. However, methods are not limited thereto.

Commonly, with regard to a retardation film, minimal variations of aforesaid retardation Ro or Rt are demanded to achieve consistent optical characteristics. Specifically, in a birefringence mode liquid crystal display device, the aforesaid variations occasionally result in non-uniform images.

A long-length roll of the polarizing plate protective film, manufactured by the melt-casting film forming method according to the present invention, is composed of cellulose ester as a major component. Therefore, it is possible to apply an alkali treatment process employing saponification characteristic to the cellulose ester. When the resins constituting a polarizer are polyvinyl alcohols, it is possible to allow the polarizer to adhere to the polarizing plate protective film by employing an aqueous completely saponified polyvinyl alcohol solution in the same way as for the conventional polarizing plate protective film. Due to that, the present invention is excellent since conventional polarizing plate processing methods are applicable, and specifically, is excellent from the point of view in which a long-length roll polarizing plate is prepared.

Productive effects achieved by the present invention are more marked in a long-length roll product of at least 100 m. As the length increases to 1,500 m, 25,000 m, or 50,000 m, productive effects of production of the polarizing plate become more marked.

For example, in the production of the polarizing plate protective film, when productivity and conveyance are considered, rolled film length is commonly 10-5,000 m, but is preferably 50-4,500 m. At the time, it is possible to select the film width to be suitable for the width of the polarizer and the production line. A film is manufactured to a width of 0.5-4.0 m but preferably 0.6-3.0 m, is wound in the form of a roll, and then employed to prepare polarizing plates. Further, a film of at least two times greater width than the target is manufactured, and after winding it in the form of a roll, it may be cut to prepare rolls of targeted widths, which may then be employed to prepare polarizing plates.

When the polarizing protective film is manufactured, prior to film stretching and/or after, it may be coated with functional layers such as an antistatic layer, a hard coat layer, a slippage enhancing layer, an adhesive layer, an anti-glaring layer, and or a barrier layer. At that time, if needed, various surface treatments such as a corona discharge treatment, a plasma treatment, or a chemical solution treatment may be applied.

Dimensional variation at 80° C. and 90% relative humidity of the cellulose ester film according to the present invention, when the film which is allowed to stand at 23° C. and 55% relative humidity for 24 hours is used as a standard, is commonly less ±2.0%, is preferably than less than ±1.0% but is more preferably less than ±0.5%.

When the cellulose ester film according to the present invention is applied to a polarizing plate as a retardation film, in terms of display quality, it is preferable that the variation of the retardation film itself is within the aforesaid range, since absolute retardation values and orientation angles as a polarizing plate are not shifted from the initially set values.

A polarizer which is a major constituting element of a polarizing plate is one which transmits radiation of a polarized wave plane in the constant direction. A currently known representative polarizer is a polyvinyl alcohol based polarized film which includes one prepared by dying a polyvinyl alcohol based film with iodine and the other prepared by dying it with dichroic dyes. An employed polarizer is prepared as follows. By employing an aqueous polyvinyl alcohol solution, a film is formed. The resulting film is uniaxially stretched, followed by dying or dyed followed by uniaxial stretching. Subsequently, a durability enhancing treatment is carried out by preferably employing boric compounds. Thickness of a polarizer film is commonly 5-40 μm, is preferably 5-30 μm, but is most preferably 5-20 μm. A polarizing plate is formed by allowing one side of the cellulose ester film of the present invention to adhere onto the surface of the aforesaid polarizer. Adhesion is preferably carried out via an aqueous adhesive incorporating completely saponified polyvinyl alcohol as a major component.

Since the polarizer is stretched in one direction (commonly longitudinal direction), when placed in an ambience at high temperature and high humidity, the stretching direction (commonly the longitudinal direction) is subjected to contraction, while the direction perpendicular to the stretching direction is subjected to elongation. As the thickness of a polarizing plate protective film decreases, the elongation and contraction ratio of a polarizing plate increases, and specifically, the contraction amount in the stretching direction of the polarizer becomes greater. Commonly, adhesion is carried out so that the stretching direction of the polarizer is the same as the casting direction (the MD direction) of the polarizing plate protective film. As a result, when the thickness of the polarizing plate protective film is decreased, it is critical to decrease the elongation contraction ratio in the casting direction. Since the cellulose ester film of the present invention excels in dimensional stability, it is appropriately employed as such a polarizing plate protective film.

Namely, no corrugated mottling increases via a durability test at 60° C. and 60% relative humidity. A polarizing plate even having an optical compensating film on the rear side results in no variation of viewing angle characteristics after the durability test, and thereby enables provision of excellent visibility.

A polarizing plate is composed of a polarizer and protective films which protect both sides thereof. Further, composition may be made by adhesion of a protect film on one side of the aforesaid polarizing plate and a separate film on the rear side. The protective film and separate film are employed to protect the polarizing plate during shipment and product testing. In this case, the protect film is adhered for the purpose to protect the surface of the polarizing plate, and is employed on the surface opposite the surface on which the polarizing plate is adhered to a liquid crystal plate. Further, the separate film is employed for the purpose to cover an adhesion layer adhered to the liquid crystal plate.

<<Liquid Crystal Display Device>>

A polarizing plate arranged by the polarizing plate protective film (including a case in which it is also employed as a retardation film) enables generation of higher display quality, compared to a common polarizing plate, and is appropriately applied particularly to a multi-domain type liquid crystal display device, and more preferably to a birefringence mode multi-domain type liquid crystal display device (for example, also called an MVA type liquid crystal display device) and a transverse electric field switching mode type liquid crystal display device (also called an IPS mode type liquid crystal display device).

By employing the polarizing plate of the present invention in a liquid crystal display device, it is possible to prepare various liquid crystal display devices exhibiting excellent visibility. It is possible to employ the polarizing plate employing cellulose ester film of the present invention in liquid crystal display devices of various driving systems such as STN, TN, OCL HAN, VA (MVA and PVA), IPS, or OCB. Of these, preferred are VA (MVA and PVA) type liquid crystal display device and an IPS mode type liquid crystal display device. Specifically, with regard to a large screen liquid crystal display device having a screen of at least 30 type, it is possible to prepare a liquid crystal display device which minimizes variation due to ambience, decreases light leakage, and excels in visibility such as color unevenness or front contrast.

In a liquid crystal display device employing the polarizing plate provided with a retardation film, when the cellulose ester film of the present invention is the retardation film, the aforesaid one polarizing plate is arranged for a liquid crystal cell, or two polarizing plates are arranged on both sides of the liquid crystal cell. At this time, an arrangement, in which the side of the polarizing plate protective film which composes the polarizing plate is employed to face the liquid cell of the liquid crystal display device, is able to contribute to enhancement of the display quality. In such a constitution, the polarizing plate employing the cellulose ester film of the present invention is able to optically compensate the liquid cell, whereby it is possible to provide a liquid crystal display device which results in enhanced display quality and excellent viewing angle characteristics.

EXAMPLES

The present invention will specifically be described with reference to examples; however, the present invention is not limited thereby.

Example 1

Preparation of Cellulose Ester Film Sample 1

As described below, via melt-casting while employing cellulose ester and various additives, Cellulose Ester Film 1 was prepared.

| Cellulose Ester 1 | |
|---|---|
| Exemplified Compound A-1 | 1.5% by weight |
| Exemplified Compound A-2 | 4.6% by weight |
| Exemplified Compound A-3 | 1.9% by weight |
| IRGANOX 1010 (produced by Ciba Japan K. K.) | 0.50% by weight |
| GSY-P 101 (produced by Saki Chemical Industry Co., Ltd.) | 0.25% by weight |
| SUMILIZER GS (produced by Sumitomo Chemical Co., Ltd.) | 0.25% by weight |
| TINUVIN 928 (produced by Ciba Japan K. K.) | 1.5% by weight |

Cellulose Ester C-1 was dried at 130° C. for under reduced pressure and cooled to room temperature. Thereafter, mixed were the above additives, 0.2% by weight of AEROSIL NAX 50 (produced by Nippon Aerosil Co., Ltd.), and 0.02% by weight of KE-P 100 (produced by Nippon Shokubai Co., Ltd.). The resulting mixture was placed in a hopper at 60° C. By employing a biaxial kneading extruder equipped with vacuum evacuation, extrusion was carried out at 20° C. from the die at a die temperature, of 230° C., a screw rotating rate of 300 rpm, a kneading time of 40 seconds and an extrusion rate of 200 kg/hour. After solidification in water at 20° C., cutting was carried out, whereby columnar pellets at a diameter of 2 mm and a length of 3 mm were prepared. The cut pellets were dried via an air flow heated at 65° C.

After drying the pellets prepared as above at 100° C. for 4 hours, they were heat-melted at 250° C. under an ambience of nitrogen. Thereafter, a film was formed via melt-extrusion from the T-type die, and further was stretched at a vertical and longitudinal stretching ratio of 1.2×1.2, whereby 80 μm thick Cellulose Ester Film Sample 1 was prepared.

Preparation of Cellulose Ester Film Samples 2-44

Cellulose Ester Film Samples 2-34 of the present invention, and Comparative Cellulose Ester Film Samples 35-44 were prepared in the same manner as Cellulose Ester Film Sample 1, except that each the cellulose ester types, compounds of the present invention, comparative compounds, other various types of additives, and heat-melt temperatures of the pellets was changed as described in Tables 1-4.

Incidentally, the used amount of various types of cellulose esters, each of which replaced employed Cellulose Ester C-1 was the same as Cellulose Ester C-1.

Employed compounds are detailed below.

(Cellulose Esters)

C-1: cellulose acetate propionate (a substitution degree via an acetyl group of 1.41, a substitution degree via a propionyl group of 1.32, molecular weight Mn=69,000, and Mw/Mn=3.2)

C-2: cellulose acetate propionate (a substitution degree via an acetyl group of 1.31, a substitution degree via a propionyl group of 1.23, molecular weight Mn=66,000, and Mw/Mn=3.0)

C-3: cellulose acetate propionate (a substitution degree via an acetyl group of 1.44, a substitution degree via a propionyl group of 1.46, molecular weight Mn=74,000, and Mw/Mn=2.7)

C-4: cellulose acetate propionate (a substitution degree via an acetyl group of 1.65, a substitution degree via a propionyl group of 1.05, molecular weight Mn=90,000, and Mw/Mn=3.5)

C-5: cellulose acetate propionate (a substitution degree via an acetyl group of 1.50, a substitution degree via a propionyl group of 1.44, molecular weight Mn=81,000, and Mw/Mn=2.9)

C-6: cellulose acetate propionate (a substitution degree via an acetyl group of 2.00, a substitution degree via a propionyl group of 0.75, molecular weight Mn=91,000, and Mw/Mn=2.4)

Structures of IRGANOX 1010, GSY-P 101, SUMILIZER GS, TINUVIN 928, PEP-36 (produced by ADEKA Corp.), Plasticizer A, Plasticizer B, and Plasticizer C are described below.

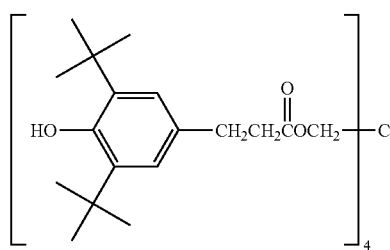

IRGANOX1010

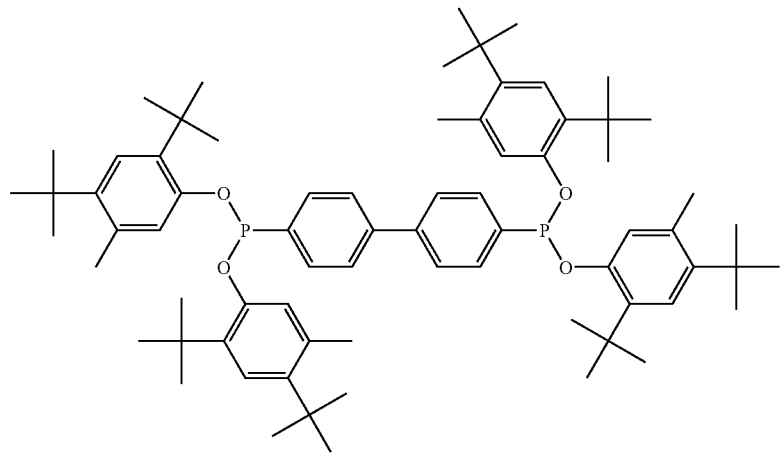

GSY-101

(a mixture incorporating, as a major component, the compound having the following structure, which is prepared by allowing biphenyl, phosphorus trichloride, and 4,6-di-t-butyl-m-cresol to react with each other)

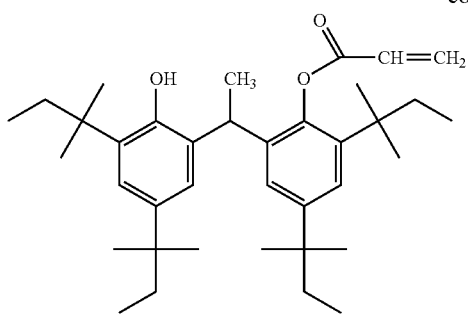

SumilizerGS

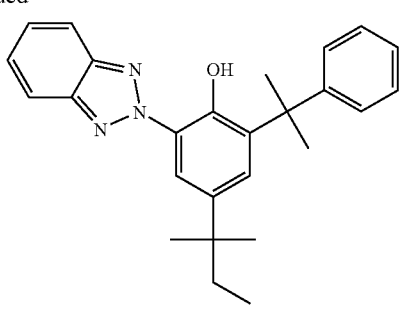

TINUVIN928

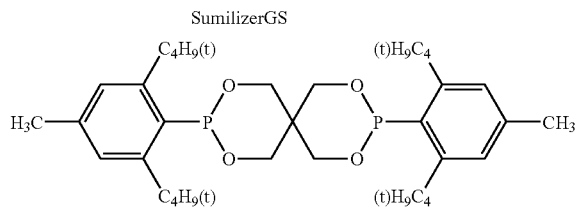

PEP-36

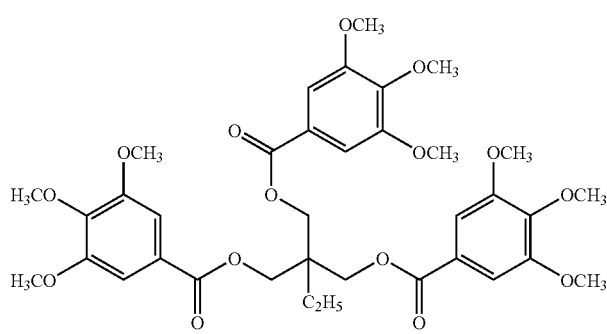

Plasticizer A

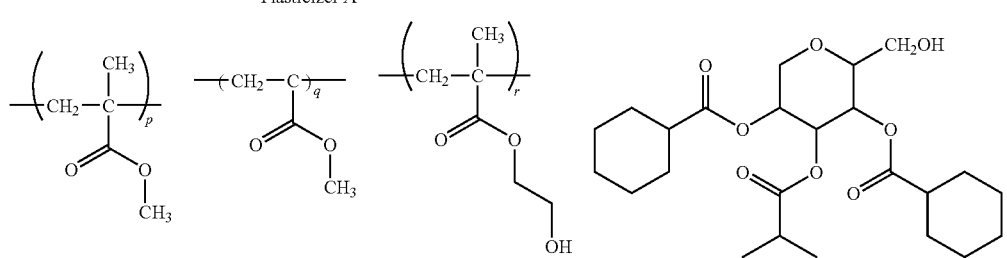

Plasticizer B (a copolymer of methyl methacrylate, methyl acrylate, and methacrylic acid-2-hydroxyethyl, and with regard to the weight average molecular weight, refer to the following)

Plasticizer C

Composition ratio: p/q/r = 80/10/10 and weight average molecular weight: 8,000

TABLE 1

| | | Compound of Present Invention or Comparative Compound | | | | | | | | | | |
|---|---|---|---|---|---|---|---|---|---|---|---|---|
| | | (Corresponding to Aforesaid General Formula (1) or (2)) | | | | Corresponding to Aforesaid General Formula (3) | | Other Additive | | | Melting Temperature (°C.) | Remarks |
| *1 | *2 | Compound-1 ** | Compound-2 ** | Compound-3 ** | Compound-4 ** | Compound-5 ** | Compound-6 ** | Additive-1 ** | Additive-2 ** | Additive-3 ** | | |
| 1 | C-1 | A-2 (4.6) | A-3 (1.9) | | | A-1 (1.5) | | GSY-P101 (0.25) | SumilizerGS (0.25) | | 250 | Inv. |

TABLE 1-continued

| *1 | *2 | Compound-1 ** | Compound-2 ** | Compound-3 ** | Compound-4 ** | Compound-5 ** | Compound-6 ** | Additive-1 ** | Additive-2 ** | Additive-3 ** | Melting Temperature (° C.) | Remarks |
|---|---|---|---|---|---|---|---|---|---|---|---|---|
| 2 | C-2 | A-2 (4.6) | A-3 (1.9) | | | A-1 (1.5) | | GSY-P101 (0.25) | SumilizerGS (0.25) | | 250 | Inv. |
| 3 | C-3 | A-2 (4.6) | A-3 (1.9) | | | A-1 (1.5) | | GSY-P101 (0.25) | SumilizerGS (0.25) | | 250 | Inv. |
| 4 | C-4 | A-2 (4.6) | A-3 (1.9) | | | A-1 (1.5) | | GSY-P101 (0.25) | SumilizerGS (0.25) | | 250 | Inv. |
| 5 | C-5 | A-2 (4.6) | A-3 (1.9) | | | A-1 (1.5) | | GSY-P101 (0.25) | SumilizerGS (0.25) | | 250 | Inv. |
| 6 | C-6 | A-2 (4.6) | A-3 (1-9) | | | A-1 (1.5) | | GSY-P101 (0.25) | SumilizerGS (0.25) | | 250 | Inv. |
| 7 | C-1 | A-10 (6.3) | A-11 (2.7) | | | A-9 (1.0) | | GSY-P101 (0.25) | SumilizerGS (0.25) | | 250 | Inv. |
| 8 | C-1 | A-20 (2-1) | A-21 (2.0) | | | A-19 (0.9) | | GSY-P101 (0.25) | SumilizerGS (0.25) | | 250 | Inv. |
| 9 | C-1 | A-2 (3.0) | A-3 (4.0) | A-4 (3.0) | A-5 (1.0) | A-1 (1.0) | | GSY-P101 (0.25) | SumilizerGS (0.25) | | 250 | Inv. |
| 10 | C-1 | B-2 (5.0) | B-3 (2.0) | | | B-1 (1.0) | | GSY-P101 (0.25) | SumilizerGS (0.25) | | 250 | Inv. |
| 11 | C-1 | B-16 (2.5) | B-17 (0.3) | | | B-15 (0.2) | | GSY-P101 (0.25) | SumilizerGS (0.25) | | 250 | Inv. |

*1: Sample number of cellulose ester film,
*2: Cellulose ester,
** (% by weight),
* at all levels incorporating 0.50% by weight of IRGANOX 1010, 1.5% by weight of TINUVIN 928, 0.2% by weight of AEROSIL MAX50, and 0.02% by weight of KE-P 100., Inv.: Present Invention

TABLE 2

| *1 | *2 | Compound-1 ** | Compound-2 ** | Compound-3 ** | Compound-4 ** | Compound-5 ** | Compound-6 ** | Additive-1 ** | Additive-2 ** | Additive-3 ** | Melting Temperature (° C.) | Remarks |
|---|---|---|---|---|---|---|---|---|---|---|---|---|
| 12 | C-1 | F-2 (4.3) | F-3 (2.1) | | | F-1 (1.6) | | GSY-P101 (0.25) | SumilizerGS (0.25) | | 250 | Inv. |
| 13 | C-1 | G-2 (4.0) | G-3 (7.0) | G-4 (3.0) | | G-1 (1.0) | | GSY-P101 (0.25) | SumilizerGS (0.25) | | 250 | Inv. |
| 14 | C-1 | H-6 (4.0) | H-8 (5.5) | H-9 (0.5) | | H-5 (1.0) | H-7 (1.0) | GSY-P101 (0.25) | SumilizerGS (0.25) | | 250 | Inv. |
| 15 | C-1 | A-2 (4.6) | A-3 (1.9) | | | A-1 (1.5) | | GSY-P101 (0.25) | SumilizerGS (0.25) | Plasticizer A(4) | 250 | Inv. |
| 16 | C-1 | A-2 (4.6) | A-3 (1.9) | | | A-1 (1.5) | | GSY-P101 (0.25) | SumilizerGS (0.25) | Plasticizer B(4) | 250 | Inv. |
| 17 | C-1 | A-2 (2.6) | A-3 (1.3) | | | A-1 (4.1) | | GSY-P101 (0.25) | SumilizerGS (0.25) | | 250 | Inv. |
| 18 | C-1 | A-2 (6.0) | A-3 (2.0) | | | | | GSY-P101 (0.25) | SumilizerGS (0.25) | | 250 | Inv. |
| 19 | C-1 | A-17 (3.0) | A-18 (5.0) | | | | | GSY-P101 (0.25) | SumilizerGS (0.25) | | 250 | Inv. |
| 20 | C-1 | A-3 (4.0) | A-4 (3.0) | A-5 (1.0) | | | | GSY-P101 (0.25) | SumilizerGS (0.25) | | 250 | Inv. |
| 21 | C-3 | A-2 (4.6) | A-3 (1.9) | | | A-1 (1.5) | | Compound (4)-1(0.25) | SumilizerGS (0.25) | | 250 | Inv. |
| 22 | C-4 | A-2 (4.6) | A-3 (1.9) | | | A-1 (1.5) | | Compound (4)-3(0.25) | SumilizerGS (0.25) | | 250 | Inv. |

*1: Sample number of cellulose ester film,
*2: Cellulose ester,
** (% by weight),
* at all levels incorporating 0.50% by weight of IRGANOX 1010, 1.5% by weight of TINUVIN 928, 0.2% by weight of AEROSIL MAX50, and 0.02% by weight of KE-P 100., Inv.: Present Invention

TABLE 3

| *1 | *2 | Compound-1 ** (Formula 1/2) | Compound-2 ** | Compound-3 ** | Compound-4 ** | Compound-5 ** (Formula 3) | Compound-6 ** | Additive-1 ** | Additive-2 ** | Additive-3 ** | Melting Temperature (°C) | Remarks |
|---|---|---|---|---|---|---|---|---|---|---|---|---|
| 23 | C-1 | A-2 (4.6) | A-3 (1.9) | | | A-1 (1.5) | | GSY-P101 (0.25) | Compound (5)-3(0.25) | | 250 | Inv. |
| 24 | C-3 | A-2 (4.6) | A-3 (1.9) | | | A-1 (1.5) | | GSY-P101 (0.25) | Compound (5)-8(0.25) | | 250 | Inv. |
| 25 | C-4 | A-2 (4.6) | A-3 (1.9) | | | A-1 (1.5) | | GSY-P101 (0.25) | Compound (5)-45(0.25) | | 250 | Inv. |
| 26 | C-3 | A-2 (4.6) | A-3 (1.9) | | | A-1 (1.5) | | GSY-P101 (0.25) | Compound (6)-1(0.25) | | 250 | Inv. |
| 27 | C-4 | A-2 (4.6) | A-3 (1.9) | | | A-1 (1.5) | | GSY-P101 (0.25) | Compound (6)-13(0.25) | | 250 | Inv. |
| 28 | C-3 | A-2 (4.6) | A-3 (1.9) | | | A-1 (1.5) | | GSY-P101 (0.25) | | | 250 | Inv. |
| 29 | C-3 | A-2 (4.6) | A-3 (1.9) | | | A-1 (1.5) | | PEP-36 (0.25) | | | 250 | Inv. |
| 30 | C-3 | A-2 (4.6) | A-3 (1.9) | | | A-1 (1.5) | | | | | 250 | Inv. |
| 31 | C-1 | A-2 (4.6) | A-3 (1.9) | | | A-1 (1.5) | | GSY-P101 (0.25) | SumilizerGS (0.25) | | 240 | Inv. |
| 32 | C-1 | A-2 (4.6) | A-3 (1.9) | | | A-1 (1-5) | | GSY-P101 (0.25) | SumilizerGS (0.25) | | 245 | Inv. |
| 33 | C-1 | A-2 (4.6) | A-3 (1.9) | | | A-1 (1.5) | | GSY-P101 (0.25) | SumilizerGS (0.25) | | 265 | Inv. |

*1: Sample number of cellulose ester film,
*2: Cellulose ester,
** (% by weight),
* at all levels incorporating 0.50% by weight of IRGANOX 1010, 1.5% by weight of TINUVIN 928, 0.2% by weight of AEROSIL MAX50, and 0.02% by weight of KE-P 100., Inv.: Present Invention

TABLE 4

| *1 | *2 | Compound-1 ** (Formula 1/2) | Compound-2 ** | Compound-3 ** | Compound-4 ** | Compound-5 ** (Formula 3) | Compound-6 ** | Additive-1 ** | Additive-2 ** | Additive-3 ** | Melting Temperature (°C) | Remarks |
|---|---|---|---|---|---|---|---|---|---|---|---|---|
| 34 | C-1 | A-2 (4.6) | A-3 (1.9) | | | A-1 (1.5) | | GSY-P101 (0.25) | SumilizerGS (0.25) | | 270 | Inv. |
| 35 | C-1 | | | | | A-1 (8.0) | | GSY-P101 (0.25) | SumilizerGS (0.25) | | 250 | Comp. |
| 36 | C-1 | A-2 (8.0) | | | | | | GSY-P101 (0.25) | SumilizerGS (0.25) | | 250 | Comp. |
| 37 | C-1 | A-3 (8.0) | | | | | | GSY-P101 (0.25) | SumilizerGS (0.25) | | 250 | Comp. |
| 38 | C-1 | | | | | | | GSY-P101 (0.25) | SumilizerGS (0.25) | Plasticizer C(8.0) | 250 | Comp. |
| 39 | C-1 | | | | | A-19 (5.0) | | GSY-P101 (0.25) | SumilizerGS (0.25) | | 250 | Comp. |
| 40 | C-1 | | | | | B-1 (12) | | GSY-P101 (0.25) | SumilizerGS (0.25) | | 250 | Comp. |
| 41 | C-1 | | | | | B-15 (3.0) | | GSY-P101 (0.25) | SumilizerGS (0.25) | | 250 | Comp. |
| 42 | C-1 | | | | | F-1 (8.0) | | GSY-P101 (0.25) | SumilizerGS (0.25) | | 250 | Comp. |
| 43 | C-1 | | | | | A-19 (4.0) | F-1 (4.0) | GSY-P101 (0.25) | SumilizerGS (0.25) | | 250 | Comp. |
| 44 | C-1 | H-3 (8.0) | | | | | | GSY-P101 (0.25) | SumilizerGS (0.25) | | 250 | Comp. |

*1: Sample number of cellulose ester film,
*2: Cellulose ester,
** (% by weight),
* at all levels incorporating 0.50% by weight of IRGANOX 1010, 1.5% by weight of TINUVIN 928, 0.2% by weight of AEROSIL MAX50, and 0.02% by weight of KE-P 100., Inv.: Present Invention, Comp.: Comparative Example (Evaluation of Cellulose Ester Samples)

Cellulose ester film samples prepared as above were evaluated as described below. Table 5 shows the results.

(Fume Releasing State)

The state of fume generated from the discharge hole of the T-type die and the state of a vertical polishing roller were visually observed, and evaluation was carried out based on the following criteria.

A: no fume was noted

B: slight fumes were noted

C: a large amount of fumes were noted

D: a large amount of fumes were noted and cloudiness was noted on the surface of the vertical polishing roller due to fumes Herein, A and B were judged to result in no practical problems.

(Flatness)

The prepared cellulose ester sample was cut into a sample piece of a length of 100 cm×a width of 40 cm. Thereafter, a black paper sheet was adhered onto a flat desk and thereon, the above sample film was placed. Three fluorescent lamps which were arranged obliquely upward were imaged, and flatness was evaluated via a bending degree of the fluorescent lamps.

A: all the three florescent lamps looked straight

B: some portions of the florescent lamps looked slightly not straight

C: the fluorescent lamps looked bending

D: the fluorescent lamps looked significantly undulating

Herein, A and B were judged to result in no practical problems.

(Durability after Saponification)

Each of the prepared cellulose ester films was subjected to an alkali-saponification treatment under the following conditions.

| Saponification process: | 2 mol/L NaOH | 50° C. 90 seconds |
| --- | --- | --- |
| Washing process: | water | 30° C. 45 seconds |
| Neutralization process: | 10% by weight HCl | 30° C. 45 seconds |
| Washing process: | water | 30° C. 45 seconds |

Each sample was sequentially subjected to saponification, washing, neutralization, and washing. Subsequently, after sufficiently draining off water, air flow drying was carried out at 80° C. for one hour.

Each of the resulting cellulose ester film samples after the saponification treatment was left to stand for 300 hours in a high temperature and high humidity ambience at 80° C. and 90% relative humidity. Thereafter, crystal deposition on the surface of the cellulose ester film sample was visually observed, and evaluation was carried out based on the following criteria.

A: no crystal deposition was noted on the surface

B: slight crystal deposition was partially noted on the surface

C: slight crystal deposition was noted on the entire surface

D: significant crystal deposition was noted on the entire surface

Herein, A and B were judged to result in no practical problems.

TABLE 5

| Cellulose Ester Film Sample Number | Fume State | Flatness | Durability after Saponification | Remarks |
| --- | --- | --- | --- | --- |
| 1 | A | A | A | Inv. |
| 2 | A | A | A | Inv. |
| 3 | A | A | A | Inv. |
| 4 | A | A | A | Inv. |
| 5 | A | A | A | Inv. |
| 6 | B | B | A | Inv. |
| 7 | A | A | A | Inv. |
| 8 | A | A | A | Inv. |
| 9 | A | A | A | Inv. |
| 10 | B | B | A | Inv. |
| 11 | B | B | A | Inv. |
| 12 | A | B | A | Inv. |
| 13 | A | B | A | Inv. |
| 14 | A | B | A | Inv. |
| 15 | A | A | A | Inv. |
| 16 | A | A | A | Inv. |
| 17 | A | A | A | Inv. |
| 18 | A | A | A | Inv. |
| 19 | B | A | A | Inv. |
| 20 | A | A | A | Inv. |
| 21 | A | A | A | Inv. |
| 22 | A | A | A | Inv. |
| 23 | A | A | A | Inv. |
| 24 | A | A | A | Inv. |
| 25 | A | A | A | Inv. |
| 26 | A | A | A | Inv. |
| 27 | A | A | A | Inv. |
| 28 | A | A | A | Inv. |
| 29 | A | A | B | Inv. |
| 30 | B | B | B | Inv. |
| 31 | A | B | A | Inv. |
| 32 | A | B | A | Inv. |
| 33 | B | A | A | Inv. |
| 34 | B | A | A | Inv. |
| 35 | C | C | D | Comp. |
| 36 | C | C | D | Comp. |
| 37 | C | C | D | Comp. |
| 38 | C | D | D | Comp. |
| 39 | C | C | D | Comp. |
| 40 | D | D | D | Comp. |
| 41 | D | D | D | Comp. |
| 42 | C | D | D | Comp. |
| 43 | C | C | D | Comp. |
| 44 | C | D | D | Comp. |

Inv.: Present Invention,
Comp.: Comparative Example

Based on Table 5, Cellulose Ester Film Samples 1-34 of the present invention exhibited a less amount of volatile components, higher flatness, and higher durability after saponification, compared to Cellulose Ester Film Samples 35-44 of the comparative examples, and thereby, were found to be excellent films of no practical problems.

Example 2

The following compositions were prepared.

| (Antistatic Layer Coating Composition (1)) | |
| --- | --- |
| Polymethyl methacrylate (weight average molecular weight of 550,000 and Tg of 90° C.) | 0.5 part |
| Propylene glycol monomethyl ether | 60 parts |
| Methyl ethyl ketone | 16 parts |
| Ethyl lactate | 5 parts |
| Methanol | 8 parts |
| Electrically conductive polymer resin P-1 (0.1-0.3 μm particles) | 0.5 part |

Electrically Conductive Polymer Resin P-1

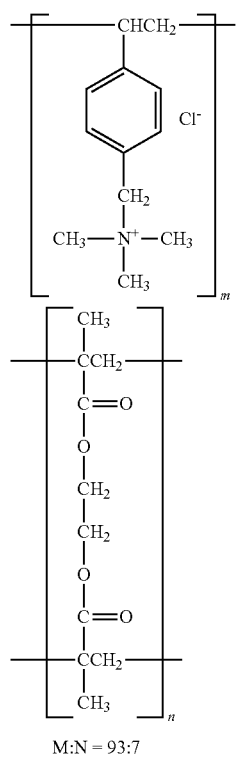

M:N = 93:7

| (Hard Coat Layer Composition (2)) | |
| --- | --- |
| Dipentaerythritol hexaacrylate monomer | 60 parts |
| Dipentaerythritol hexaacrylate dimer | 20 parts |
| Component of dipentaerythritol hexaacrylate trimmer and higher polymers | 20 parts |
| Diethoxybenzophenone photoreaction initiator | 6 parts |
| Silicone based surface active agent | 1 part |
| Propylene glycol monomethyl ether | 75 parts |
| Methyl ethyl ketone | 75 parts |

| (Non-Curling Layer Coating Composition (3)) | |
| --- | --- |
| Acetone | 35 parts |
| Ethyl acetate | 45 parts |
| Isopropyl alcohol | 5 parts |
| Diacetyl cellulose | 0.5 part |
| 2% Minute particle acetone dispersion (AEROSIL: 200V produced by Nippon Aerosil Co., Ltd.) | 0.1 part |

As described below, a function provided polarizing plate protective film was prepared.

Cellulose Ester Film Sample 1 of the present invention, prepared in Example 1, was doubly wrapped up via a polyethylene sheet and was stored for 30 days under conditions of 25° C. and 50% relative humidity. Thereafter, the polyethylene sheet was removed and non-curling coating composition (3) was subjected to gravure coat onto one side of the cellulose ester film sample to reach a wet layer thickness of 13 μm, followed by drying at a temperature of 80±5° C. The resulting film was designated as Sample 1A.

Antistatic layer coating composition (1) was applied onto the other side of the cellulose ester film sample to reach a wet layer thickness of 7 μm at a film conveying rate of 30 m/minute and a coating width of 1 m in an ambience of 28° C. and 82% relative humidity, followed by drying in a drying zone set at 80±5° C., whereby a resin layer of a dried thickness of about 0.2 μm was arranged, and a cellulose ester film sample attached with an electrostatic layer was prepared and designated as Sample 1B.

Further, hard coat layer coating composition (2) was applied onto the above antistatic layer to reach a wet layer thickness of 13 μm, dried at a temperature of 90° C., and exposed to ultraviolet rays to reach 150 mJ/m$^2$, whereby a clear hard coat layer of a dried layer thickness of 5 μm was arranged. The resulting film was designated as Sample 1C.

All of prepared Cellulose Ester Film Samples 1A, 1B, and 1C resulted in neither brushing nor cracking after drying and exhibited targeted coating properties.

Cellulose Ester Film Sample 1 was replaced with each of Cellulose Ester Film Samples 2-34 of the present invention, which was subjected to coating via the same method. As a result, targeted coating properties were confirmed for each.

For comparison, Comparative Cellulose Ester Film Samples 35-44 were subjected to coating via the same method as above.

Samples which were prepared by coating non-curling layer coating composition were designated as Samples 35A-44A. Samples which were prepared by further coating antistatic layer coating composition (1) were designated as Samples 35B-44B, and samples which were prepared by coating hard coat layer coating composition (2) onto the above antistatic layer were designated as Samples 35C-44C.

As a result, when coating was carried out in an ambience of high humidity, brushing was resulted. Further, in Samples 35B-44B, minute cracks were occasionally noted after drying, while in Samples 35C-44C, minute cracks were clearly noted after drying.

Example 3

Preparation of Polarizing Plate and Evaluation

A 120 μm thick polyvinyl alcohol film was immersed in an aqueous solution incorporating 1 part by weight of iodine, 2 parts by weight of potassium iodide, and 4 parts by weight of boric acid and then stretched by a factor of 4 at 50° C., whereby a polarizer was prepared.

Each of Cellulose Ester Film Samples 1-34 of the present invention and Comparative Cellulose Ester Film Samples 35-44, prepared in Example 1, was doubly wrapped up via a polyethylene sheet and was stored for 30 days under conditions of 25° C. and 50% relative humidity. Thereafter, each polyethylene sheet was removed, and each cellulose ester film sample was subjected to an alkali treatment via a 2.5 mol/L aqueous sodium hydroxide solution at 40° C. for 60 seconds, followed by water washing and drying, whereby the surface was subjected to the alkali treatment.

Both sides of the aforesaid polarizer were adhered to the alkali treated surface of each of Samples 1-34 of the present invention, and Comparative Samples 35-44 by employing a 5% aqueous completely saponified type polyvinyl alcohol solution as an adhesive, whereby each of Polarizing Plates 1-34 of the present invention and Comparative Polarizing Plates 35-44 was prepared.

(Evaluation of Polarizing Plates)

As described below, evaluated were adhesion properties of the cellulose ester film sample to the polarizer, and lightfastness and durability of the polarizing plate.

(Adhesion Properties to Polarizer)

Each of the polarizing plates prepared as above was stored at 80° C. and 90% relative humidity for 1,200 hours. Subsequently, the adhesion state of the polarizer to the cellulose ester film sample was observed and ranked via the following criteria.

A: no peeling was noted
E: slight peeling was noted
C: peeling to a certain degree was noted
D: significant peeling was noted Herein, A, B and C were judged to result in no practical problems.

(Light Fastness)

Parallel transmittance (H0) and crossed transmittance (H90) of the sample, which had not been subjected to accelerated aging, were determined and the polarization degree was calculated based on the following formula. Thereafter, each of the polarizer plates was subjected to accelerated aging via SUN SHINE WEATHER METER for 500 hours under the condition of the absence of filters. After the accelerated aging, parallel transmittance (H0') and crossed transmittance (H90') were determined. Polarization degrees P0 and P500 were calculated, and the variation amount of the polarization degrees was obtained based on the following formula.

<Calculation of Polarization Degrees P0 and P500>

$$\text{Polarization degree } P0 = \{(H0-H90)/(H0+H90)\}^{1/2} \times 100$$

$$\text{Polarization degree } P500 = \{(H0'-H90')/(H0')+H90')\}^{1/2} \times 100$$

$$\text{Variation amount of polarization degree} = P_o - P500$$

P0: polarization degree prior to accelerated aging
P500=polarization degree after accelerated aging for 500 hours The variation amount of the polarization degree, obtained as above, was determined based on the following criteria, and lightfastness was evaluated.

A: variation amount of the polarization degree was less than 5%
B: variation amount of the polarization degree was at least 5%-less than 10%
C: variation amount of the polarization degree was at least 25%

Herein, A, B, and C were judged to result in no practical problems.

(Durability)

Two polarizing plates at 500 mm×500 mm were cut from one polarizing plate sample prepared as above and were subjected to heat treatment (conditions: being left to stand at 90° C. for 100 hours). When the samples were placed in the crossed state, longer length at the edge of the white spot area of the longitudinally or vertically central line portion was determined, and the ratio to the edge length (500 mm) was calculated. Based on the resulting ratio, determination was made as follows. The white spot area at the edge, as described herein, means that the edge of polarizing plates in a crossed state, which does not transmit light, becomes light transmissive, and can visually be determined. In the state of a polarizing plate, since the display of the edge of the polarizing plate becomes invisible, thereby resulting in defects.

A: the white spot area at the edge was less than 5%
B: the white spot area at the edge was at least 5%-less than 10%
C: the white spot area at the edge was at least 10%-less than 20%
D: the white spot area at the edge was at least 20%

Herein, A, B, and C were judged to result in no practical problems.

Table 6 shows the above results.

TABLE 6

| Polarizing Plate Sample No. | Adhesion Property with Polarizer | Light-fastness | Durability | Remarks |
| --- | --- | --- | --- | --- |
| 1 | A | A | A | Inv. |
| 2 | A | A | A | Inv. |
| 3 | A | A | A | Inv. |
| 4 | A | A | A | Inv. |
| 5 | B | A | A | Inv. |
| 6 | A | A | A | Inv. |
| 7 | A | A | B | Inv. |
| 8 | A | A | B | Inv. |
| 9 | A | A | A | Inv. |
| 10 | A | B | B | Inv. |
| 11 | A | B | B | Inv. |
| 12 | A | A | B | Inv. |
| 13 | A | A | A | Inv. |
| 14 | B | A | B | Inv. |
| 15 | A | A | A | Inv. |
| 16 | A | A | A | Inv. |
| 17 | B | A | A | Inv. |
| 18 | A | A | B | Inv. |
| 19 | A | A | B | Inv. |
| 20 | A | A | A | Inv. |
| 21 | A | A | A | Inv. |
| 22 | A | A | A | Inv. |
| 23 | A | A | A | Inv. |
| 24 | A | A | A | Inv. |
| 25 | A | A | A | Inv. |
| 26 | A | A | A | Inv. |
| 27 | A | A | A | Inv. |
| 28 | B | A | A | Inv. |
| 29 | B | B | B | Inv. |
| 30 | B | B | B | Inv. |
| 31 | B | A | A | Inv. |
| 32 | A | A | A | Inv. |
| 33 | A | A | A | Inv. |
| 34 | A | B | B | Inv. |
| 35 | D | B | B | Comp. |
| 36 | C | B | C | Comp. |
| 37 | C | C | C | Comp. |
| 38 | D | D | D | Comp. |
| 39 | C | B | D | Comp. |
| 40 | C | D | D | Comp. |
| 41 | C | D | D | Comp. |
| 42 | C | C | D | Comp. |
| 43 | C | C | D | Comp. |
| 44 | D | C | B | Comp. |

Inv.: Present Invention,
Comp.: Comparative Example

As shown in Table 6, it became clear that Cellulose Ester Film Samples 1-34 exhibited excellent adhesion to a polarizer, compared to Comparative Cellulose Ester Film Samples 35-44, while resulting Polarizing Plates 1-34 of the present invention exhibited excellent lightfastness and durability, compared to Comparative Polarizing Plates 35-44.

(Evaluation of Characteristics as Liquid Crystal Display Device)

The polarizing plate of 15 TYPE DISPLAY VL-1530S, produced by Fujitsu Ltd., which is a VA type liquid crystal display device, was peeled, and each of the polarizing plates prepared as above was cut while matched to the crystal cell. Two polarized plates prepared as above were arranged to sandwich the liquid cell, followed by adhesion so that the polarization axes were orthogonal to each other while they did not change from the original, whereby a 15 type color liquid crystal display was prepared. Subsequently, characteristics of the cellulose ester film samples as a polarizing plate were evaluated. The liquid crystal display device, which employed each of Polarizing Plates 1-34 of the present invention, exhibited higher contrast and excellent display properties, compared to the liquid crystal display device which employed each of Comparative Polarizing Plates 35-44. Based on the above, confirmed was superiority as the polarizing plate of image display devices such as a liquid crystal display.

The invention claimed is:

1. A cellulose ester film comprising a cellulose ester, a compound represented by Formula (1) and a compound represented by Formula (2):

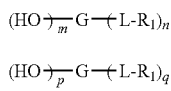

$$(HO)_{\overline{m}}G\text{—}(L\text{-}R_1)_n \qquad \text{Formula (1)}$$

$$(HO)_{\overline{p}}G\text{—}(L\text{-}R_1)_q \qquad \text{Formula (2)}$$

wherein, G represents a monosaccharide residue or a polysaccharide residue containing 2 to 10 monosaccharide units; L represents a single bond or a two valent linking group formed from at least one of the group consisting of: —O—, —CO—, —NR$_2$— (provided that R$_2$ represents an aliphatic group or an aromatic group) and an aliphatic group; R$_1$ represents an aliphatic group or an aromatic group, provided that the said aliphatic group and the said aromatic group may independently have a substituent; and m, n, p and q are an integer of 1 or more, provided that the following relationships are satisfied:

m≠p
n≠q
m+n≧3
p+q≧3.

2. The cellulose ester film of claim 1 comprising a compound represented by Formula (3):

$$G\text{-}(L\text{-}R_1)_r \qquad \text{Formula (3)}$$

wherein, G represents a monosaccharide residue or a polysaccharide residue containing 2 to 10 monosaccharide units; L represents a single bond or a two valent linking group formed from at least one of the group consisting of: —O—, —CO—, —NR$_2$— (provided that R$_2$ represents an aliphatic group or an aromatic group) and an aliphatic group; R$_1$ represents an aliphatic group or an aromatic group, provided that the said aliphatic group and the said aromatic group may independently have a substituent; and r is an integer of 3 or more.

3. The cellulose ester film of claim 1, wherein L in Formulas (1), (2) and (3) is a two valent linking group represented by —OCO—.

4. The cellulose ester film of claim 1, wherein G in Formulas (1), (2) and (3) represents a polysaccharide residue containing 2 to 6 monosaccharide units.

5. The cellulose ester film of claim 4, wherein the aforesaid G is a sucrose residue.

6. The cellulose ester film of claim 1, wherein R$_1$ in Formulas (1), (2) and (3) is an aromatic group.

7. The cellulose ester film of claim 1, wherein the following Formula (1) is satisfied, provided that an added amount of a compound represented by Formula (1) in the cellulose ester is "a" (weight %); and an added amount of a compound represented by Formula (2) in the cellulose ester is "b" (weight %):

$$0.10 \leq a/(a+b) \leq 0.90. \qquad \text{Formula (I)}$$

8. The cellulose ester film of claim 2, wherein the following Formula (II) is satisfied, provided that an added amount of a compound represented by Formula (1) in the cellulose ester is "a" (weight %); an added amount of a compound represented by Formula (2) in the cellulose ester is "b" (weight %); and an added amount of a compound represented by Formula (3) in the cellulose ester is "c" (weight %):

$$0.10 \leq a/(a+b+c) \leq 0.90. \qquad \text{Formula (II)}$$

9. The cellulose ester film of claim 1 comprising a compound represented by Formula (4):

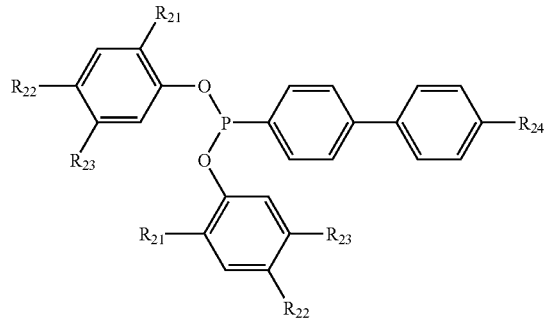

Formula (4)

wherein, R$_{21}$ and R$_{22}$ each represent an alkyl group or a cycloalkyl group, each may have a substituent; R$_{23}$ represents an alkyl group, a cycloalkyl group or an aryl group, each may have a substituent; and R$_{24}$ represents a hydrogen atom or a phosphorus atom.

10. The cellulose ester film of claim 1 comprising a compound represented by Formula (5) or a compound represented by Formula (6):

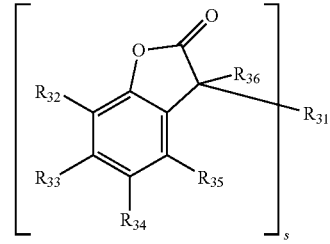

Formula (5)

wherein, R$_{32}$ to R$_{35}$ each independently represent a hydrogen atom or a substituent; R$_{36}$ represents a hydrogen atom or a substituent; "s" represents an integer of 1 to 4, when "s" is 1, R$_{31}$ represents a substituent, when "s" is an integer of 2 to 4, R$_{31}$ represents a linking group having respectively two to four valences, the said substituent is selected from the group consisting of: an alkyl group, a cycloalkyl group, an aryl group, an acylamino group, an alkylthio group, an arylthio group, an alkenyl group, a halogen atom, an alkynyl group, a heterocyclic group, an alkylsulfonyl group, an arylsulfonyl group, an alkylsulfinyl group, an arylsulfinyl group, a phosphono group, an acyl group, a carbamoyl group, a sulfamoyl group, a sulfonamide group, a cyano group, an alkoxy group, an aryloxy group, a heterocyclicoxy group, a siloxy group, an acyloxy group, a sulfonic acid group, a salt of sulfonic acid, an aminocarbonyloxy group, an amino group, an anilino group, an imide group, a ureido group, an alkoxycarbonylamino group, an alkoxycarbonyl group, an aryloxycarbonyl group, a heterocyclicthio group, a thioureido group, a carboxyl group, a salt of carboxylic acid, a hydroxyl group, a mercapto group, and a nitro group,

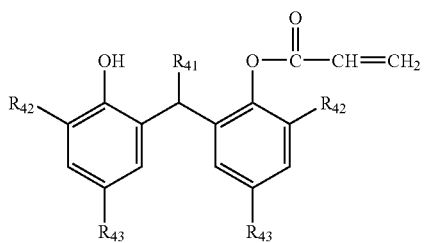

Formula (6)

wherein, $R_{41}$ represents a hydrogen atom or an alkyl group of 1 to 10 carbon atoms; and $R_{42}$ and $R_{43}$ each independently represent an alkyl group of 1 to 8 carbon atoms).

11. The cellulose ester film of claim 1, wherein the cellulose ester satisfies Formulas (III) and (IV):

$$2.40 \leq X+Y \leq 2.90 \qquad \text{Formula (III)}$$

$$1.00 \leq Y \leq 1.50 \qquad \text{Formula (IV)}$$

wherein, X is a substituted degree of an acetyl group, and Y is a substituted degree of a propionyl group.

12. A method for producing the cellulose ester film of claim 1 comprising melt casing.

13. The method for producing the cellulose ester film of claim 12, wherein a melting temperature is 245 to 265° C.

14. A polarizing plate comprising:
a polarizer; and
the cellulose ester film of claim 1,
wherein the cellulose ester film is placed at least on one surface of the polarizer.

15. A liquid crystal display device comprising a liquid crystal cell provided with the polarizing plate of claim 14 at least on one surface of the liquid crystal cell.

* * * * *